US011933481B2

(12) United States Patent
Proeber et al.

(10) Patent No.: US 11,933,481 B2
(45) Date of Patent: Mar. 19, 2024

(54) SITE LIGHT

(71) Applicant: MILWAUKEE ELECTRIC TOOL CORPORATION, Brookfield, WI (US)

(72) Inventors: David Proeber, Milwaukee, WI (US); Ross McIntyre, Milwaukee, WI (US); Jason D. Thurner, Menomonee Falls, WI (US); Michael A. Verhagen, Nashotah, WI (US); Gareth Mueckl, Milwaukee, WI (US); Brian Cornell, West Allis, WI (US); Dalton F. Hansen, Grafton, WI (US); Anthony R. Sleck, Lisbon, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/140,376

(22) Filed: Apr. 27, 2023

(65) Prior Publication Data

US 2023/0408072 A1 Dec. 21, 2023

Related U.S. Application Data

(63) Continuation of application No. 17/466,798, filed on Sep. 3, 2021, now Pat. No. 11,674,673, which is a
(Continued)

(51) Int. Cl.
*F21V 21/14* (2006.01)
*F21V 17/00* (2006.01)
(Continued)

(52) U.S. Cl.
CPC .......... *F21V 21/145* (2013.01); *F21V 17/007* (2013.01); *F21V 17/02* (2013.01);
(Continued)

(58) Field of Classification Search
CPC .......... F21L 14/00–04; F21V 17/00–20; F21V 21/00–406; F21V 23/002;
(Continued)

(56) References Cited

U.S. PATENT DOCUMENTS

| | | | |
|---|---|---|---|
| 2,237,202 | A | 4/1941 | Strattan |
| 4,242,726 | A | 12/1980 | Steadman |

(Continued)

FOREIGN PATENT DOCUMENTS

| | | | |
|---|---|---|---|
| CN | 204460117 | U | 7/2015 |
| CN | 204717373 | U | 10/2015 |

(Continued)

OTHER PUBLICATIONS

International Search Report and Written Opinion for Application No. PCT/US2017/058679 dated Feb. 19, 2018 (11 pages).

(Continued)

*Primary Examiner* — Jason M Han
(74) *Attorney, Agent, or Firm* — Michael Best & Friedrich LLP

(57) ABSTRACT

A site light including a body, a power system with an AC input and battery terminal, and a telescopic arm assembly supported by the body, where the telescopic arm includes a first end fixed relative to the body and a second end opposite and movable with respect to the first end. The site light also includes a light assembly in operable communication with the power system and coupled to and movable together with the second end of the telescopic arm, where the light assembly is operable in a first light mode in which the light assembly outputs approximately 13,000 lumens of light, and a second light mode in which the light assembly outputs approximately 20,000 lumens of light.

17 Claims, 62 Drawing Sheets

Related U.S. Application Data continuation of application No. 15/978,790, filed on May 14, 2018, now Pat. No. 11,143,389.

(51) Int. Cl.

| | |
|---|---|
| ***F21V 17/02*** | (2006.01) |
| ***F21V 21/06*** | (2006.01) |
| ***F21V 21/108*** | (2006.01) |
| ***F21V 21/22*** | (2006.01) |
| ***F21V 23/00*** | (2015.01) |
| ***F21V 29/508*** | (2015.01) |
| ***F21V 29/67*** | (2015.01) |
| ***F21W 131/10*** | (2006.01) |
| ***F21Y 115/10*** | (2016.01) |

(52) U.S. Cl.

CPC ............ *F21V 21/06* (2013.01); *F21V 21/108* (2013.01); *F21V 21/22* (2013.01); *F21V 23/002* (2013.01); *F21V 29/508* (2015.01); *F21V 29/67* (2015.01); *F21W 2131/1005* (2013.01); *F21Y 2115/10* (2016.08)

(58) Field of Classification Search

CPC .... F21V 29/508-67; F21W 2131/1005; F21Y 2115/10

See application file for complete search history.

(56) References Cited

U.S. PATENT DOCUMENTS

| | | | |
|---|---|---|---|
| 4,421,209 | A | 12/1983 | Vermette et al. |
| 5,065,299 | A | 11/1991 | Cohen |
| 5,222,705 | A | 6/1993 | Gibran et al. |
| 7,654,710 | B2 | 2/2010 | William et al. |
| 8,599,097 | B2 | 12/2013 | Intravatola |
| 9,484,602 | B1 | 11/2016 | Podolefsky |
| 9,567,899 | B2 | 2/2017 | McKinley et al. |
| 2003/0174494 | A1 | 9/2003 | Chernick |
| 2006/0086871 | A1 | 4/2006 | Joseph et al. |
| 2008/0212319 | A1 | 9/2008 | Klipstein |
| 2009/0110527 | A1 | 4/2009 | Kardohely |
| 2010/0220489 | A1 | 9/2010 | Konop |
| 2011/0228524 | A1 | 9/2011 | Greer |
| 2012/0201015 | A1 | 8/2012 | Robertson et al. |
| 2012/0201016 | A1 | 8/2012 | Robertson et al. |
| 2014/0085882 | A1 | 3/2014 | Clifford |
| 2015/0192243 | A1 | 7/2015 | Sharrah et al. |
| 2015/0330558 | A1 | 11/2015 | Intravatola |
| 2016/0209015 | A1 | 7/2016 | Mumma et al. |
| 2016/0223185 | A1 | 8/2016 | Harvey et al. |
| 2016/0298831 | A1 | 10/2016 | Fang |
| 2017/0259730 | A1 | 9/2017 | Carroll |
| 2018/0119935 | A1 | 5/2018 | Proeber et al. |

FOREIGN PATENT DOCUMENTS

| | | | |
|---|---|---|---|
| EP | 3392548 | A1 | 10/2018 |
| JP | S54128262 | U | 9/1979 |
| JP | S63188811 | U | 12/1988 |
| JP | H11-7827 | A1 | 1/1999 |
| JP | 2888418 | B2 | 5/1999 |
| JP | 2006160500 | A | 6/2006 |
| KR | 20020075357 | A | 10/2002 |
| KR | 1020020075357 | | 10/2002 |
| KR | 20040008242 | A | 1/2004 |
| KR | 1020090126434 | A | 12/2009 |

OTHER PUBLICATIONS

International Search Report and Written Opinion for Application No. PCT/US2019/031670 dated Aug. 29, 2019 (12 pages).

United States Patent Office Non-final Office Action for U.S. Appl. No. 15/795,486 dated Jan. 10, 2020 (7 pages).

European Patent Office Supplementary Search Report for Application No. 17866083.3 dated Mar. 5, 2020 (15 pages).

European Patent Office Extended Search Report for Application No. 17866083.3 dated Jun. 10, 2020 (17 pages).

Examination Report No. 1 issued by the Australian Government for Application No. 2019270921 dated Jul. 16, 2021 (4) pages).

Partial Supplementary European Search Report for Application No. 19804525.4 dated Jan. 20, 2022 (22 pages).

Examination Report No. 2 issued by the Australian Government for Application No. 2019270921 dated Mar. 25, 2022 (4 pages).

Extended European Search Report for Application No. 19804525.4 dated Apr. 25, 2022 (18 pages).

Extended European Search Report for Application No. 22178870.6 dated Sep. 2, 2022 (11 pages).

SITE LIGHT

CROSS-REFERENCE TO RELATED APPLICATIONS

This application is a continuation of U.S. patent application Ser. No. 17/466,798 filed Sep. 3, 2021, now U.S. Pat. No. 11,674,673 which is a continuation of U.S. patent application Ser. No. 15/978,790 filed May 14, 2018, now U.S. Pat. No. 11,143,389, the entire contents of each of which are incorporated herein by reference.

FILED OF THE INVENTION

The present disclosure relates to site lights for illuminating a jobsite, such as a construction site and the like.

BACKGROUND OF THE INVENTION

Mobile light systems are generally used in construction and other instances where permanent lighting is not readily available. In such instances, current light systems are generally limited in their ability to compensate for the difficulties of working in remote areas such as, for example, uneven terrain, the lack of an external power source, and movement within the site.

SUMMARY OF THE INVENTION

In one aspect, the invention provides a site light including a body, an arm coupled to the body having an adjustable arm length, a light assembly coupled to the arm opposite the body, and a drive mechanism with a crank arm rotatable about a first axis, where rotating the crank arm in a first direction causes the arm length to increase, and where rotating the crank arm in a second direction causes the arm length to decrease. The site light also includes a damper assembly in operable communication with the drive mechanism, where the damper assembly resists rotation of the drive mechanism when the crank arm rotates in the second direction, and where the damper assembly does not resist the rotation of the drive mechanism when the crank arm rotates in the first direction.

In another aspect, the invention provides a site light including a body, an arm coupled to the body having an adjustable arm length, a light assembly coupled to the arm opposite the body, and a drive mechanism. The drive mechanism including a shaft defining a first axis, where rotating the shaft about the first axis causes the arm length to change, a handle coupled to and rotatable together with the shaft, a clutch assembly, and a one-way bearing coupled to both the shaft and the clutch assembly such that the one-way bearing transmits force between the shaft and the clutch assembly when the shaft is rotated in a first direction, and where the one-way bearing does not transmit force between the shaft and the clutch assembly when the shaft is rotated in a second direction different than the first direction.

In another aspect, the invention provides a site light including a body, a light assembly coupled to the body, and a leg assembly coupled to the body and including a contact surface, where the leg assembly is adjustable between a stowed position and one or more deployed positions, where the leg assembly includes a first lock mechanism configured to selectively secure the leg assembly in a respective one of the one or more deployed configurations, and a second lock mechanism configured to selectively secure the leg assembly in the stowed position.

In another aspect, the invention provides a site light includes a body, a light assembly coupled to the body, a first leg assembly coupled to the body and including a first contact surface, where the first leg assembly is adjustable between a stowed position and one or more deployed positions, and where the first leg assembly includes a first lock mechanism configured to selectively secure the first leg assembly in the stowed position, and a second leg assembly coupled to the body and including a second contact surface, where the second leg assembly is adjustable between a stowed position and one or more deployed positions, and where the second leg assembly includes a second lock mechanism configured to selectively secure the second leg assembly in the stowed position, and where the first lock mechanism and the second lock mechanism are operable independently.

In another aspect, a site light including a body, a power system with an AC input and battery terminal, a telescopic arm assembly supported by the body, where the telescopic arm includes a first end fixed relative to the body and a second end opposite and movable with respect to the first end, and a light assembly in operable communication with the power system and coupled to and movable together with the second end of the telescopic arm, where the light assembly is operable in a first light mode in which the light assembly outputs approximately 13,000 lumens of light, and a second light mode in which the light assembly outputs approximately 20,000 lumens of light.

In another aspect, a site light including a body, a power system with a battery terminal, a telescopic arm assembly supported by the body, where the telescopic arm includes a first end fixed relative to the body and a second end opposite and movable with respect to the first end, a carriage coupled to the second end of the telescopic arm, where the carriage has two degrees of freedom of movement relative to the second end of the telescopic arm, and a plurality of light pods, each light pod coupled to and movable with respect to the carriage, where each light pod of the plurality of light pods is movable independent of the other light pods, and where each light pod has two degrees of freedom of movement relative to the carriage.

In another aspect, a site light includes a body, a power system, where the power system includes a battery terminal, a rechargeable battery couplable to the battery terminal, a telescopic arm assembly supported by the body, where the telescopic arm includes a first end fixed relative to the body and a second end opposite and movable with respect to the first end, a light assembly in operable communication with the power system and coupled to and movable together with the second end of the telescopic arm, and where the light assembly is operable to output approximately 20,000 lumens of light for at least one hour.

Other aspects of the disclosure will become apparent by consideration of the detailed description and accompanying drawings.

Before any constructions of the disclosure are explained in detail, it is to be understood that the disclosure is not limited in its application to the details of construction and the arrangement of components set forth in the following description or illustrated in the following drawings. The disclosure is capable of other constructions and of being practiced or of being carried out in various ways.

DETAILED DESCRIPTION

Figure 3:
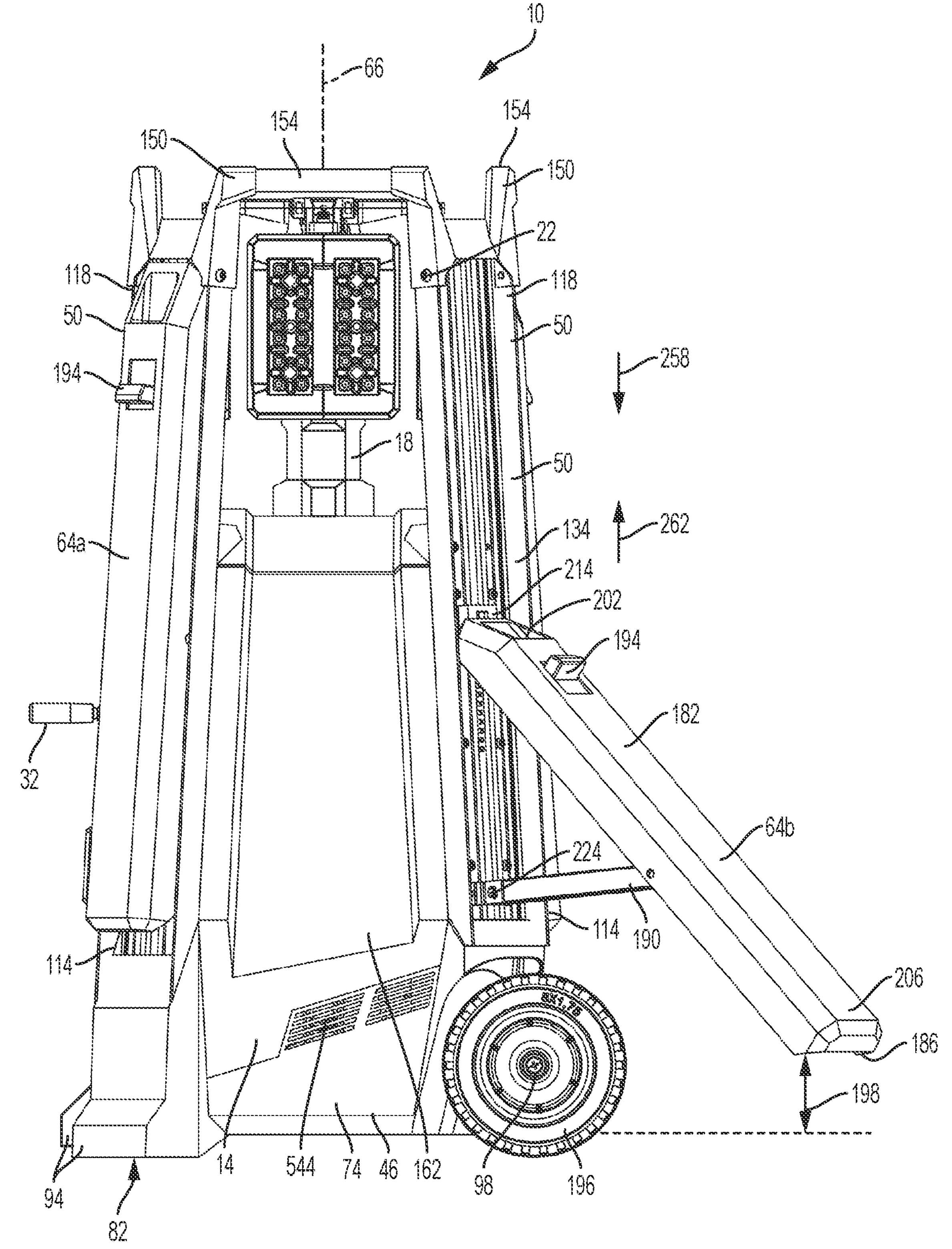
FIG. 3 is a side view of the site light of FIG. 1.
Figure 4:
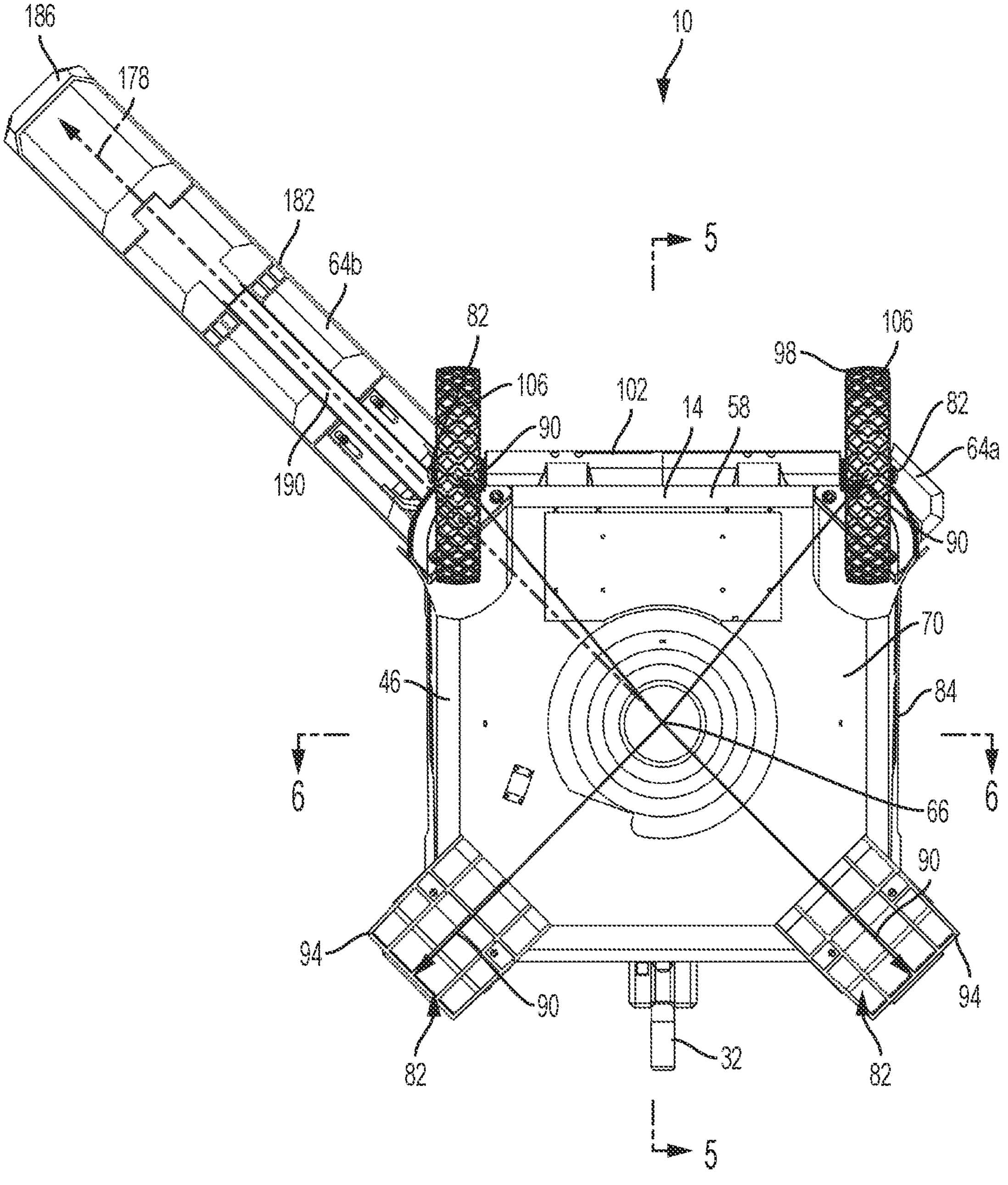
FIG. 4 is a bottom view of the site light of FIG. 1.
Figure 5:
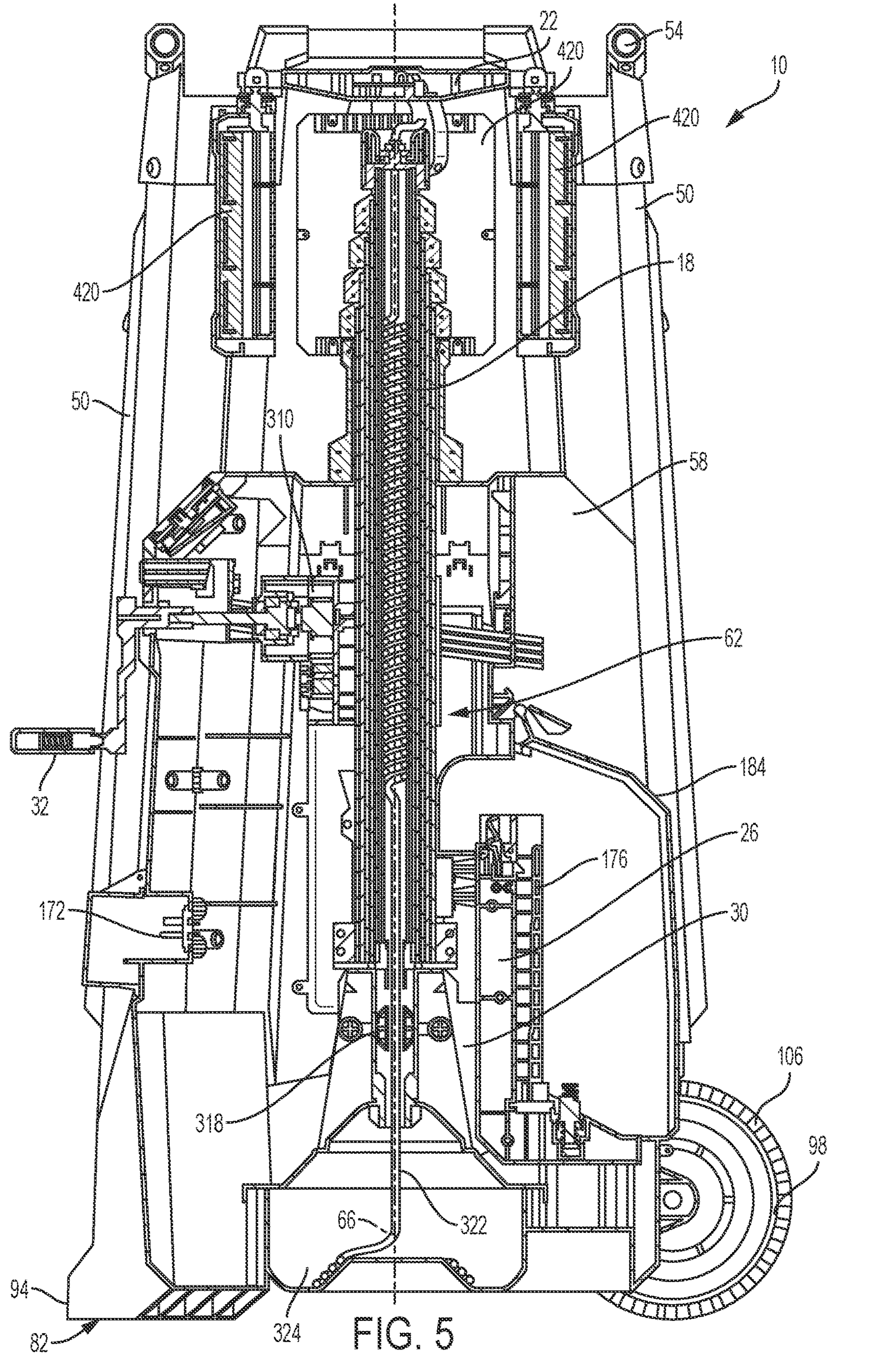
FIG. 5 is a section view of the site light of FIG. 1 taken along line 5-5 of FIG. 4.

FIGS. 1-6 illustrate a mobile site light 10 for illuminating a jobsite, such as a construction site, or other large area. The site light 10 includes a body 14, a telescopic arm assembly 18 supported by the body 14, and a light assembly 22 coupled to the telescopic arm assembly 18 and movable relative to the body 14. As shown in FIG. 5, the site light 10 also includes a power system 26 to provide electrical power to the light assembly 22, and a cooling system 30 to regulate the temperature of the power system 26 and the other components of the site light 10.

Figure 1:
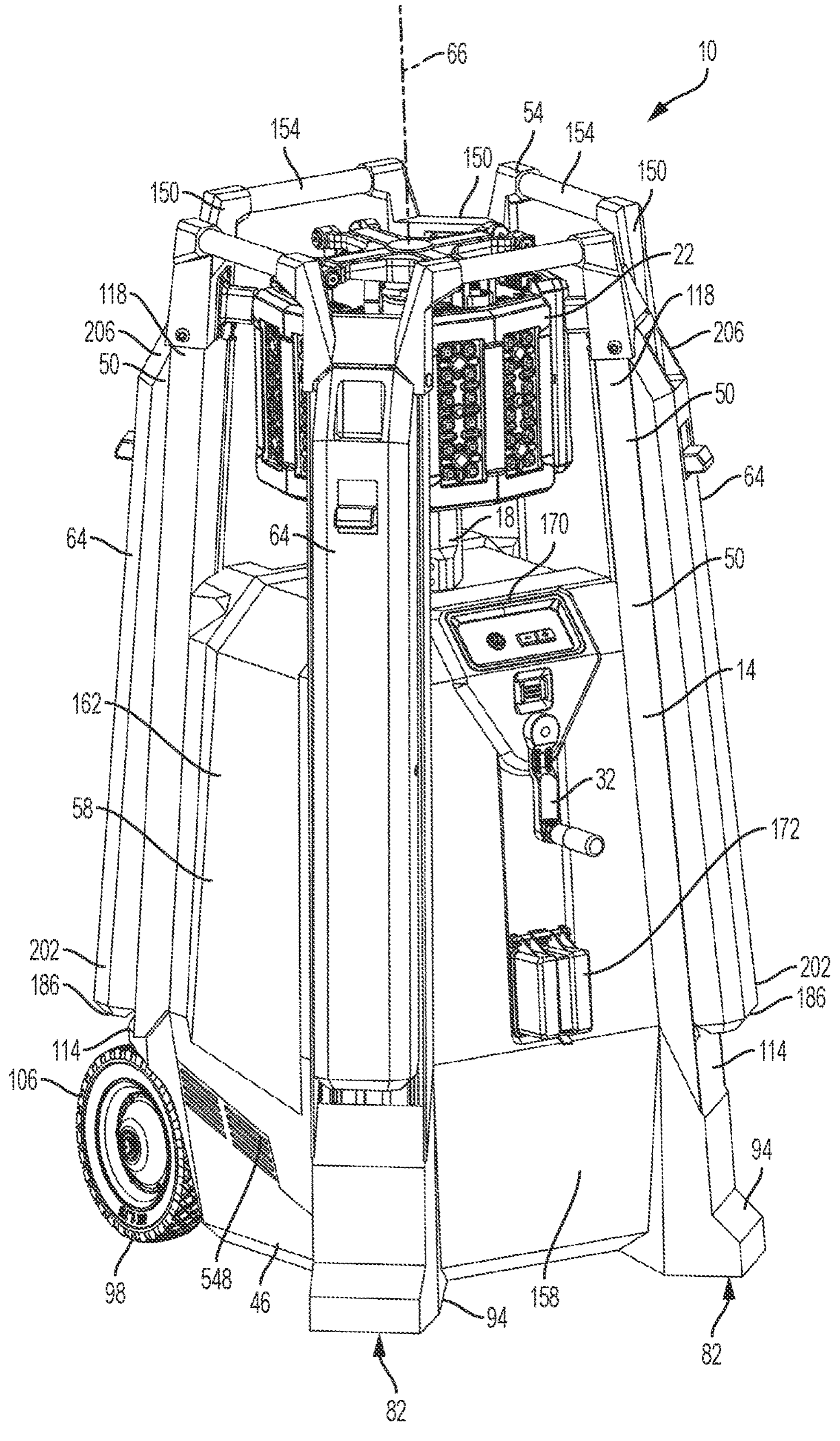
FIG. 1 is a perspective view of a site light according to one construction of the disclosure.
Figure 7:
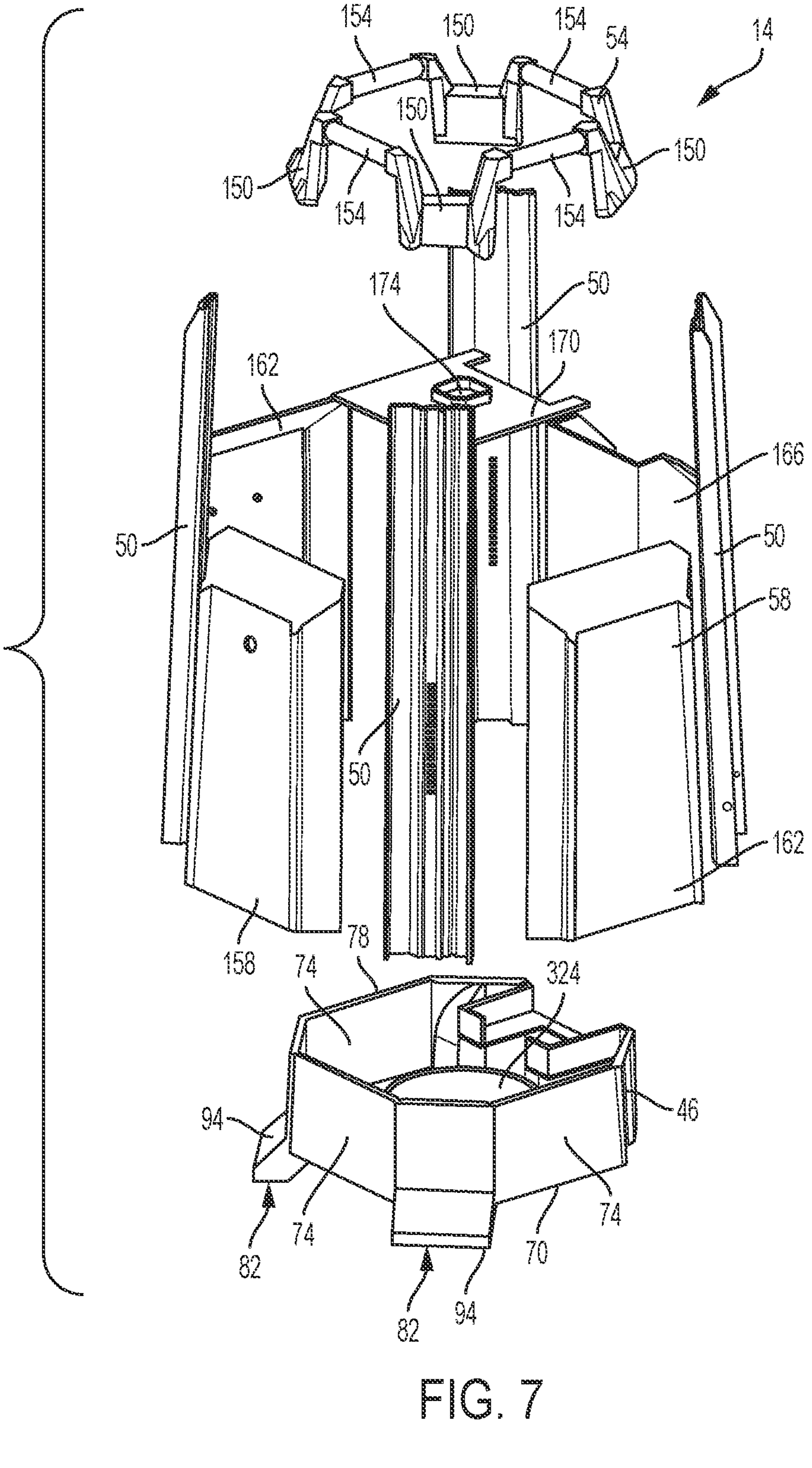
FIG. 7 is an exploded view of a body of the site light of FIG. 1.

Illustrated in FIG. 7, the body 14 of the site light 10 includes a base 46, a plurality of channels 50 coupled to the base 46, a handle assembly 54 coupled to the channels 50 opposite the base 46, and a housing 58 (FIG. 5) supported by the channels 50 to at least partially define a housing volume 62 therein. As shown in FIG. 1, the body 14 also includes one or more leg assemblies 64 coupled thereto and configured to provide additional stability and support for the body 14 during use. The body 14 also defines an axis 66 (FIG. 5) extending therethrough. For operation, the body 14 of the site light 10 is generally placed in an "upright orientation" whereby the axis 66 is maintained in a substantially vertical orientation.

Referring back to FIG. 7, the base 46 of the body 14 includes a bottom wall 70 and a plurality of side walls 74 extending upwardly from the bottom wall 70 to define an open end 78. The base 46 also includes one or more contact surfaces 82 configured to contact a support surface 86 (e.g., the ground) when the body 14 is in the upright orientation. As shown in FIG. 4, each contact surface 82 also defines an individual support radius 90. For the purposes of this application, the support radius 90 of a particular contact surface 82 is defined as the maximum radial distance between the axis 66 and the relevant contact surface 82. Together, the contact surfaces 82 of the base 46 also define an average base support radius (ABSR). The base 46 also defines a "footprint 84" defined as the axial projection of the radially outermost perimeter of the base 46 (see FIG. 4).

Referring back to FIG. 1, the base 46 also includes one or more integrally formed feet 94, each extending radially outwardly from the side walls 74 of the base 46 to define a respective contact surface 82 (FIG. 4). Together, the feet 74 are configured to provide stability to the site light 10 by positioning the contact surfaces 82 at an increased radial distance from the axis 66, thereby increasing the ABSR.

Figure 2:
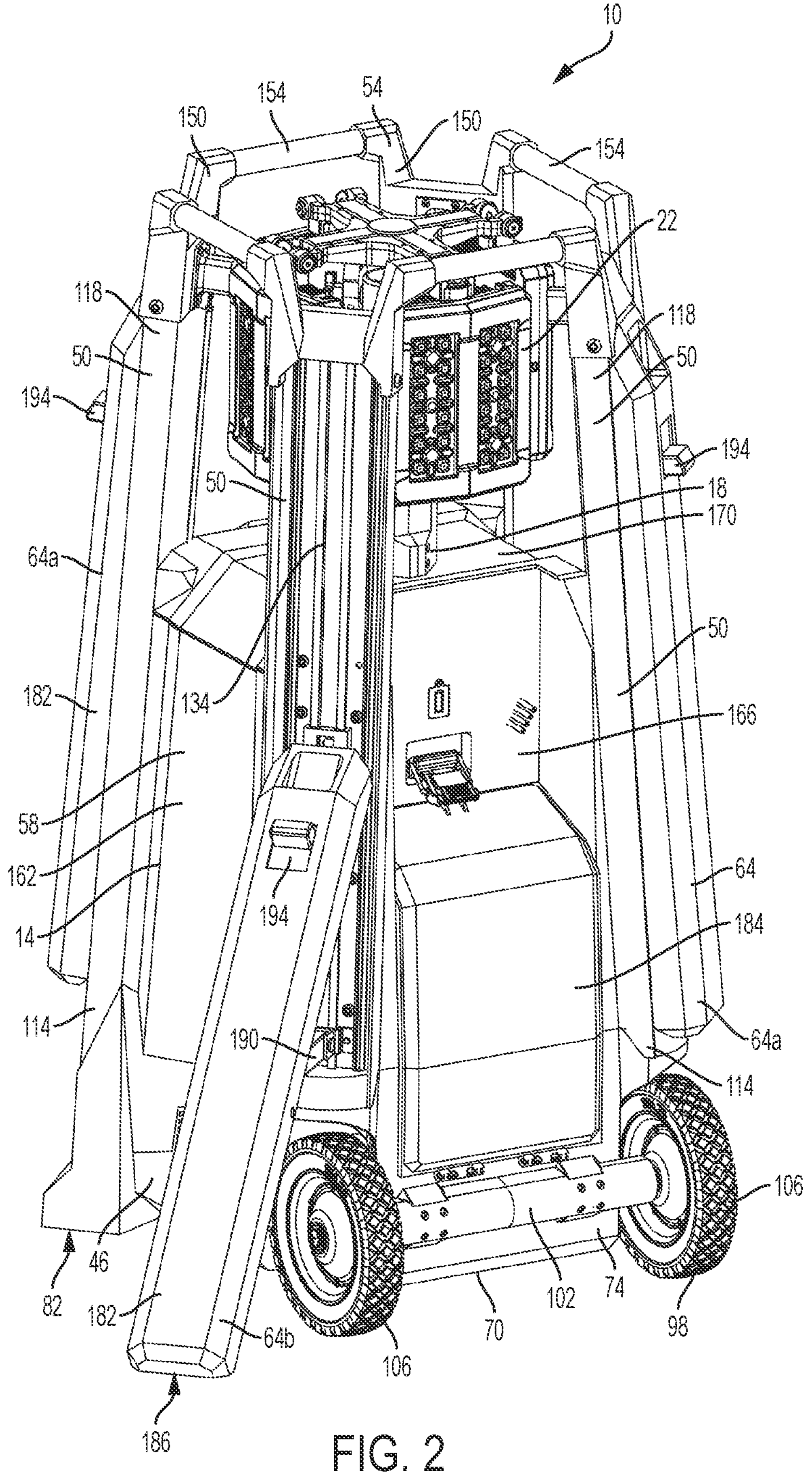
FIG. 2 is a rear perspective view of the site light of FIG. 1.

As shown in FIG. 2, the base 46 of the body 14 also includes a wheel assembly 98 coupled to the base 46 opposite the integrally formed feet 94. The wheel assembly 98 includes an axle support 102 fixedly coupled to the base 46, and a pair of wheels 106 rotatably supported by the axle support 102 and rotatable with respect thereto. During use, the wheels 106 allow the user to roll the site light 10 across the support surface 86. As such, the wheels 106 are sized to allow the wheels 106 to roll over uneven ground and small debris, such as but not limited to, gravel, rocks, extension cords, and the like. Furthermore, the wheels 106 are positioned so that when the site light 10 is in the upright orientation, each wheel 106 contacts the support surface 86 and forms a corresponding contact surface. In the illustrated embodiment, the base 46 includes two wheels 106; however in alternative embodiments, different numbers of wheels 106 may be used.

Figure 8:
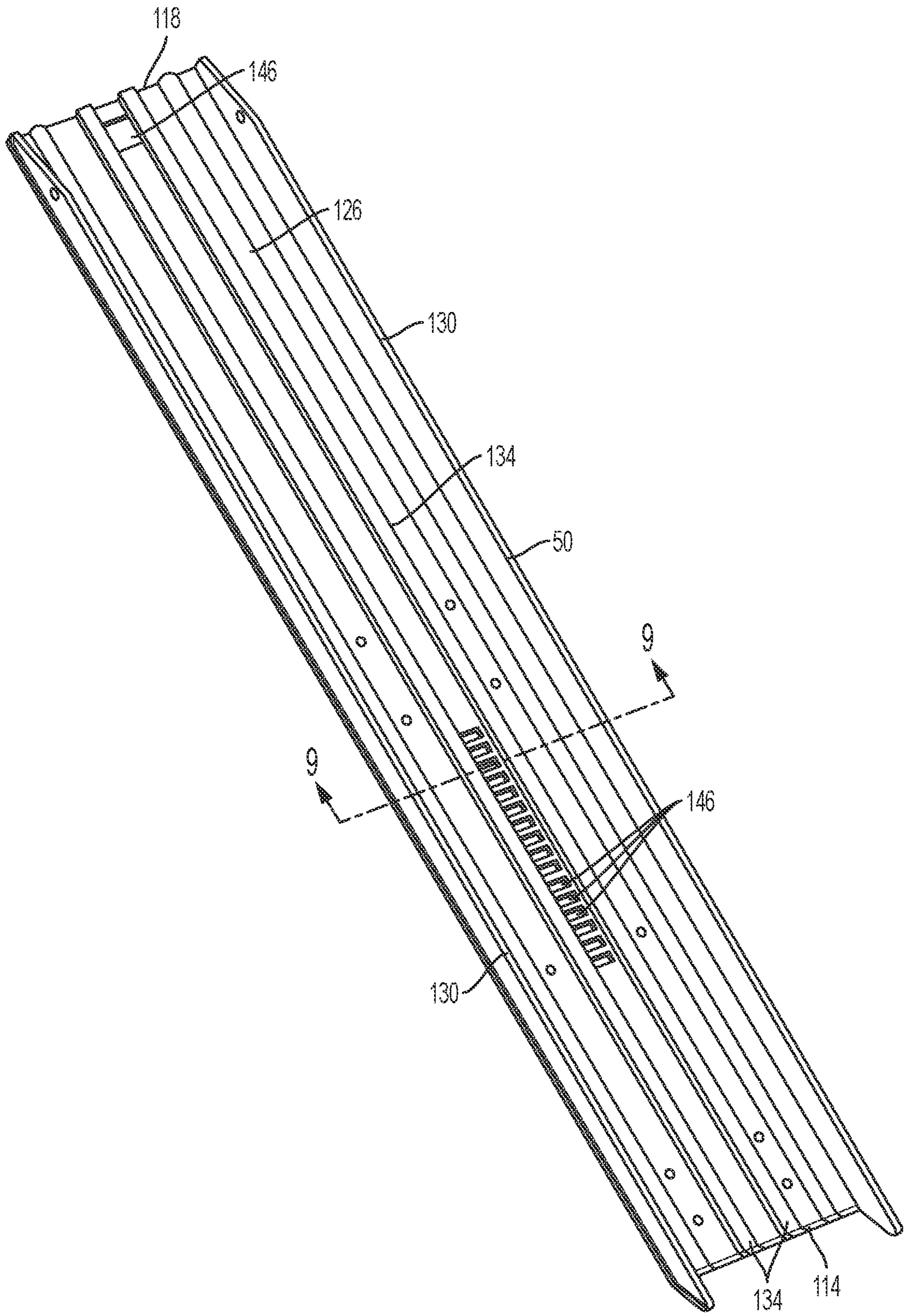
FIG. 8 is a perspective view of a channel of the body of FIG. 7.

Illustrated in FIG. 8, the channels 50 of the body 14 are each coupled to and extend from the open end 78 of the base 46 substantially parallel to the axis 66. Each channel 50 includes a first end 114 coupled to the open end 78 of the base 46, and the second end 118 opposite the first end 114. During use, each channel 50 is configured to provide a mounting location for a respective leg assembly 64 (described below) as well as provide structure and rigidity to the body 14.

Figure 9:
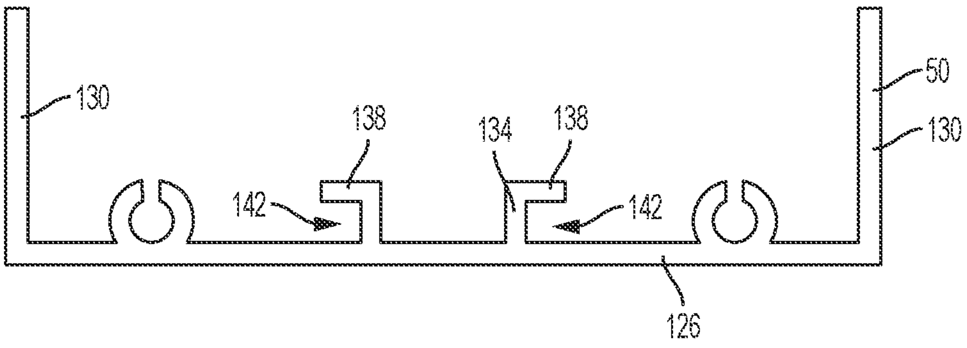
FIG. 9 is a section view taken along line 9-9 of FIG. 8.

As shown in FIG. 9, the cross-sectional shape of each channel 50 is substantially "U" shaped including a bottom wall 126 and a pair of side walls 130 extending upwardly from the bottom wall 126 on opposite sides thereof. Each channel 50 also includes a track 134 extending along the length of the channel 50 and configured to slidingly support a portion of a corresponding leg assembly 64 thereon (described below). In the illustrated embodiment, the track 134 includes two "L" shaped members 138 formed integrally with the bottom wall 126 of the channel 50 to form a pair of opposing grooves 142 therewith. The channel 50 also includes a pair of C-shaped grooves 136 extending parallel to the track 134.

Referring back to FIG. 8, each channel 50 also defines a plurality of locking apertures 146 each spaced along the length thereof and configured to selectively receive a portion of a corresponding leg assembly 64 therein. In the illustrated embodiment, the locking apertures 146 are generally rectangular in shape and are spaced at equal intervals along a portion of the length of the channel 50.

Illustrated in FIG. 7, the handle assembly 54 of the body 14 is coupled to and extends between the second ends 118 of each channel 50. The handle assembly 54 includes a set of end members 150 each coupled to a second end 118 of a respective channel 50, and a set of grips 154 each extending between and coupled to adjacent end members 150. Once assembled, the grips 154 and end members 150 form a substantially rigid unit that provides rigidity and strength to the body 14 while also providing multiple locations where the user may grasp the body 14 and maneuver the site light 10 during use.

With continued reference to FIG. 7, the housing 58 of the body 14 is coupled to and supported by the channels 50 and the base 46 to at least partially define the housing volume 62 therein. In the illustrated embodiment, the housing 58 includes a front panel 158, a pair of side panels 162, a back panel 166, and a top panel 170. The top panel 170, in turn, defines an aperture 174 configured to at least partially support and position the telescopic arm assembly 18 co-axial with the axis 66. The housing 58 may also include an AC power input 172 (FIG. 2) formed into one of the panels 158, 162, 166.

Figure 10:
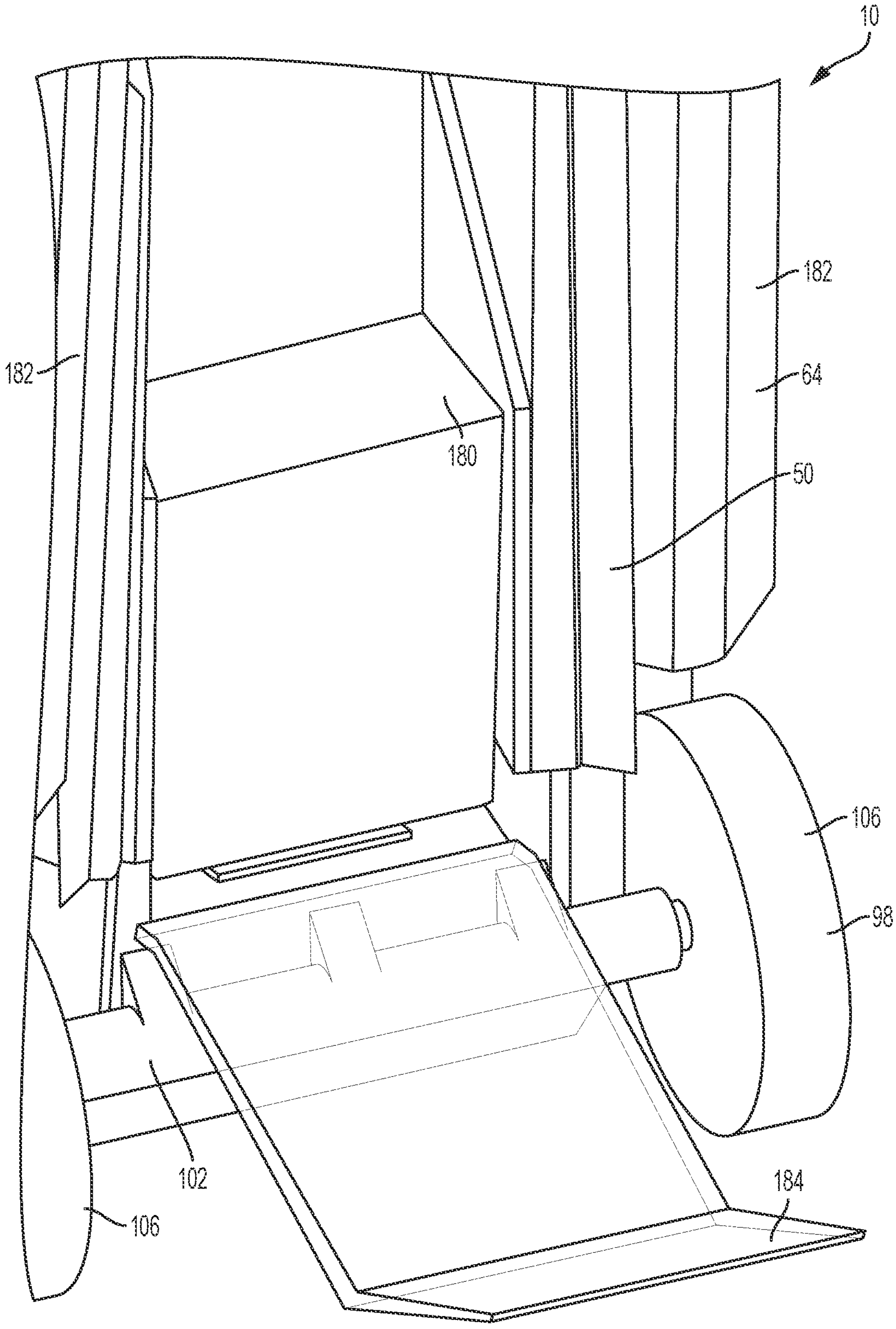
FIG. 10 is a detailed rear view of the site light of FIG. 1.

As shown in FIG. 10, the back panel 166 of the housing 58 also includes a battery terminal 176 sized and shaped to receive a rechargeable battery 180 therein. The back panel 166 also includes a door 184 to selectively enclose the battery terminal 176 and seal it off from the surrounding elements. More specifically, the door 184 may include a seal (not shown) to engage the back panel 166 and form a seal therewith when the door 184 is in a closed position.

Illustrated in FIGS. 1-4 and 11-13, the site light 10 includes one or more deployable leg assemblies 64 each coupled to a respective channel 50 of the body 14 and configured to selectively engage the support surface 90 radially outside the footprint of the base 46 to produce a leg support radius 178. Together, the leg assemblies 64 produce an average leg support radius (ALSR) that is greater than the ABSR.

Each leg assembly 64 includes a leg 182 with a contact surface 186, an intermediate member 190 extending between and coupled to the leg 182 and the channel 50, and a lock mechanism 194. During use, each leg assembly 64 is independently adjustable between a retracted or stowed position (see leg assembly 64*a* of FIG. 2), where the contact surface 186 of the leg 182 is positioned radially inside the footprint 84 of the base 46 and not in contact with the support surface 90, and one or more deployed positions (see leg assembly 64*b* of FIG. 2), where the contact surface 186 of the leg 182 is positioned radially outside the footprint 84 of the base 46 and in contact with the support surface 90. In the illustrated embodiment, each deployed position generally corresponds with a different axial offset height 198 (FIG. 3) from the base 46 of the body 14. As such, the leg assemblies 64 can accommodate and compensate for variations in ground height while maintaining the axis 66 of the body 14 in a substantially vertical orientation.

Figure 11:
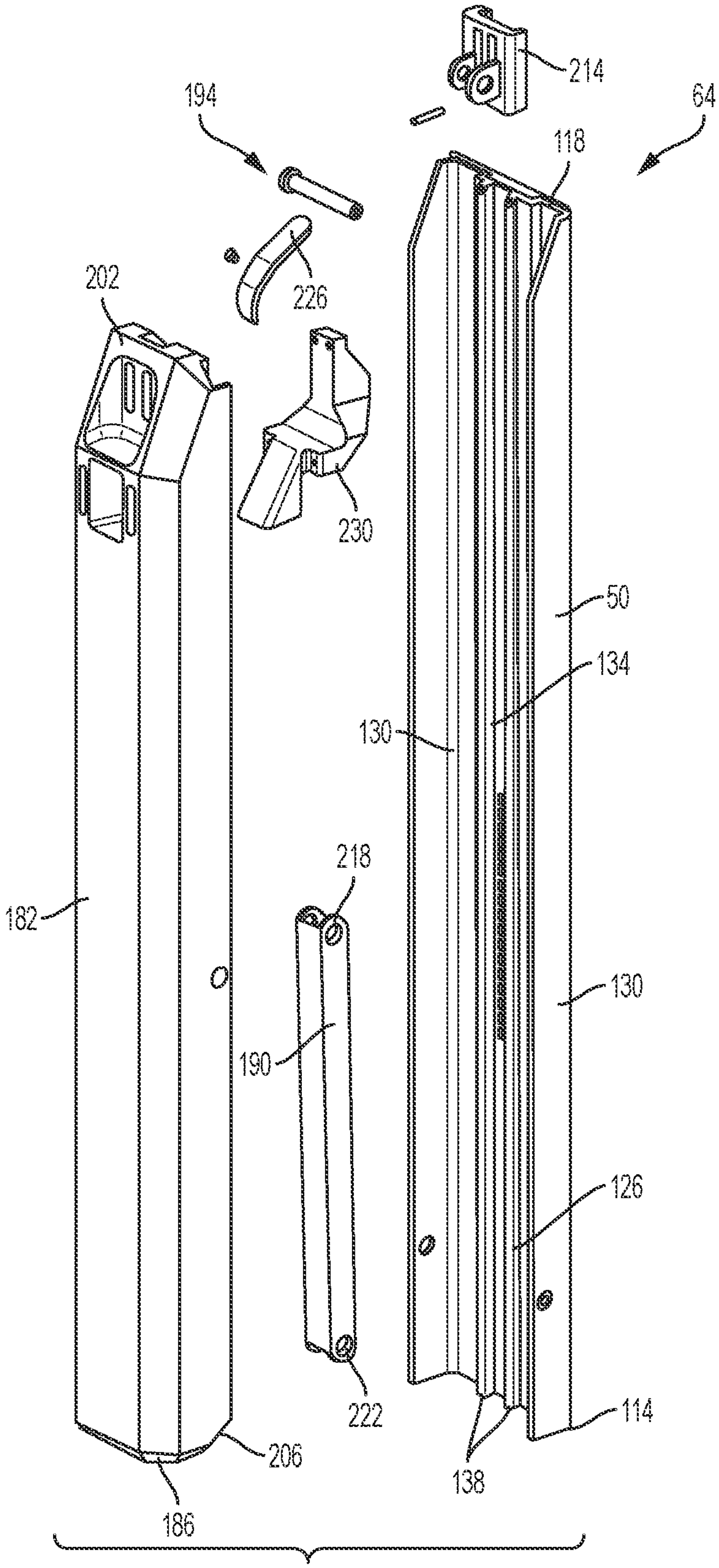
FIG. 11 is an exploded view of a leg assembly of the site light of FIG. 1.

Each leg 182 of a corresponding leg assembly 64 is substantially elongated in shape having a first end 202 slidably coupled to the channel 50, and a second end 206 opposite the first end 202 that forms the contact surface 186. In the illustrated embodiment, the first end 202 of the leg 182 is coupled to and movable along the track 134 of the channel 50 via a slider 214. As shown in FIG. 11, the slider 214, in turn, is pivotably coupled to the first end 202 of the leg 182 and includes a substantially "C" shaped cross-sectional shape configured to be wrapped around the generally "T" shaped track 134 of the channel 50 for a sliding relationship therewith. The leg 182, upon release or deployment, can fall due to gravity towards the support surface until contact with the support surface is achieved, which stops and may lock the legs 182 automatically or require the operator to operate the lock mechanism.

The intermediate member 190 of each leg assembly 64 is substantially elongated in shape and includes a first end 218 pivotably coupled to the leg 182, and a second end 222 pivotably coupled to the channel 50 via a mount 224 (FIG. 3). The mount 224, in turn, is fixedly coupled to the channel 50 proximate the first end 114 thereof. In the illustrated embodiment, the length of the intermediate member 190 is fixed; however in alternative embodiments, the length of the intermediate member 190 may be adjustable to vary the radial distance between the second end 222 (i.e., the contact surface 186) and the axis 66.

The lock mechanism 194 of each leg assembly 64 is coupled to a corresponding leg 182 proximate the first end 202 and is configured to selectively control the movement of the first end 202 of the leg 182 along the track 134 of the channel 50. The lock mechanism 194 includes a lock element 226 selectively engageable with the channel 50, and a latch 230. During use, the lock mechanism 194 is adjustable between a locked configuration (see FIG. 12), where the first end 202 of the leg 182 is fixed relative to the channel 50, and an unlocked configuration (see FIG. 13), where the first end 202 of the leg 182 is movable along the track 134 of the channel 50.

The lock element 226 of the lock mechanism 194 includes an elongated member pivotable with respect to the leg 182 having a lock end 234, and an engagement end 238 opposite the lock end 234. During use, the lock element 226 is movable between an engaged position (see FIG. 12), where the lock end 234 is at least partially received within a corresponding locking aperture 146 of the channel 50, and a disengaged position (see FIG. 13), where the lock end 234 is not positioned within a corresponding locking aperture 146 of the channel 50. In the illustrated embodiment, the lock element 226 is biased toward the engaged position by a biasing member 250.

The latch 230 of the lock mechanism 194 is slidably mounted to the leg 182 and includes a cam portion 254 configured to selectively engage the lock element 226. During use, the user manipulates the latch 230 moving it between a first position (see FIG. 12), where the cam portion 254 does not exert an extra force on the lock element 226, and a second position (see FIG. 13), where the cam portion 254 contacts the engagement end 238 of the lock element 226 and biases the lock element 226 into the disengaged position.

Figure 12:
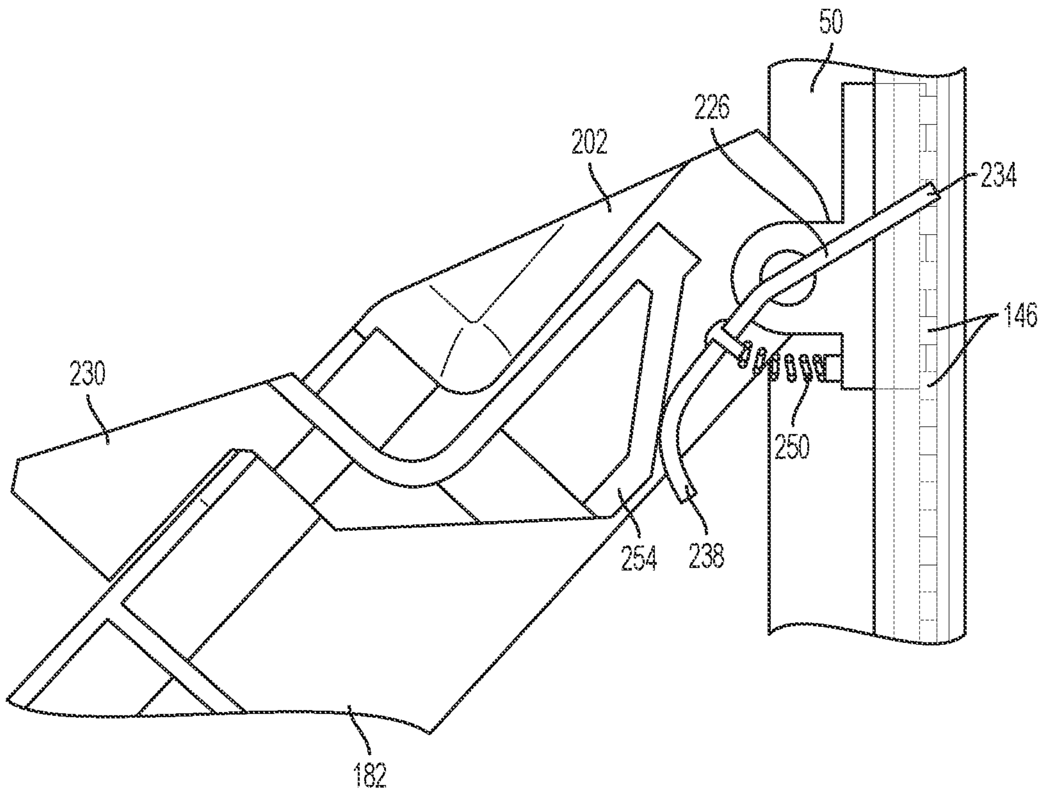
FIG. 12 is a detailed section view of a locking assembly of the leg assembly of FIG. 11 with the locking assembly in the locked configuration.
Figure 13:
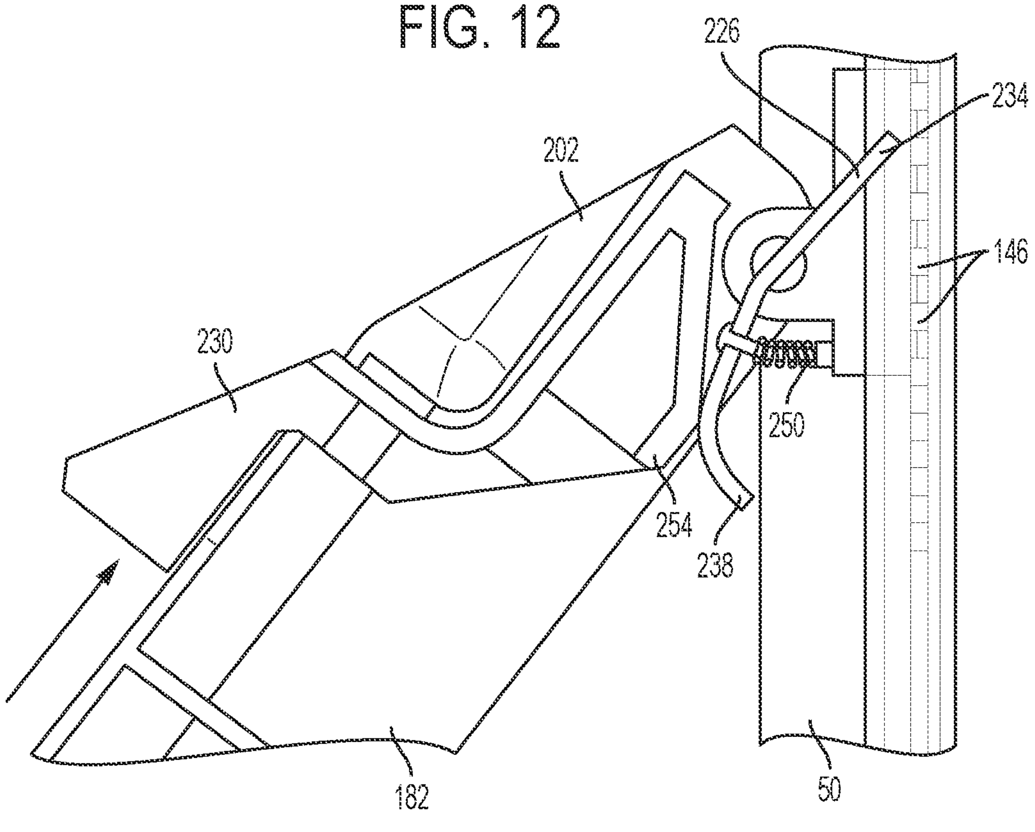
FIG. 13 is a detailed section view of the locking assembly of FIG. 12 with the locking assembly in the unlocked configuration.

To deploy a particular leg assembly 64 that is initially locked in the retracted position, the user first moves the latch 230 from the first position (see FIG. 12) to the second position (see FIG. 13). By doing so, the cam portion 254 of the latch 230 pushes the engagement end 238 of the lock element 226, biasing the lock element 226 into the disengaged position and thereby placing the lock mechanism 194 into the unlocked configuration. As such, the first end 202 of the leg 182 is free to slide along the track 134 of the channel 50.

Once the lock mechanism 194 is in the unlocked configuration, the first end 202 of the leg 182 may slide toward the first end 114 of the channel 50. By doing so, the second end 206 of the leg 182 is biased radially outwardly and axially in a downward direction 258 by the pivoting action of the intermediate member 190. The first end 202 of the leg 182 continues to slide toward the first end 114 of the channel 50 until the contact surface 186 of the leg 182 rests on the support surface 86.

After the contact surface 186 rests on the support surface 86, the user then moves the latch 230 back to the first position (see FIG. 13). By doing so, the cam portion 254 reduces the force on the lock element 226, allowing the biasing member 250 to bias the lock element 226 into the locked position where the lock end 234 of the lock element 226 is positioned within the aligned locking aperture 146 of the channel 50. Once the lock end 234 is positioned in the locking aperture 146, the lock mechanism 194 enters the locked configuration (see FIG. 12). As such, the first end 202 of the leg 182 is fixed relative to the channel 50.

After a first leg assembly 64 is deployed, the user may then independently deploy each of the remaining leg assemblies 64, causing the contact surfaces 186 of each leg 182 to in contact with the support surface 86. When doing so, each leg assembly 64 may be independently adjusted relative to the other leg assemblies 64 to compensate for uneven terrain.

To stow a leg assembly 64 after it has been deployed, the user moves the latch 230 to the second position (see FIG. 13), thereby placing the lock mechanism 194 in the unlocked configuration as described above. Once unlocked, the user is able to move the first end 202 of the leg 182 along the track 134 and toward the second end 206 of the channel 50. By doing so, the contact surface 186 of the leg 182 is moved radially inwardly and axially in an upward direction 262 by the pivoting action of the intermediate member 190. The user continues to move the first end 202 of the leg 182 until the leg 182 returns to the initial stowed position (see leg assembly 64*a* of FIG. 2). The user may then secure the leg 182 in place by moving the latch 230 back into the second position.

Figure 6:
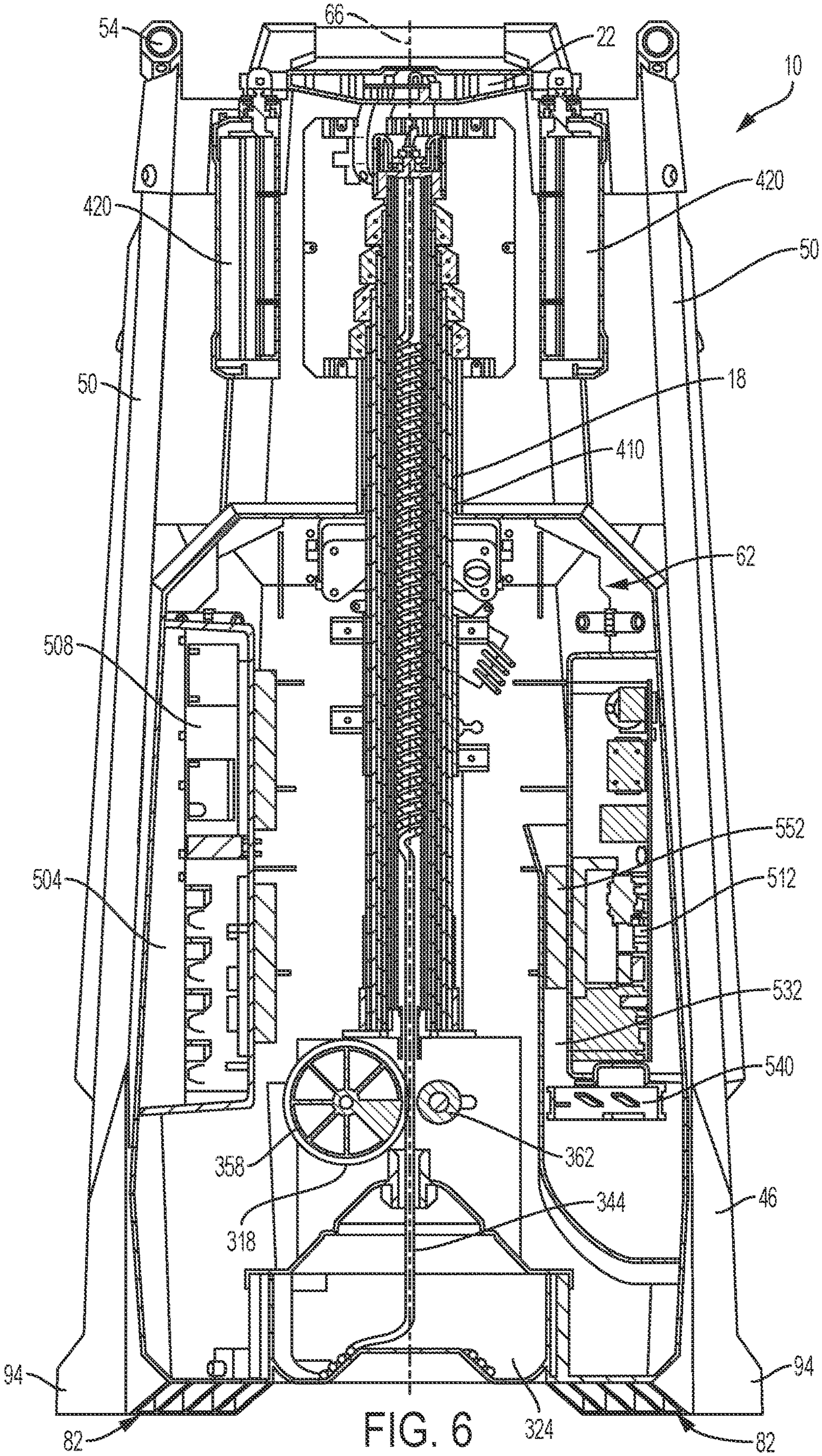
FIG. 6 is a section view of the site light of FIG. 1 taken along line 6-6 of FIG. 4.
Figure 14:
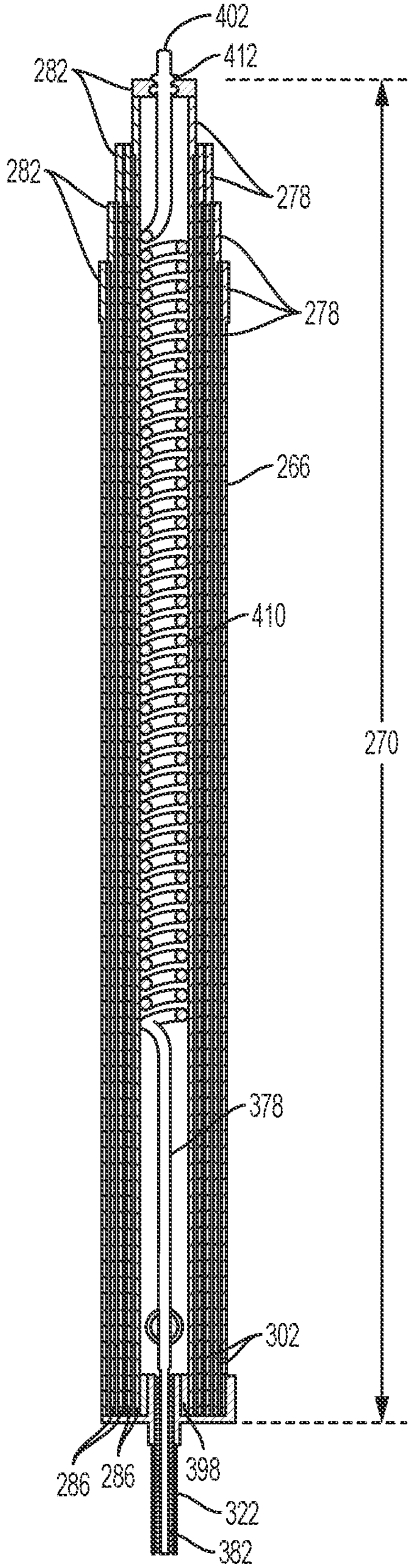
FIG. 14 is a detailed section view of an arm of an arm assembly.
Figure 15:
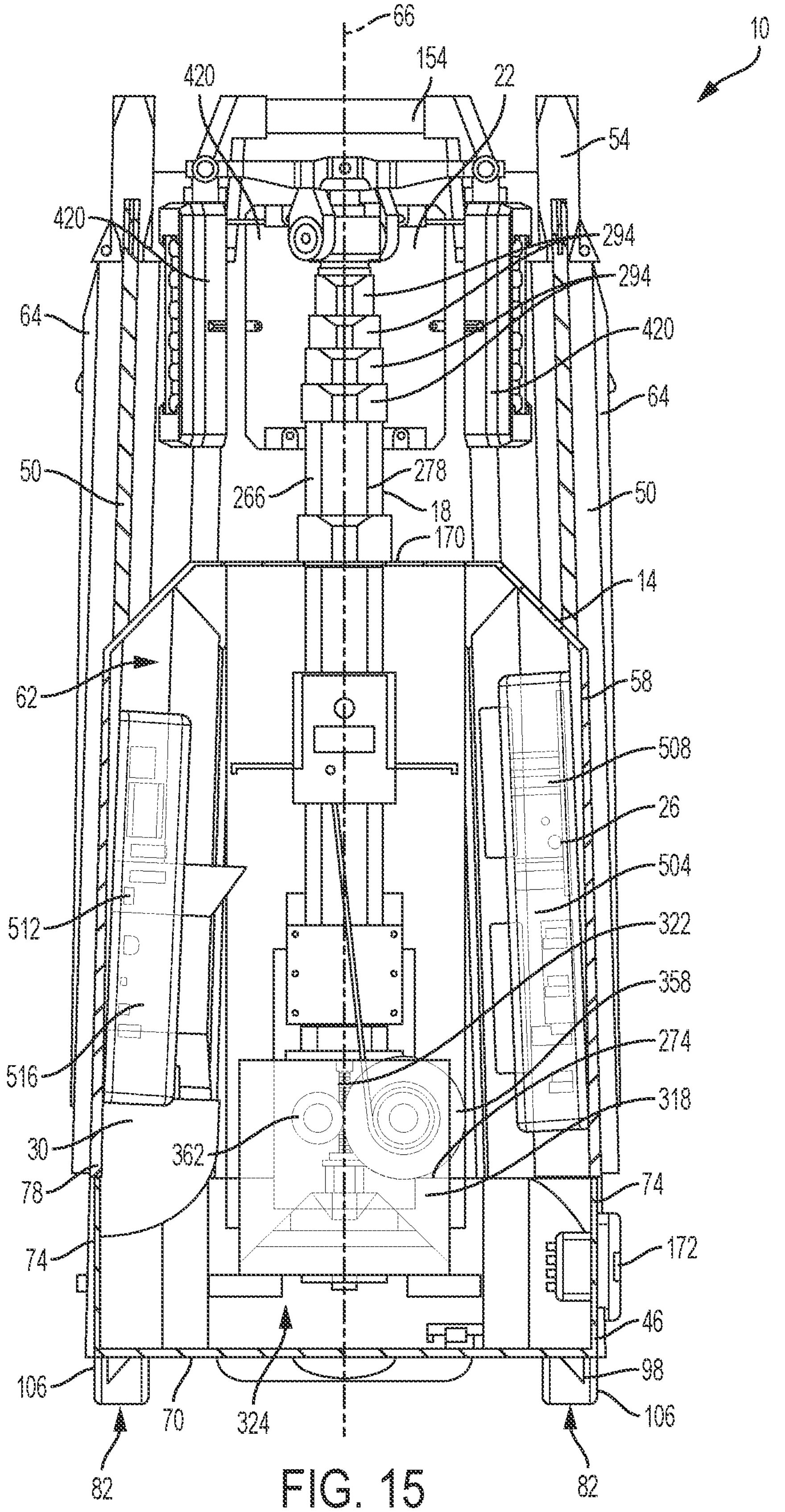
FIG. 15 is a section view taken along line 6-6 of FIG. 4 with some elements removed for clarity.

As illustrated in FIGS. 5, 6, and 14, the telescopic arm assembly 18 of the site light 10 is coupled to the body 14 and configured to alter the axial distance between the light assembly 22 and the base 46 of the body 14. The telescopic arm assembly 18 includes an arm 266 with an adjustable arm length 270, and a drive mechanism 274 (FIG. 15) manually operated by the user and configured to vary the arm length 270. In the illustrated embodiment, the arm 266 of the telescopic arm assembly 18 is positioned co-axial with the axis 66 of the body 14. In the illustrated embodiment, the telescopic arm assembly 18 includes five concentric tubes 278. In other embodiments, the telescopic arm assembly 18 may include fewer or more concentric tubes 278 as necessary.

The arm 266 of the telescopic arm assembly 18 includes the plurality of concentric tubes 278 nested in order of decreasing width with sufficient clearance therebetween to allow each tube 278 to move axially with respect to one another. Each tube 278 is substantially elongated in shape having a first end 282, a second end 286 opposite the first end 282, and defining a channel therethrough. Each tube 278 also includes a polygonal cross-sectional shape restricting relative rotation between the tubes 278 during use. In the illustrated embodiment, the tubes 278 are octagonal in cross-sectional shape; however in alternative embodiments, different cross-sectional shapes may be used.

Once assembled, the second end 286 of the outermost tube 278 (e.g., the tube 278 with largest cross-sectional width) is fixedly mounted to the base 46 of the body 14 concentric with the first axis 66. Furthermore, the first end 282 of the innermost tube 278 (e.g. the tube 278 with the smallest cross-sectional width) is coupled to the light assembly 22 for axial movement together therewith. For the purpose of this application, the arm length 270 of the arm assembly 18 is defined as the axial distance between the first end 282 of the innermost tube 278 and the second end 286 of the outermost tube 278.

Figure 32:
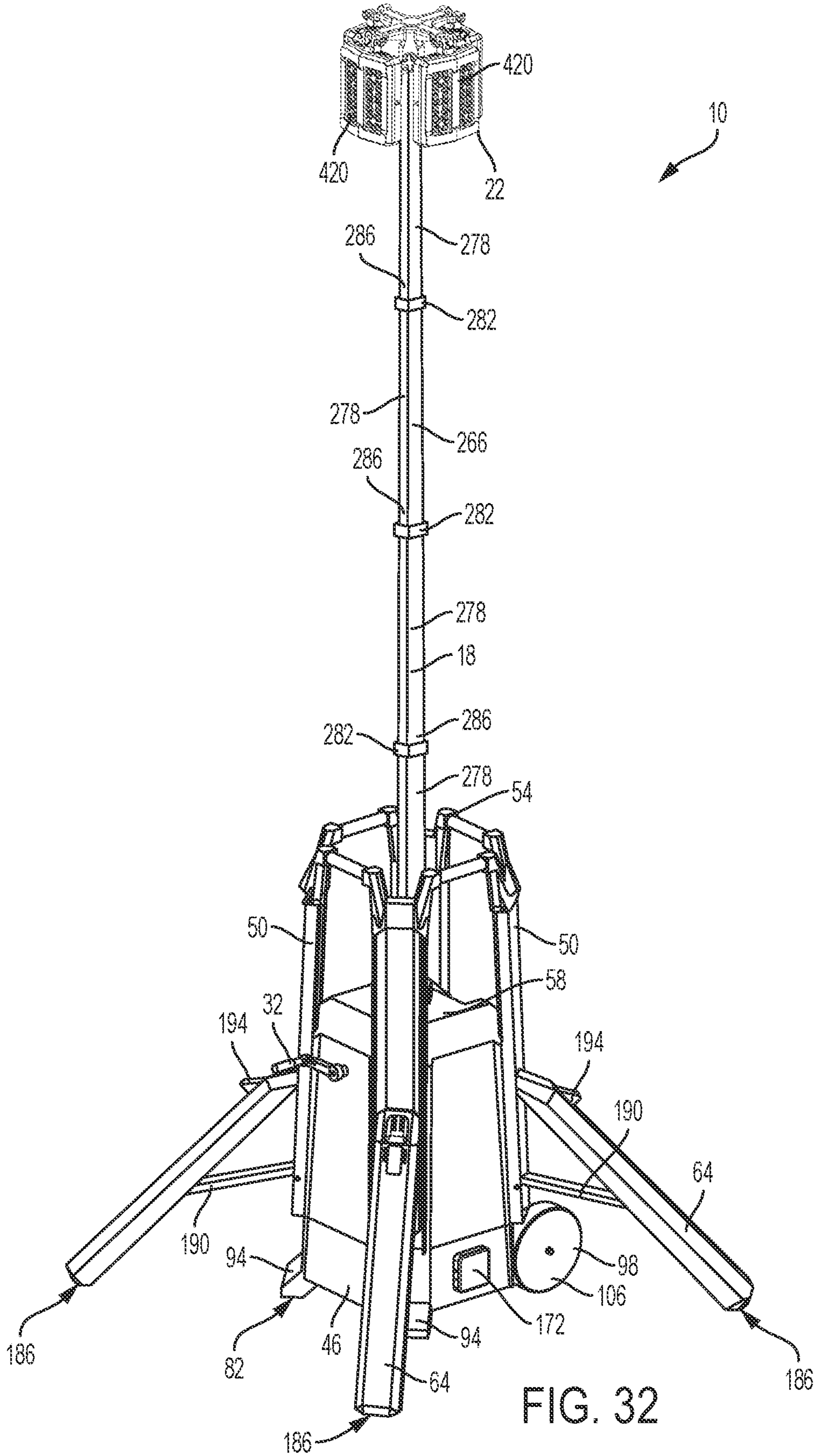
Figure 33:
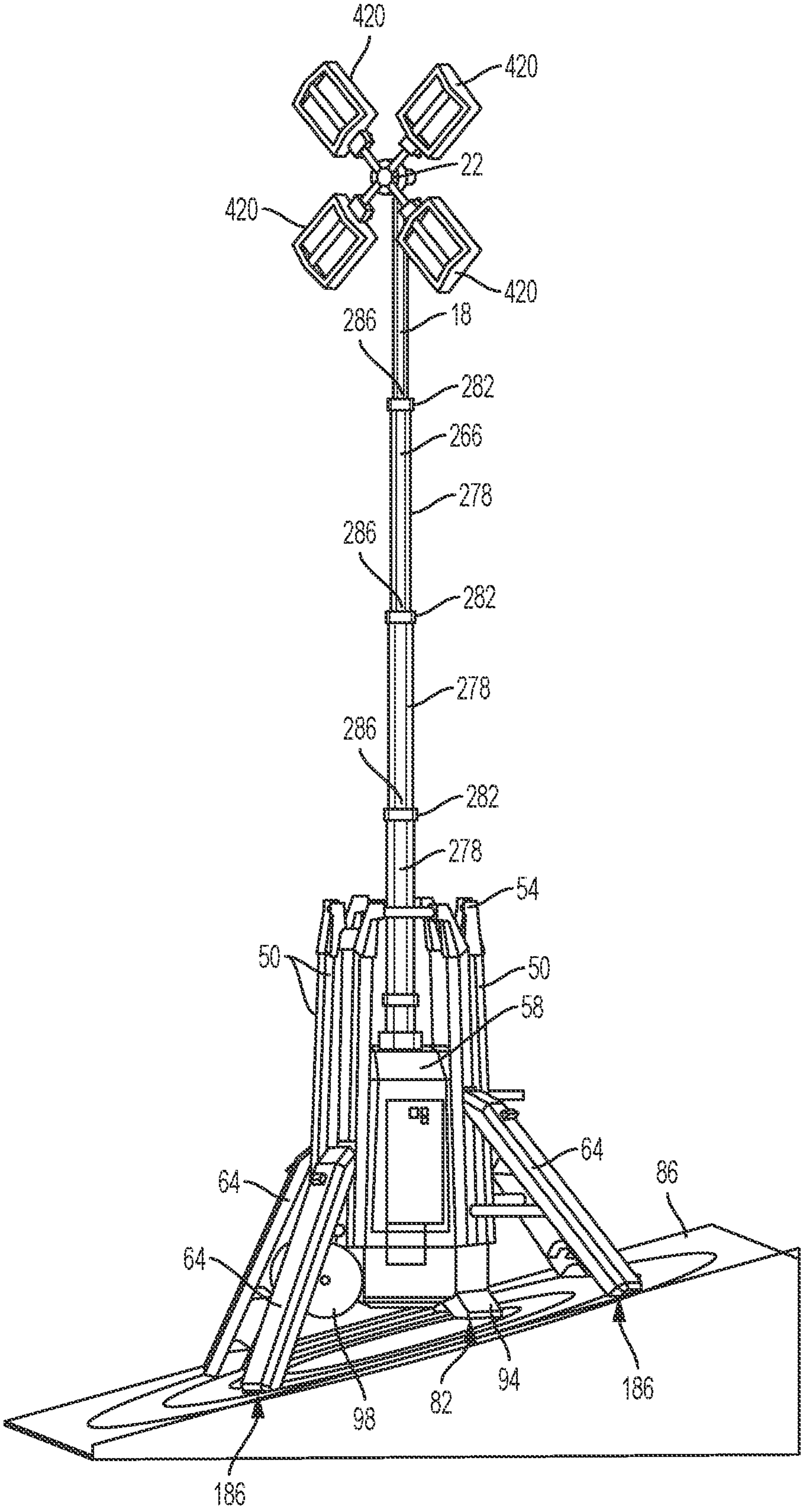
Figure 34:
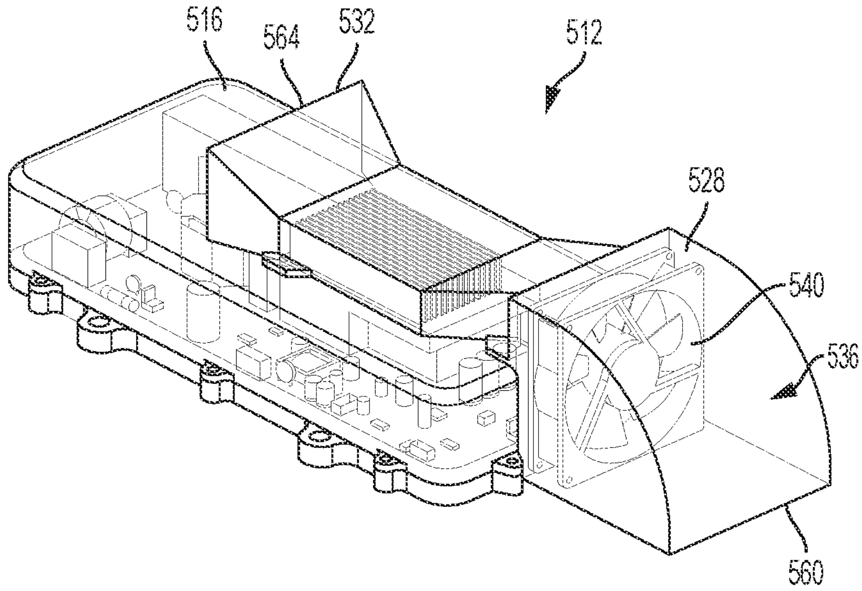
FIG. 34 is a perspective view of a charger unit.
Figure 35:
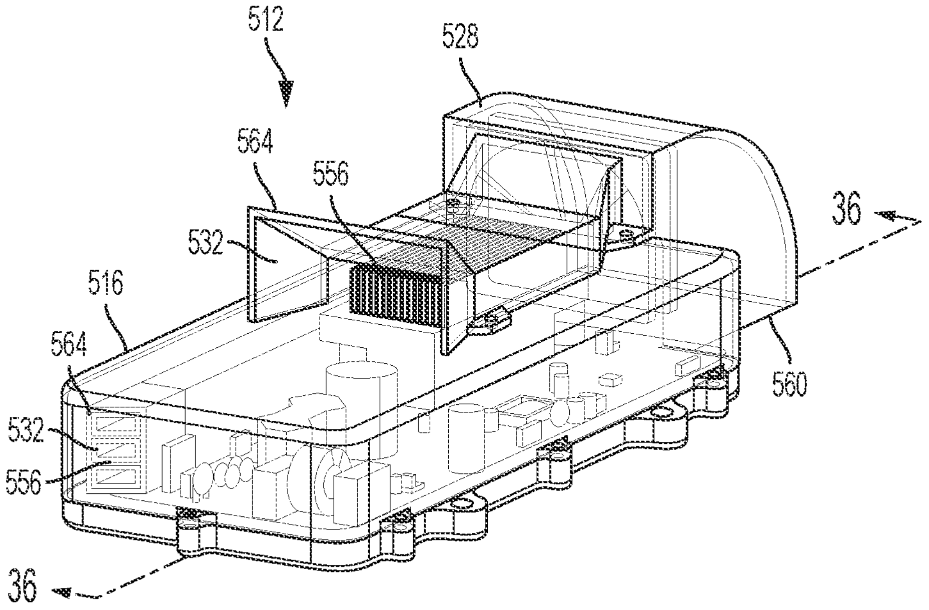
FIG. 35 is a rear perspective view of the charger unit of FIG. 34.

During use, the arm assembly 18 is continuously adjustable between a retracted position (see FIGS. 5 and 6), where the arm 266 produces a first arm length 270 (e.g., when the second ends 286 of each tube 278 are positioned adjacent one another), and an extended position (see FIGS. 32-33), where the arm 266 produces a second arm length 270 that is greater than the first arm length 270 (e.g., when the second end 286 of each tube 278 is positioned proximate the first end 282 of the immediately adjacent tube 278 positioned radially outward thereof).

Figure 16:
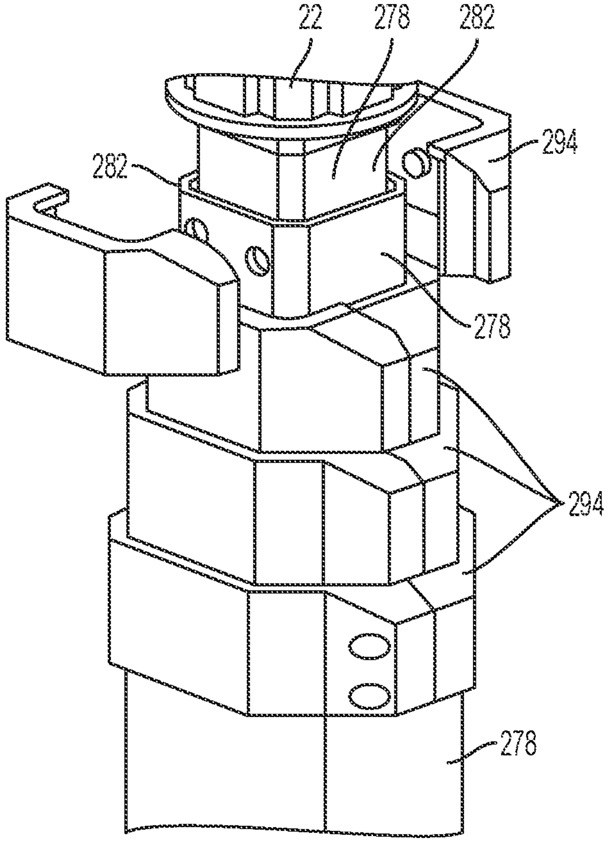
FIG. 16 is a detailed perspective view of a first end of the arm of FIG. 14.

As shown in FIG. 16, each tube 278 of the arm assembly 18 also includes a pole collar 294 fixedly coupled to and at least partially encompassing the first end 282 thereof. In the illustrated embodiment, each collar 294 includes two clamshell halves fastened together with one or more threaded fasteners (e.g., Plastite® screws). During use, each pole collar 294 is configured to restrict the axial movement of the tube 278 relative to the immediately adjacent tube 278 positioned radially outward thereof.

Figure 17:
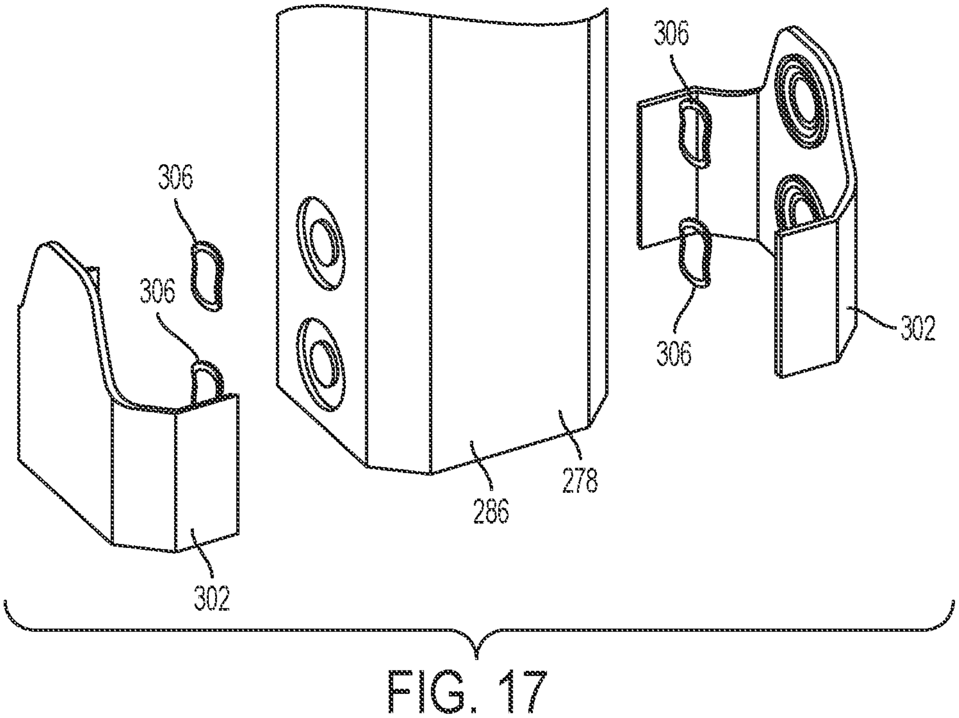
FIG. 17 is a detailed perspective view of a second end of the arm of FIG. 14.

As shown in FIG. 17, each tube 278 of the arm assembly 18 also includes one or more guide sleeves 302 coupled to the tube 278 proximate the second end 286 thereof. The guide sleeves 302, in turn, are configured to take up the gap between adjacent tubes 278 and provide a smooth sliding surface therebetween. In the illustrated embodiment, each guide sleeve 302 also includes one or more biasing members 306 to bias the corresponding guide sleeve 302 radially outwardly from the inner tube 278 and into engagement with the immediately adjacent outer tube 278. As such, the guide sleeves 302 are able to compensate for wear between the tubes 278 while also providing a tight fit to reduce wobble between tubes 278.

Figure 18:
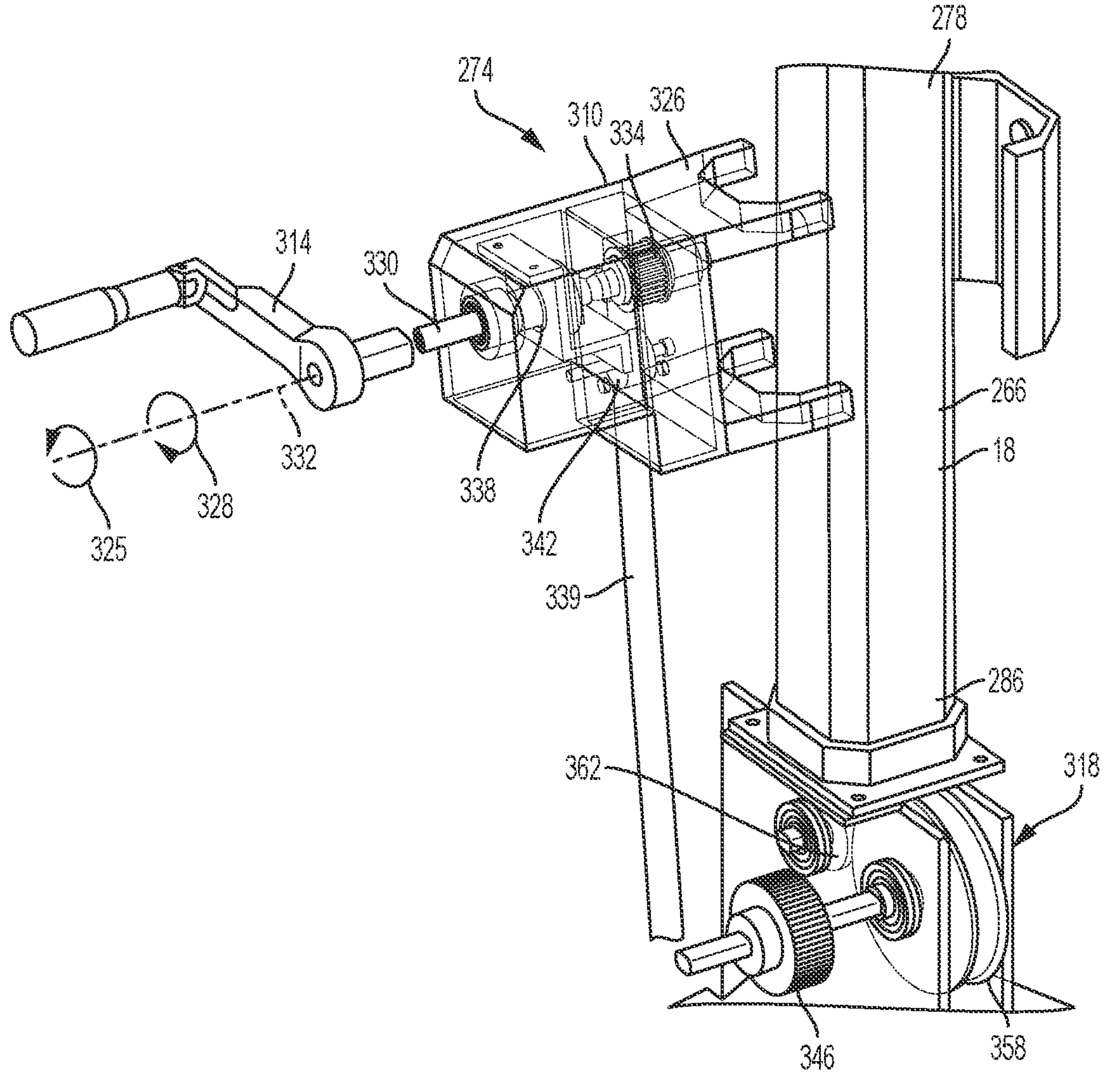
FIG. 18 is a detailed perspective view of a drive mechanism.
Figure 19:
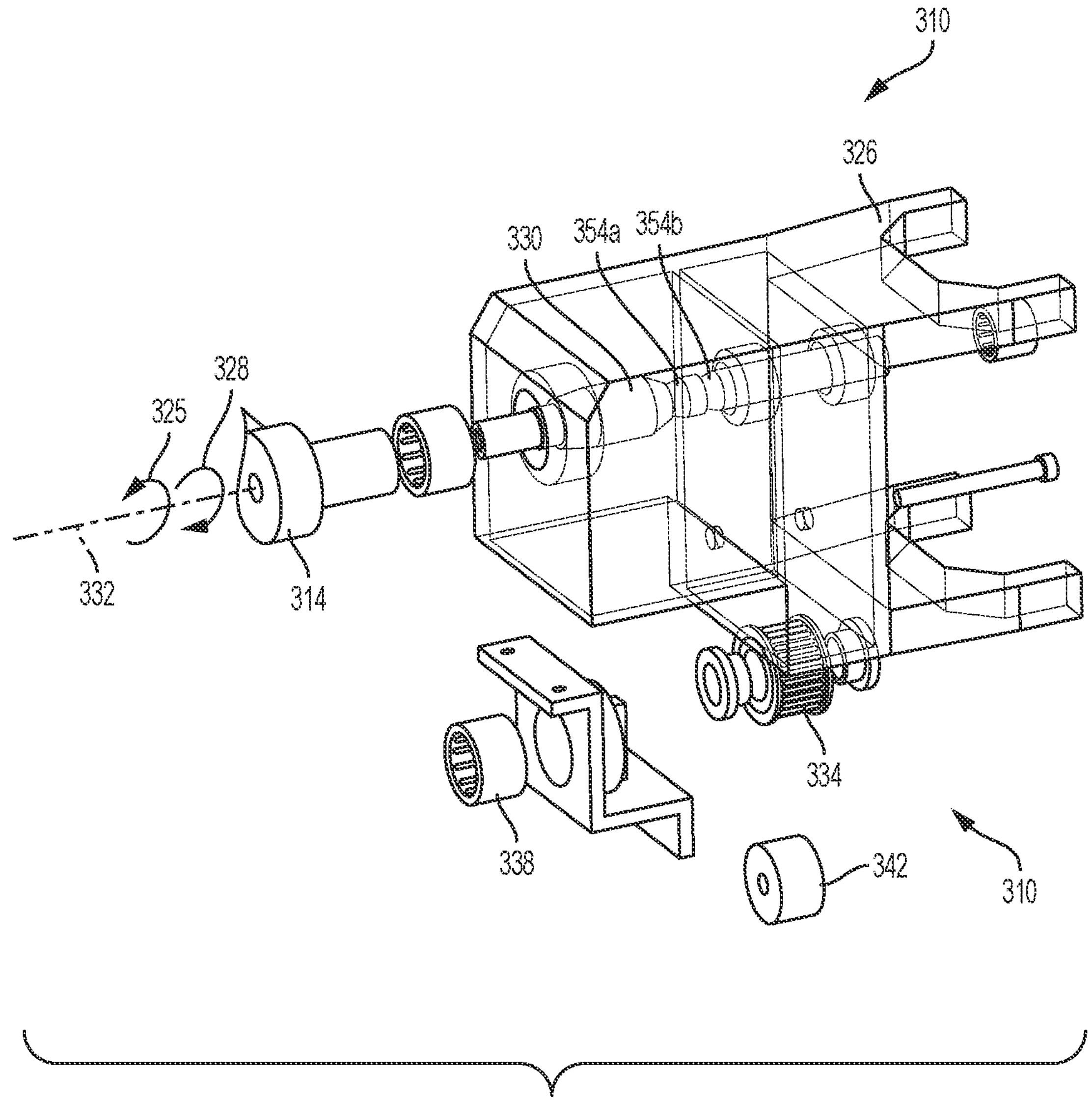
FIG. 19 is a detailed perspective view of a crank assembly of the drive mechanism of FIG. 18.
Figure 20:
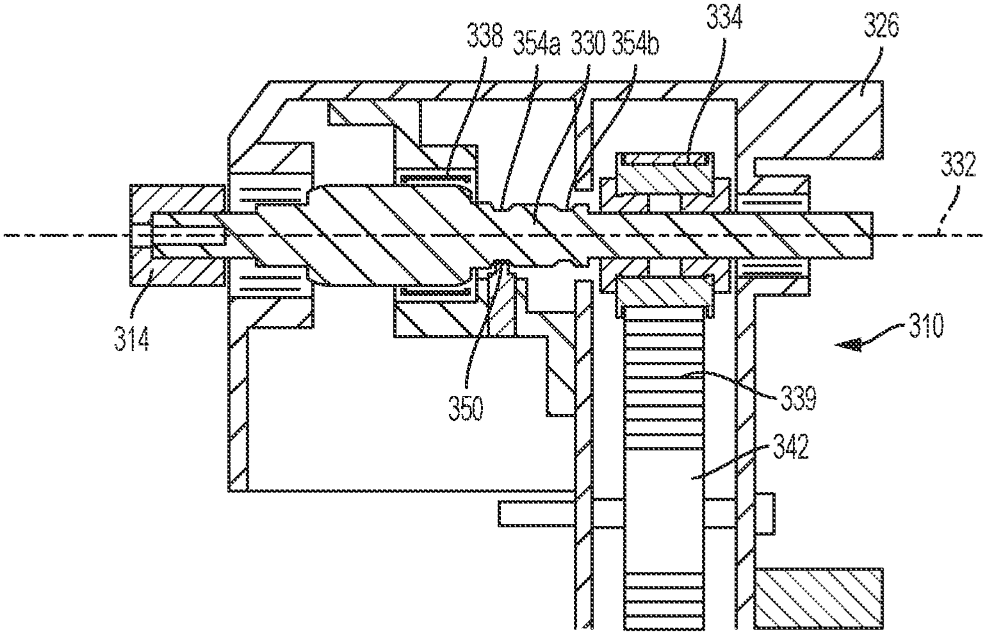
FIG. 20 is a section view of the crank assembly of FIG. 19 with a shaft in a first position.
Figure 21:
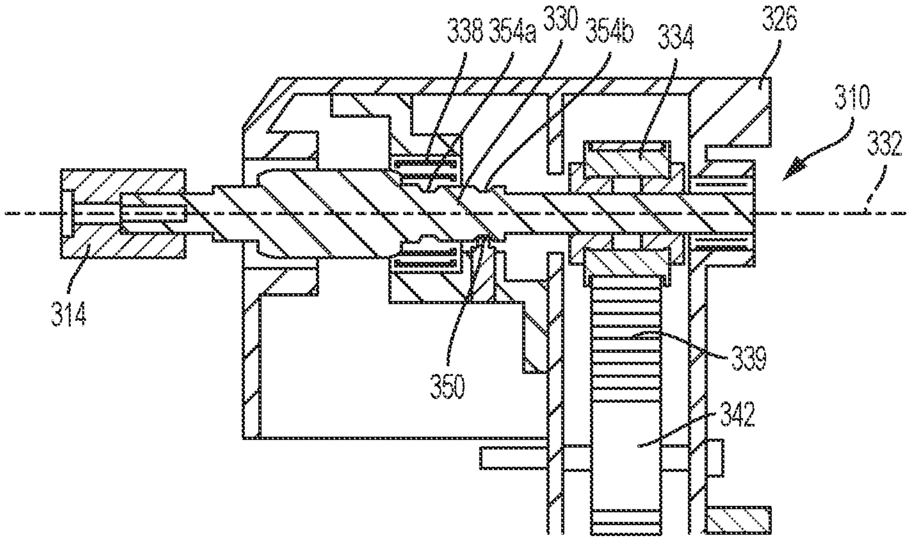
FIG. 21 is a section view of the crank assembly of FIG. 19 with a shaft in a second position.

As shown in FIG. 18, the drive mechanism 274 of the arm assembly 18 is in operable communication with the arm 266 and configured to move the arm 266 between the extended and retracted positions. The drive mechanism 274 includes a crank assembly 310 having a crank arm 314 accessible by the user, a drive assembly 318 operatively coupled to the crank assembly 310, and a cable 322 (FIGS. 25-26) driven by the drive assembly 318. The drive mechanism also includes a drum 324 (FIG. 22) formed into the base 46 of the body 14 and configured to store a length of the cable 322 in the form of a coil therein. During use, the user rotates the crank arm 314 to cause a corresponding change in the arm length 270. More specifically, rotating the crank arm 314 in a first direction 325 causes the arm length 270 to increase, while rotating the crank arm 314 in a second direction 328 causes the arm length 270 to decrease. The crank handle 32 may be folded while not in use for protection during transport. In other embodiments, the mast deployment mechanism 34 may include other types of actuators that can be manipulated by a user. In further embodiments, the mast deployment mechanism 34 may include an electrical actuator (e.g., a motor) for operating the mast deployment mechanism 34.

Illustrated in FIGS. 18-21, the crank assembly 310 includes a frame 326 at least partially positioned within the housing volume 62, a shaft 330 rotatably supported by the frame 326 for rotation about a second axis 332, the crank arm 314 coupled to and rotatable together with the shaft 330, a drive pulley 334 coupled to and rotatable together with the shaft 330, and a rotational limiter 338 selectively engagable with the shaft 330. During operation, the shaft 330 of the crank assembly 310 is axially movable between a first position (see FIG. 21), where the shaft 330 does not engage the rotation limiter 338 and the shaft 330 may be freely rotated in both directions by the crank arm 314, and a second position (see FIG. 22), where the shaft 330 does engage the rotation limiter 338 and the shaft 330 may only be rotated in the first direction 325 by the crank arm 314.

In the illustrated embodiment, the rotation limiter 338 is a one-way bearing, allowing the shaft 330 to rotate in the first direction 325, but restricting any rotation in the second direction 328 when engaged thereto. In alternative embodiments, different types of rotation limiters may be used such as but not limited to ratchets, and the like.

The drive pulley 334 of the crank assembly 310 is coupled to the shaft 330 and configured to at least partially support a drive belt 339 thereon. In the illustrated embodiment, the drive pulley 334 is mounted on the shaft 330 so that the pulley 330 can move axially with respect to the shaft 330 while remaining keyed to the shaft 330 for rotation together therewith. As such, the user may axially slide the shaft 330 between the first and second positions without forcing the drive pulley 334 out of alignment with the idler pulley 342 and the wheel pulley 346 (described below).

The crank assembly 310 also includes an idler pulley 342 mounted to the frame 326 for rotation with respect thereto and configured to contact the drive belt 339. More specifically, the idler pulley 342 is configured to maintain a pre-determined level of tension within the belt 339 during operation of the site light 10.

The crank assembly 310 also includes a detent 350 configured to influence the axial movement of the shaft 330 with respect to the frame 326 between the first and second positions. More specifically, the detent 350 selectively engages either a first groove 354*a* or a second groove 354*b* formed in the shaft 330 and associated with the first and second positions, respectively. During use, the detent 350 resists the removal from the grooves 354*a*, 354*b* providing tactile feedback when the shaft 330 is positioned within one of the first and the second positions.

Figure 22:
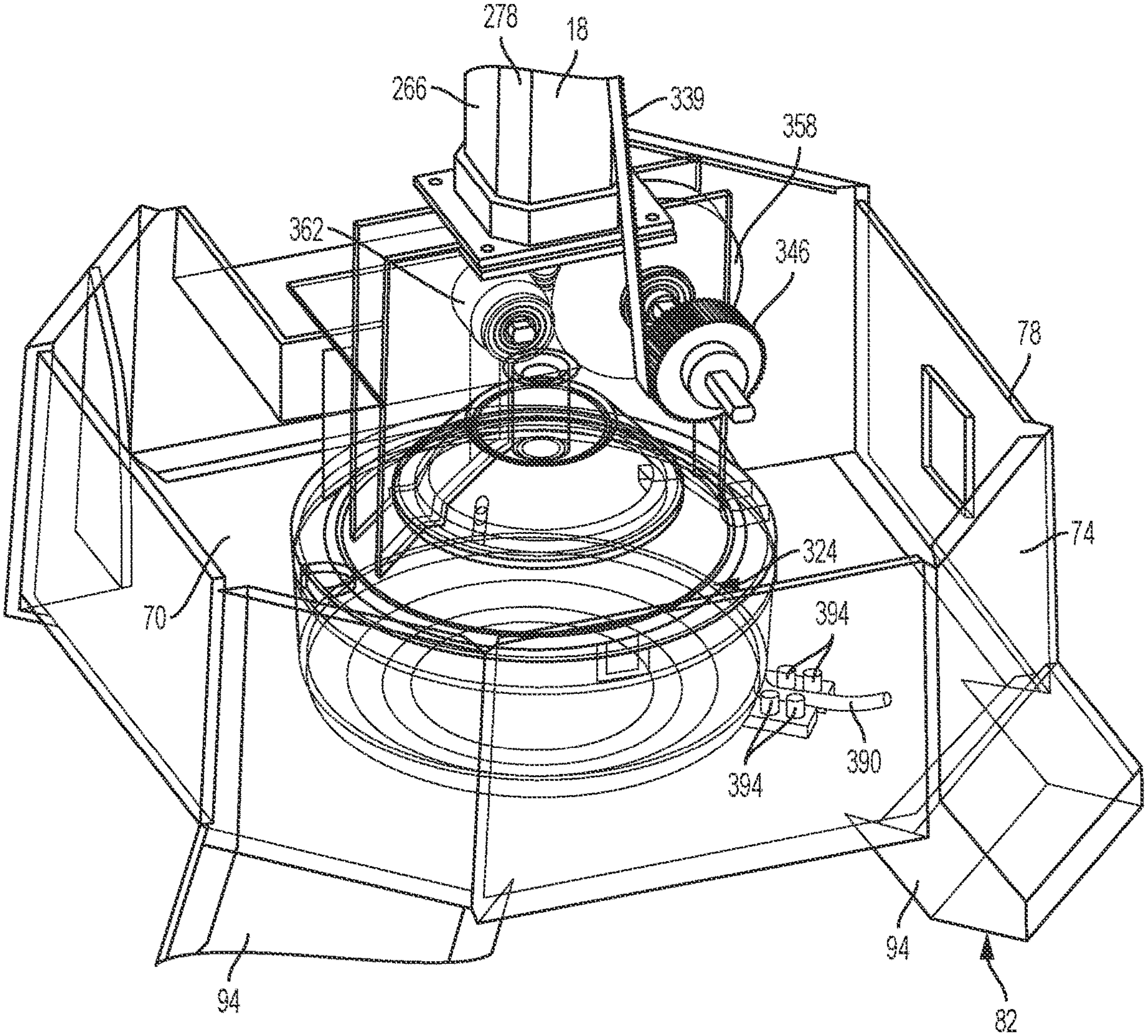
FIGS. 22-24 are detailed perspective views of a drive assembly of the drive mechanism of FIG. 18.
Figure 23:
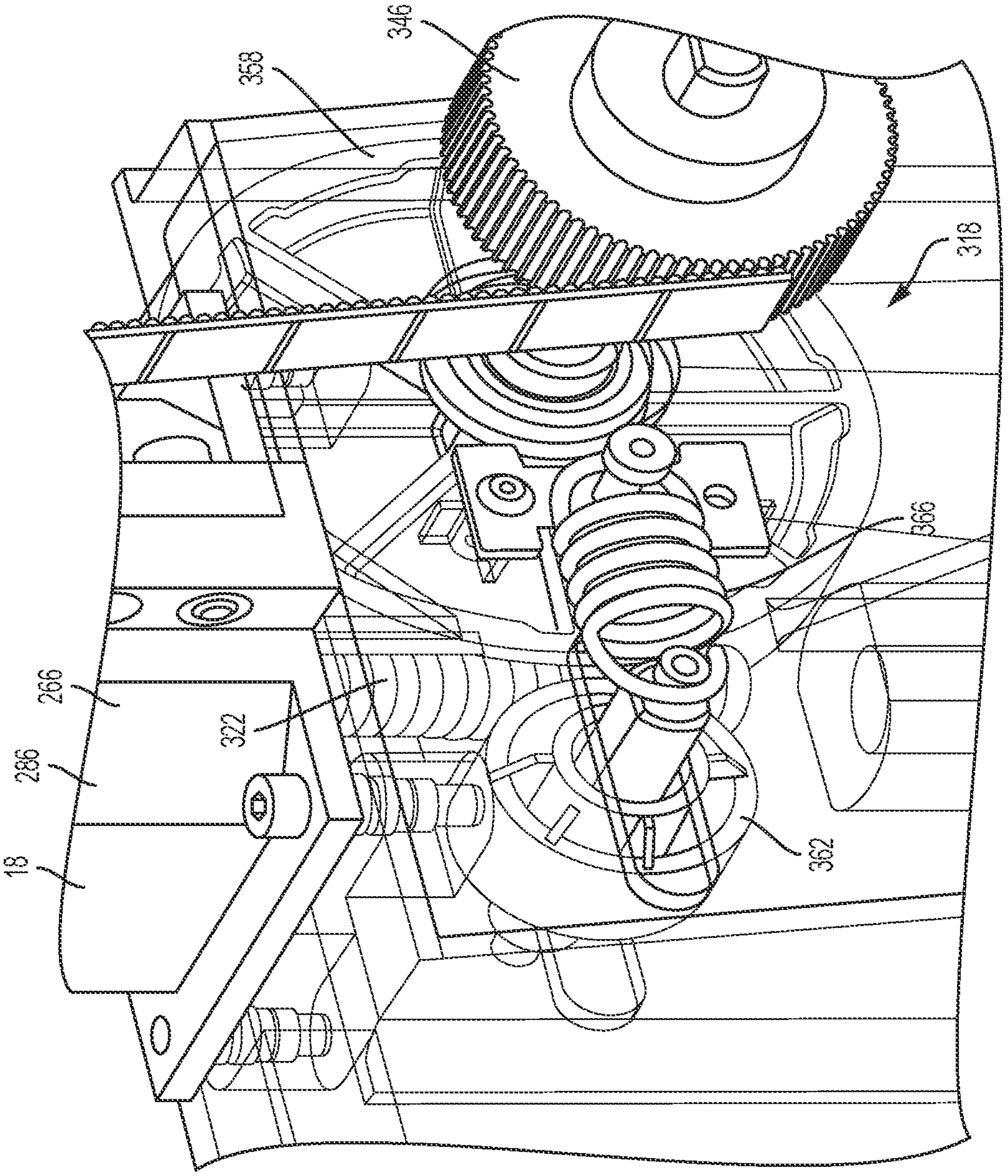
Figure 24:
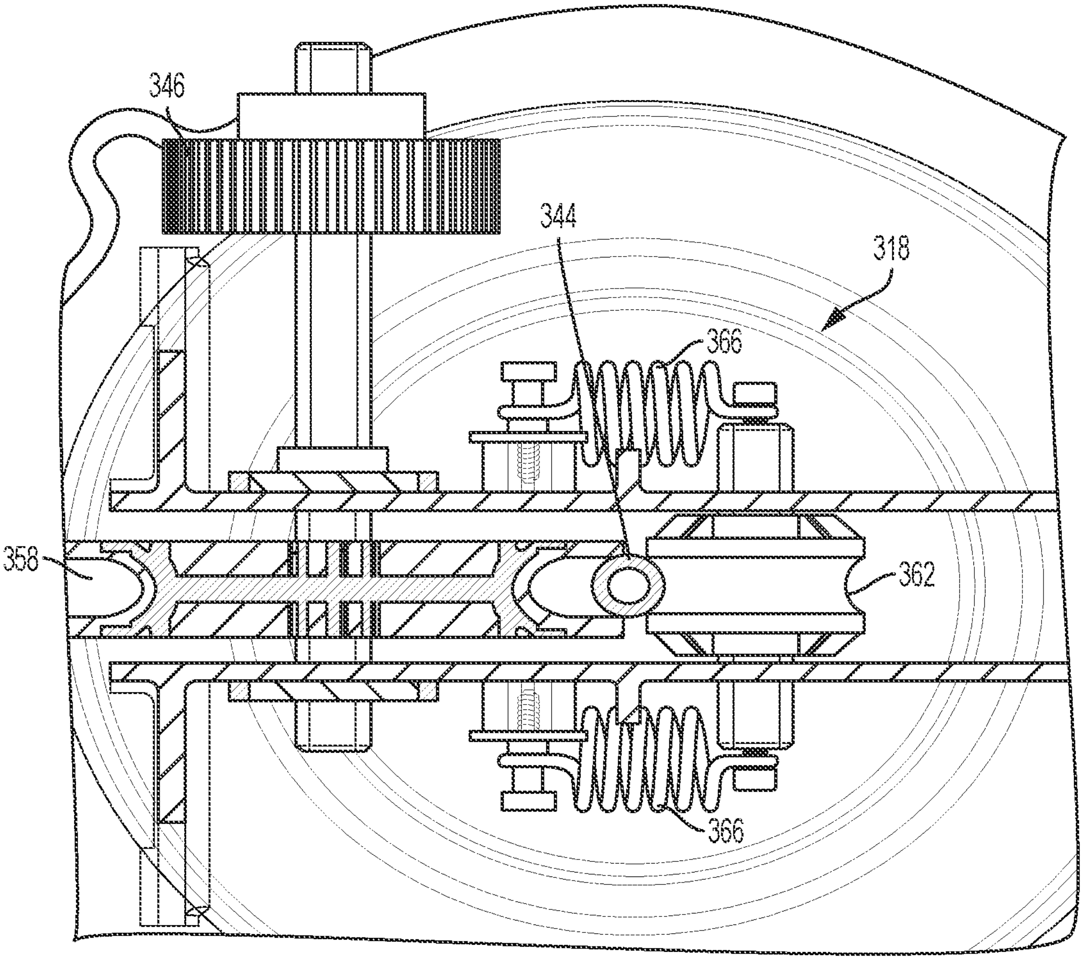

Illustrated in FIGS. 22-24, the drive assembly 318 of the drive mechanism 274 includes a drive wheel 358 mounted for rotation with respect to the body 14, and an idle wheel 362 mounted for rotation with respect to the body 14 and positioned opposite the drive wheel 358. As shown in FIG. 22, the wheels 358, 362 of the drive mechanism 274 are positioned between the drum 324 and the arm 266 to engage the cable 322 as it extends therebetween. The drive assembly 314 also includes one or more biasing members 366 to bias the idle wheel 362 toward the drive wheel 358 and provide a clamping force against the cable 322.

In the illustrated embodiment, the drive wheel 358 of the drive assembly 274 is coupled to a wheel pulley 346 (FIG. 18) for rotation together therewith. The wheel pulley 346, in turn, engages and is driven by the drive belt 339 of the crank assembly 310. Therefore, the shaft 330 of the crank assembly 310 and the drive wheel 358 of the drive assembly 274 rotate together as a unit (i.e., the shaft 330 rotates the drive pulley 334, which rotates the wheel pulley 346, which rotates the drive wheel 358). As such, rotating the crank arm 314 in the first direction 325 causes the drive wheel 358 to rotate in the first direction 325, which axially pushes the cable 322 in the upward direction 262 (e.g., out of the drum 324 and toward the arm 266). In contrast, rotating the crank arm 314 in the second direction 328 causes the drive wheel 358 to rotate in the second direction 328, which axially pulls the cable 322 in the downward direction 258 (e.g., away from the arm 266 and into the drum 324).

In some embodiments, at least one of the drive wheel 358 and the idle wheel 362 may be overmolded with a high friction material (e.g., rubber) to increase the frictional force created between the wheels 358, 362 and the cable 322 (described below). In still other embodiments, the wheels 358, 362 may have teeth or grooves (not shown) formed therein which correspond to and engage the outer surface of the cable 322.

Figure 25:
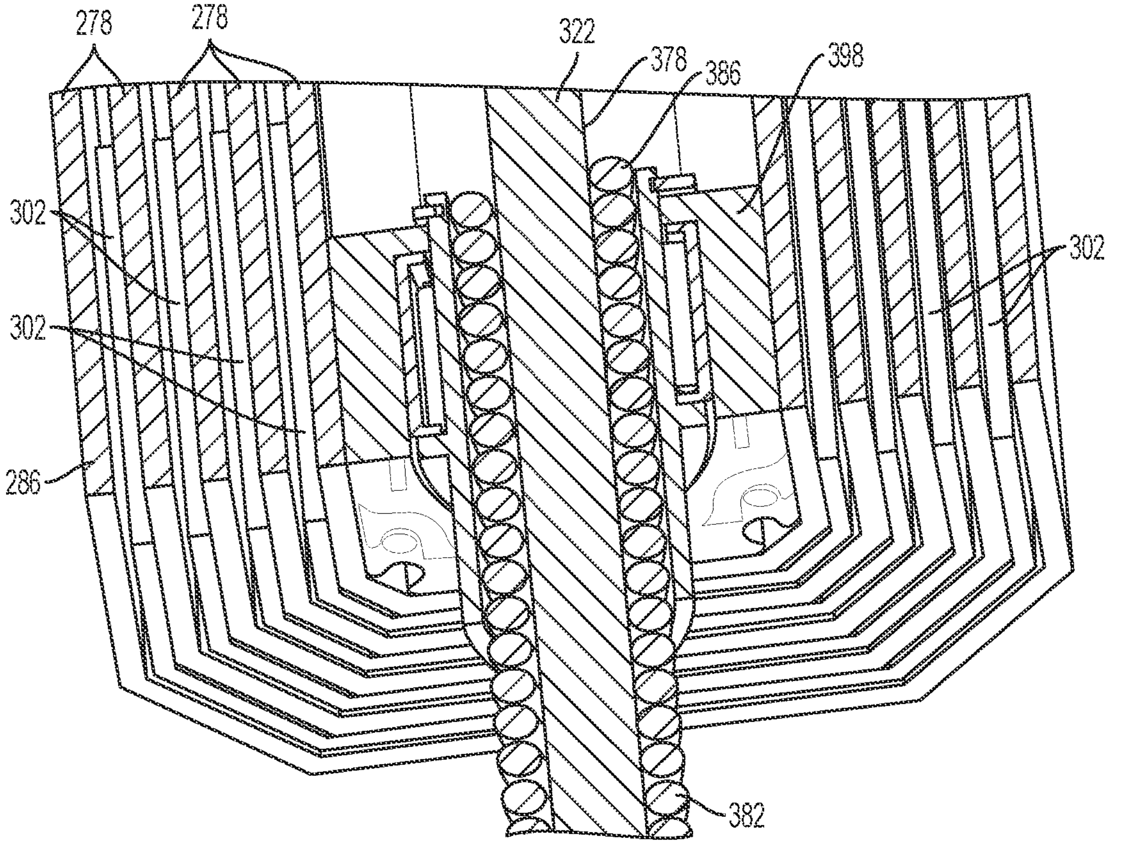
FIG. 25 is a detailed section view of a connector of the arm assembly.

As shown in FIG. 25, the cable 322 of the drive mechanism 274 includes a core 378 formed from one or more wires in electrical communication with the power system 26, and a sheath 382 at least partially surrounding the core 378. During use, the cable 322 serves two primary purposes; first, the cable 322 transmits forces between the drive assembly 318 and the arm 266; and second, the cable 322 transmits electrical power between the power system 26 and the light assembly 22 (described below).

The sheath 382 of the cable 322 is tubular in shape having a first end 386 rotatably coupled to the second end 286 of the innermost tube 278 of the arm 266, and a second end 390 (FIG. 22) fixedly coupled to the base 46 of the body 14. When assembled, the sheath 382 extends from the first end 386 thereof, passes between and engages both wheels 358, 362 of the drive assembly 274, and enters the drum 324 where a length of the sheath 382 is coiled therein. Finally, the sheath 382 exits the drum 324, where the second end 390 of the sheath 382 is secured to the base 46 of the body 14 with a clamp 394 (see FIG. 22). In the illustrated embodiment, the sheath 382 includes a sewer cable formed from a tightly coiled length of wire that is flexible in contour but axially incompressible. The sheath 382 also includes exterior features (e.g., a helical groove) engageable by the wheels 358, 362 of the drive mechanism 274.

In the illustrated embodiment, the first end 386 of the sheath 382 is rotatably coupled to the second end 286 of the innermost tube 278 by a connector 398 (see FIG. 25). The connector 398 is crimped to the first end 386 of the sheath 382 and is configured to permit relative rotation between the sheath 382 and the tube 278 while axially fixing the two elements together. As such, the sheath 382 and the tube 278 move axially together as a unit. The relative rotation granted by the connector 398 allows the sheath 382 to rotate as necessary to accommodate the uncoiling of the sheath 382 from the drum 324 without binding or placing undue stress on the cable 322.

Referring back to FIG. 14, the core 378 of the cable 322 includes an elongated bundle of one or more wires extending between and in electrical communication with the power system 26 and the light assembly 22. More specifically, the core 378 includes a first end 402 coupled to the light assembly 22, and a second end (not shown) coupled to the power system 26. When assembled, the core 378 extends from the first end axially along the channel of the innermost tube 278 where the core 378 enters the first end 386 of the sheath 382. The core 378 then continues along the entire length of the sheath 382 until it exits the second end 390 outside the drum 324. The core 378 then continues to the power system 26 where each of the individual wires of the core 378 terminate as necessary.

The core 378 also includes an expansion portion 410 configured to allow the core 378 to compensate for changes in the axial length between the first end 402 and the second end thereof. More specifically, the length of the path the core 378 traverses increases as a greater portion of the sheath 382 is coiled within the drum 324 and the expansion portion 410 compensates for the resulting increase in length. In the illustrated embodiment, the expansion portion 410 of the core 378 includes a helically wound portion positioned between the first end 402 of the core 378 and the first end 386 of the sheath 382.

Figure 26:
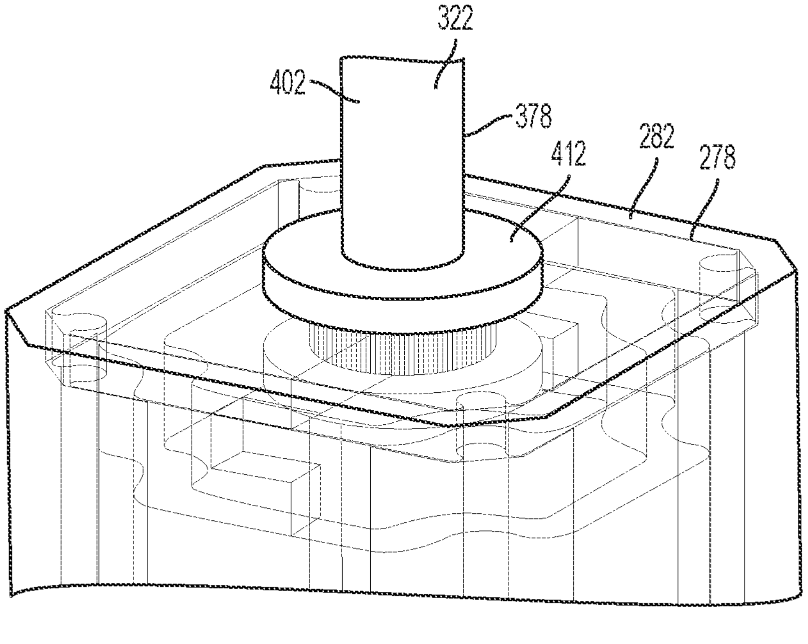
FIG. 26 is a detailed view of a keyed strain relief with a cable passing therethrough.
Figure 27:
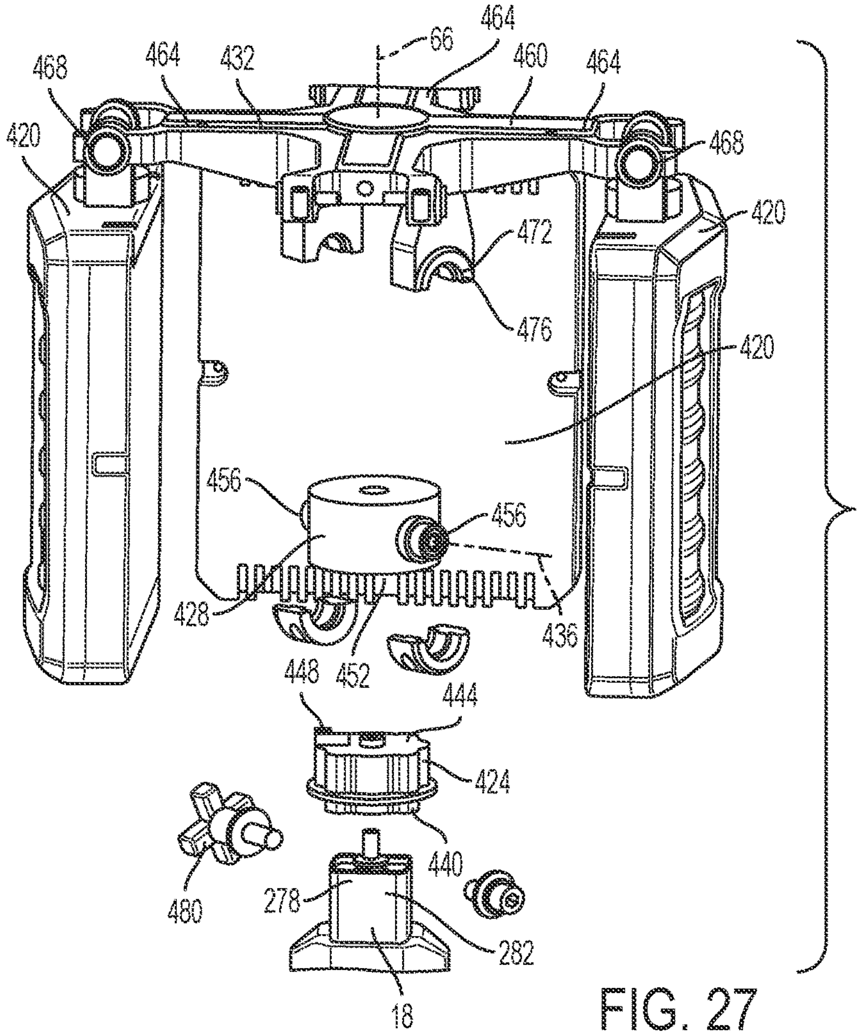
FIG. 27 is an exploded view of a light assembly of the site light of FIG. 1.
Figure 28:
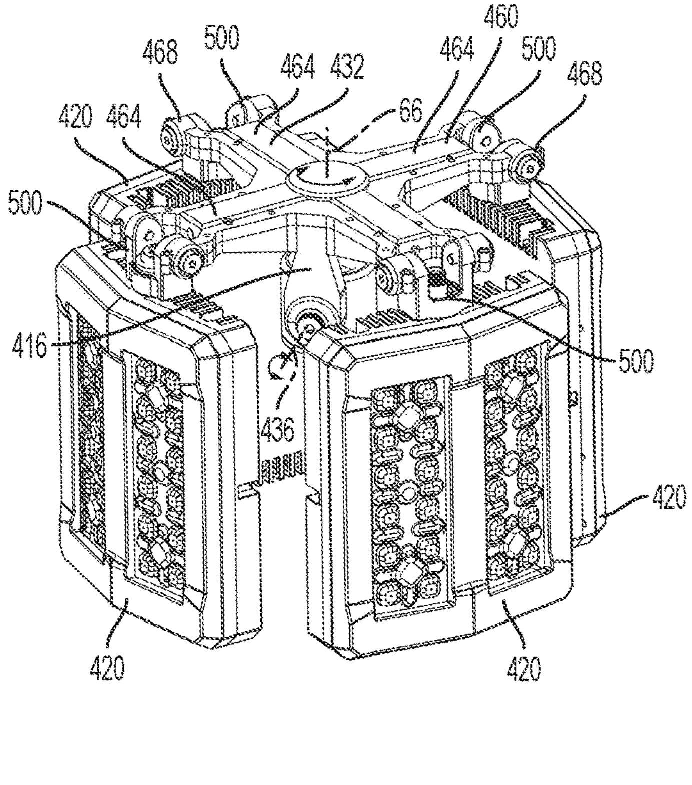
FIG. 28 is a perspective view of the light assembly of FIG. 27.

In the illustrated embodiment, the first end 402 of the core 378 of the cable 322 is fixed to the first end 282 of the innermost tube 278 with a keyed strain relief 412 (see FIG. 26). The keyed strain relief 412 avoids twisting the core 378 as it exits the arm assembly 18.

While the illustrated embodiment includes a cable 322 with a separately formed sheath 382 and core 378, it is to be understood that in alternative embodiments the sheath 382 may be overmolded onto the core 378 to form a single element. In such embodiments, the overmolding may include a number of teeth or grooves formed therein that are configured to engage the wheels 358, 362 of the drive system 274.

Referring to FIGS. 14 and 18-21, to adjust the arm assembly 18 from the retracted position to the extended position, the user begins by axially biasing the shaft 330 into the second position (FIG. 20) by pushing axially inwardly onto the crank arm 314 until the detent 350 is positioned within the respective groove 354*a*. Once in the second position, the user then rotates the crank arm 314 in the first direction 325 causing the wheels 358, 362 of the drive assembly 274 to bias the cable 322 axially in the upward direction 262 (e.g., out of the drum 324 and toward the arm 266). The cable 322, in turn, axially biases the innermost tube 278 of the arm 266 in the upward direction 262 causing the arm length 270 to increase.

As the user continues to rotate the crank arm 314 in the first direction 325, the cable 322 is continuously drawn and uncoiled from the drum 324 and directed through the wheels 358, 362 of the drive assembly 274 in the upward direction 262. The cable 322, in turn, continues to bias the tubes 278 of the arm 266 in the upward direction 262 causing the tubes 278 to unfold sequentially until the arm 266 is fully deployed and produces the second arm length 270.

During the deployment process, the rotation limiter 338 of the crank assembly 310 restricts rotation of the crank arm 314 in the second direction 328. As such, the drive wheel 358, of the drive assembly 274 is unable to rotate in the second direction 328 and the cable 322 is unable to pass through the wheels 358, 362 in the wind direction 258 (e.g., back into the drum 324). Therefore, the rotation limiter 338 acts as a ratchet mechanism assuring the arm length 270 can increase, but not decrease while it is engaged. By doing so, the user is able to position and maintain the arm 266 at any arm length 270 between the first arm length and the second arm length (described above).

To return the arm 266 to the stowed position, the user first axially biases the shaft 330 into the first position (FIG. 21) by pulling the crank arm 314 until the detent 350 is received in the corresponding groove 354*b*. By doing so, the user disengages the rotation limiter 338 from the shaft 330 allowing the shaft 330 to rotate in both directions. As such, the drive wheel 358 may rotate in both directions and the cable 322 may pass through the wheels 358, 362 in both directions.

The user then rotates the crank arm 314 in the second direction 328 causing the cable 322 to pass between the wheels 358, 362 of the drive assembly 274 in the downward direction 258. As such, the cable 322 enters the drum 324 and begins to recoil itself therein. The cable 322, in turn, biases the innermost arm 278 of the arm 266 in the downward direction 258 causing the arm 266 returns to the retracted position.

With reference to FIGS. 27-33, the light assembly 22 of the site light 10 includes a frame 416 adjustably coupled to the first end 282 of the innermost tube 278 of the arm assembly 18, and one or more light pods 420 each adjustably coupled to the frame 416 and configured to emit light therefrom. During use, the relative orientation of the light pods 420 may be adjusted to allow the user to direct the emitted light in a multitude of different directions and configurations. For example, the user can orient the light assembly 22 to produce "area light," where all the light pods 420 face radially outwardly (see FIGS. 28 and 31-32); or alternatively, the user can orient the light assembly 22 to produce "flood light" by pointing each of the pods 420 in a common direction (see FIG. 33). In still other embodiments, the user may point the light pods 420 radially inwardly to shield and protect the pods 420 during transport (not shown). In still other embodiments, some combination of the previous orientations may be used.

The frame 416 of the light assembly 22 includes a top cap 424 fixedly coupled to the first end 282 of the innermost tube 278, a rotation cap 428 rotatably coupled to the top cap 424 for rotation about the first axis 66, and a carriage 432 pivotably coupled to the rotation cap 428 for pivoting movement about a third axis 436 that is perpendicular to the first axis 66. Together, the top cap 424, the rotation cap 428, and the carriage 432 provide two degrees of freedom between the arm 266 and the frame 416 allowing both vertical rotation (e.g., rotation about the first axis 66) and horizontal rotation (e.g., rotation about the third axis 436).

The top cap 424 of the light assembly 22 is substantially cylindrical in shape having a first axial end 440 sized and shaped to correspond with the first end 282 of the innermost tube 278 of the arm 266, and a second axial end 444 shaped for rotational engagement with the rotation cap 428. In the illustrated embodiment, the top cap 424 includes a rotation stop 448 extending axially therefrom to selectively engage the rotation cap 428 and limit the extent of relative rotation therebetween.

The rotation cap 428 of the light assembly 22 is substantially cylindrical in shape defining a recess 452 sized to receive at least a portion of the top cap 424 therein. More specifically, the recess 452 is sized and shaped to allow relative rotation between the rotation cap 428 and the top cap 424 about the first axis 66 while maintaining the concentric positioning of each. The rotation cap 428 also includes a pair of ears 456 extending radially outwardly from the cap 428 to define the third axis of rotation 436. The rotation cap 428 also includes a rotation stop 448 positioned inside the recess 452 that is configured to selectively engage the rotation stop 448 of the top cap 424. In the illustrated embodiment, the relative sizes and shapes of the stops 448 are configured to limit the relative rotation between the rotation cap 428 and the top cap 424 to approximately 270 degrees about the first axis 66.

The carriage 432 of the light assembly 22 includes a body 460 having a plurality of arms 464 each extending radially outwardly therefrom to produce a respective arm mount 468. The carriage 432 also includes a pair of yokes 472 each extending axially from the body 460 to produce a respective cap mount 476. Once assembled, the cap mounts 476 of the body 460 are pivotably coupled to the ears 456 of the rotation cap 428 via a locking mechanism 480, allowing the body 460 to selectively pivot with respect to the rotation cap 428 about the third axis 436. More specifically, the locking mechanism 480 includes a thumb screw that can be tightened to restrict relative rotation between the carriage 432 and the cap 428, or loosened to permit relative rotation between the carriage 432 and the cap 428.

Figure 30:
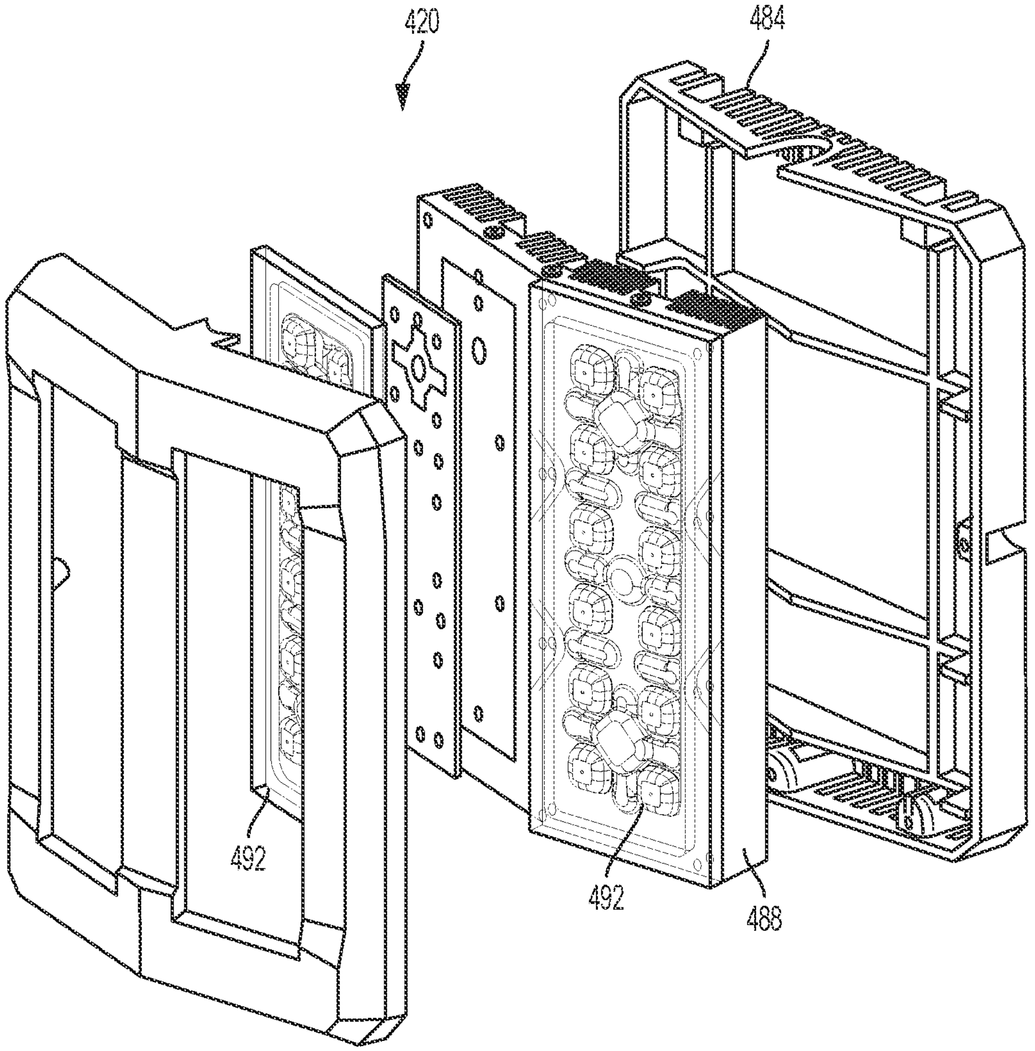
FIG. 30 is an exploded view of a light pod.
Figure 31:
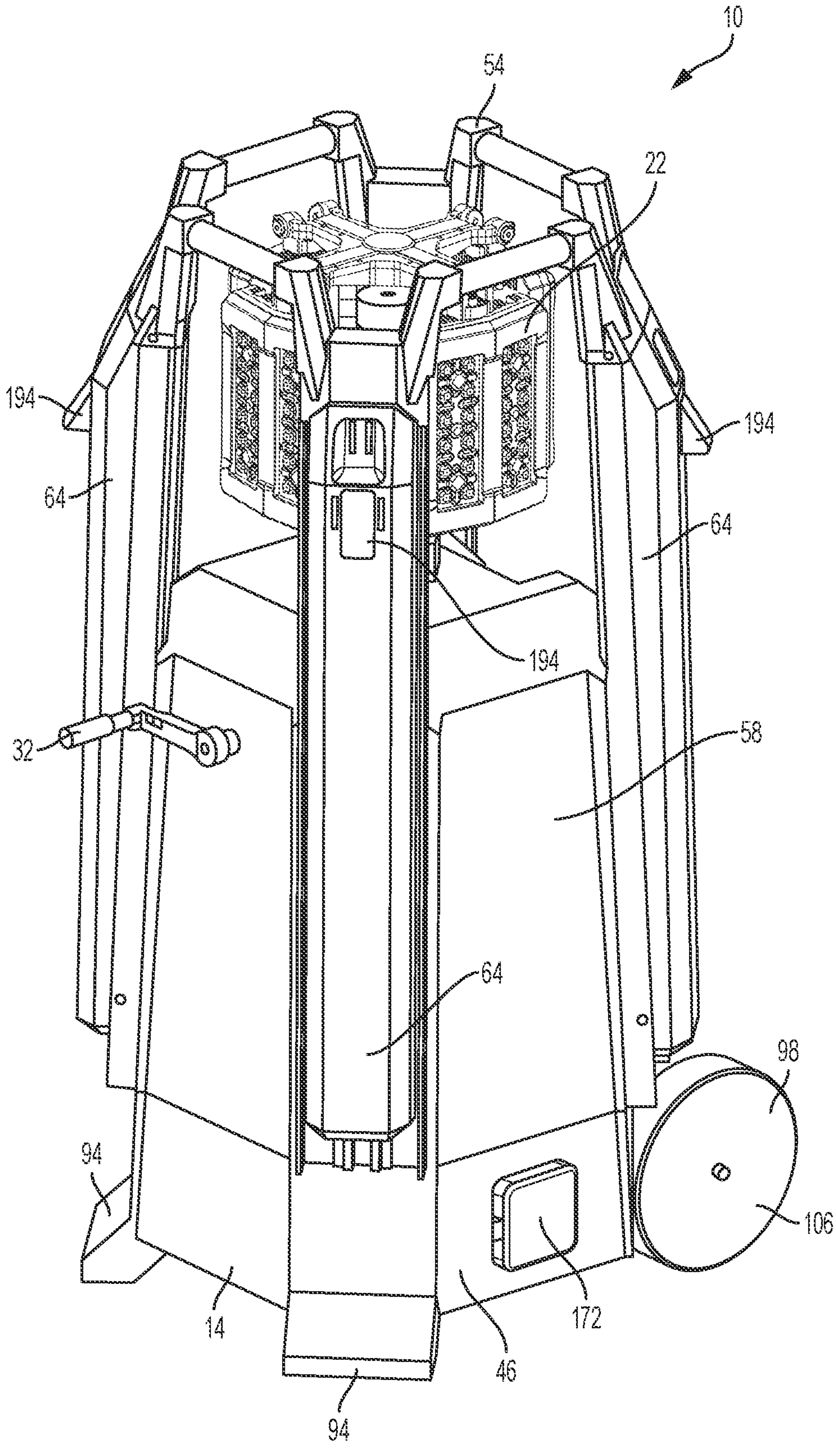
FIGS. 31-33 illustrate the site light in various forms of deployment.

As shown in FIG. 30, each light pod 420 of the light assembly 22 is substantially rectangular in shape and includes a housing 484, a heat sink 488 positioned within the housing 484, and one or more LED modules 492 mounted to the heat sink 488 and in electrical communication with the cable 322. In the illustrated embodiment, each light pod 420 includes two LED modules 492 oriented at 160 degrees with respect to one another to increase the width of the beam emitted from the pod 420 during use. However, in alternative embodiments, more or fewer modules 492 may be used. Furthermore, the module 492 may be positioned in different orientations with respect to one another to produce the desired size and shape of light beam. In the illustrated embodiment, each LED module 492 includes a plurality of individual diodes, each of which have a corresponding optic or lens to distribute the light emitted therefrom.

While the illustrated light pods 420 include LED modules 492 to produce light, in alternative embodiments, different forms of light production such as filament bulbs, neon tubes, and the like may be used.

Figure 29:
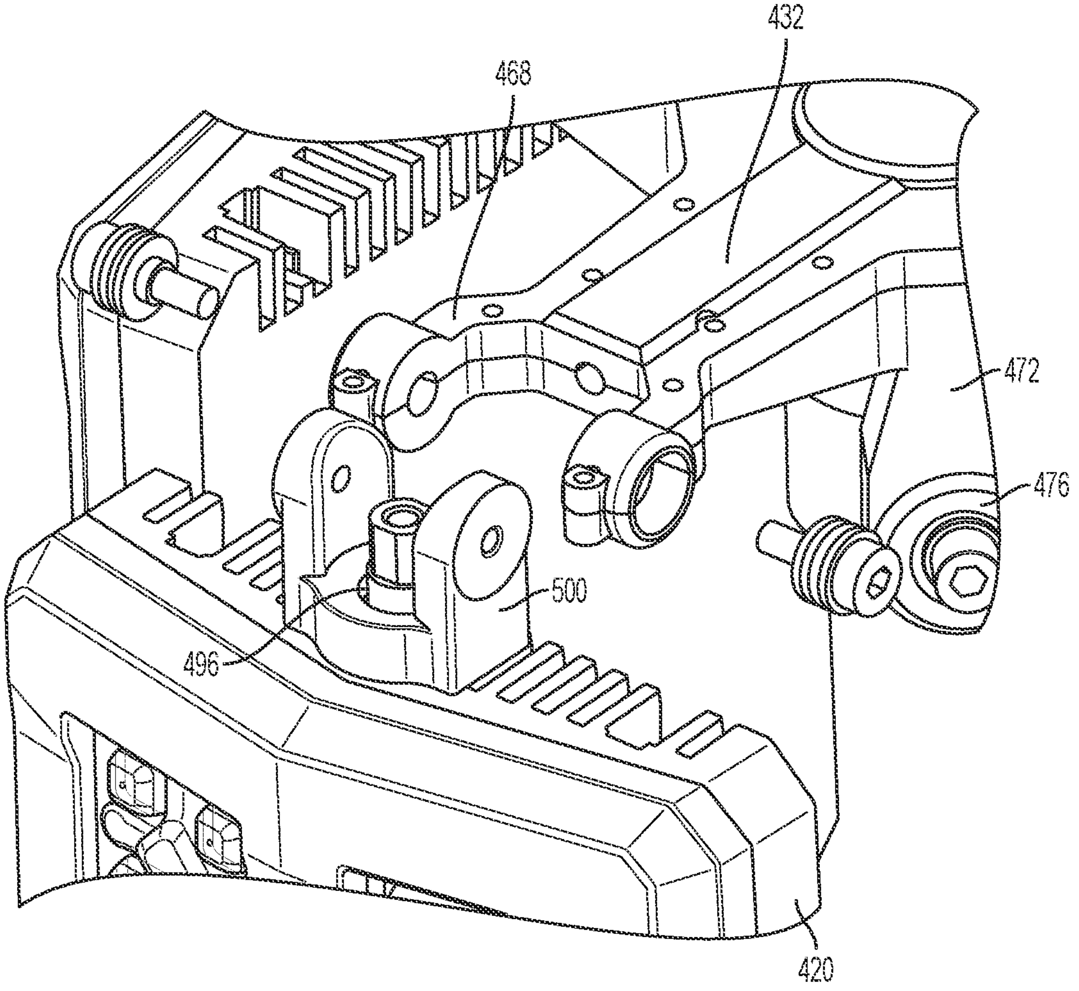
FIG. 29 is a detailed view of a pivot knuckle of the light assembly of FIG. 27.

As shown in FIG. 29, each light pod 420 also includes a pivot bracket 496 fixedly coupled to the heat sink 488, and a pivot knuckle 500 rotatably coupled to the pivot bracket 496 and pivotably coupled to a respective arm mount 468 of the carriage 432. Together, the pivot bracket 496 and the pivot knuckle 500 provide two degrees of freedom between the carriage 432 and the corresponding light pod 420. In some embodiments, a series of Belleville washers or other fasteners may be used to provide a level of resistance to the movement between the bracket 496, the knuckle 500, and the carriage 432. As such, the user may maneuver each light pod 420 relative to the carriage 432 and the light pod 420 will remain in place until acted upon again the user.

While the illustrated embodiment includes four light pods 420 coupled to the carriage 432, it is to be understood that in alternative embodiments more or fewer light pods 420 may be present. Furthermore, while each of the light pods 420 of the current embodiment are similar in size and shape, in alternative embodiments, light pods 420 with different shapes, light beam characteristics, brightness, and the like may be used.

Illustrated in FIG. 6, the site light 10 includes the power system 26 to provide electrical power to the light assembly 22 via the cable 322. The power system 26 includes an LED driver 504, an AC/DC power source 508, and a charger unit 512. The power system 26 is also in electrical communication with the battery terminal 176 and the AC power input 172. During operation, the power system 26 is operable in at least two modes of operation, a first mode of operation, where the power system 26 receives power from an external AC source electrically coupled to the AC power input 172, and a second mode of operation, where the power system 26 receives power from a rechargeable battery 180 mounted in the battery terminal 176. When working in the first mode of operation, the power system 26 is configured to both power the light assembly 22 and recharge the rechargeable battery 180 positioned in the battery terminal 176 (if present). While not illustrated, the power system 26 may also draw power from other devices such as, but not limited to, a solar panel, a fuel cell, and other suitable sources of power.

Illustrated in FIGS. 34-38, the charger unit 512 of the power system 26 includes a housing 516 defining an electrical volume 520 therein. The charger 512 also includes one or more electrical components 524 positioned within the electrical volume 520, and a cooling system 528 in thermal communication with, but fluidly isolated from the electrical components 524. In the illustrated embodiment, the electrical volume 520 of the charger 512 is fluidly isolated from the surrounding atmosphere.

The cooling system 528 of the charger 512 includes a plurality of parallel cooling channels 532 each in fluid communication with a common collection chamber 536 having a cooling fan 540 positioned therein. Each cooling channel 532, in turn, includes an inlet 544, open to the housing volume 62 of the body 14, and an outlet 548 open to the collection chamber 536. Each cooling channel 532 is also fluidly isolated from the electrical volume 520.

Figure 36:
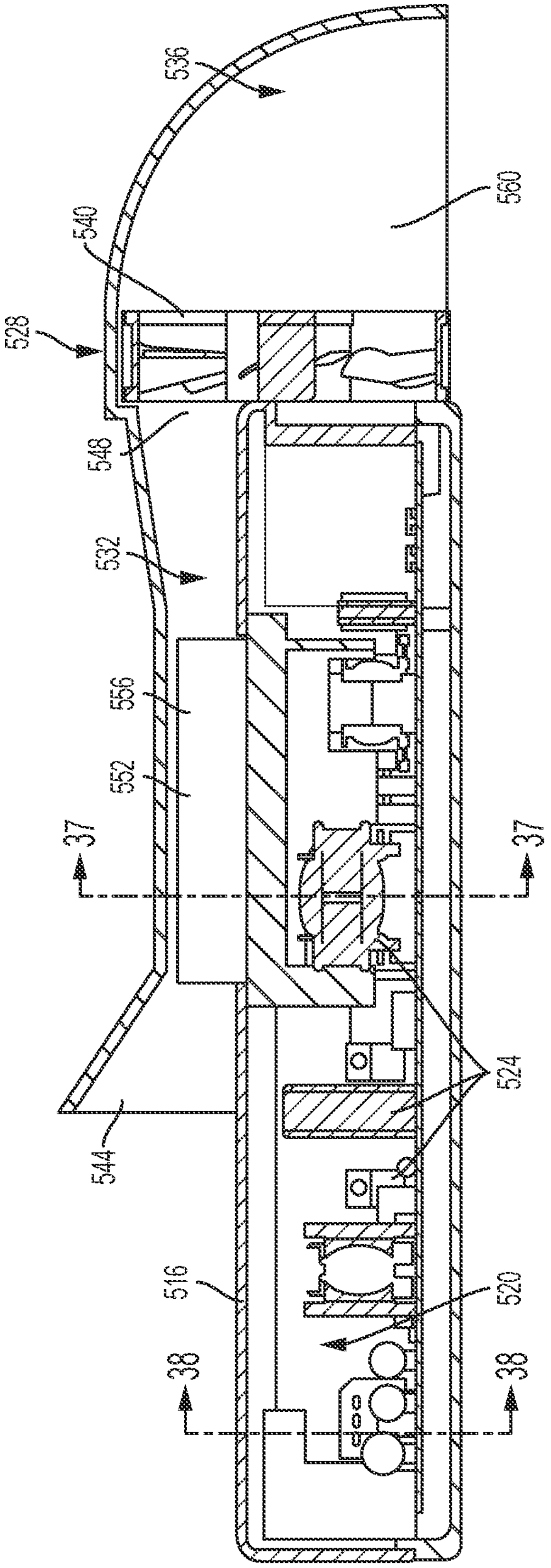
FIG. 36 is a section view take along line 36-36 of FIG. 35.
Figure 37:
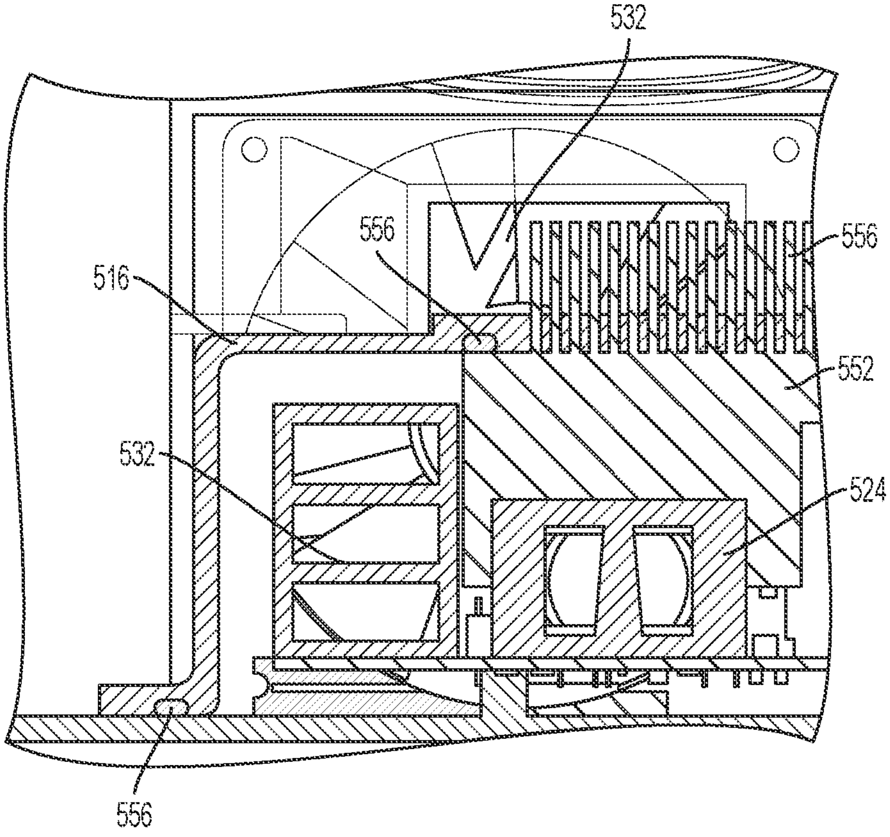
FIG. 37 is a section view taken along line 37-37 of FIG. 36.
Figure 38:
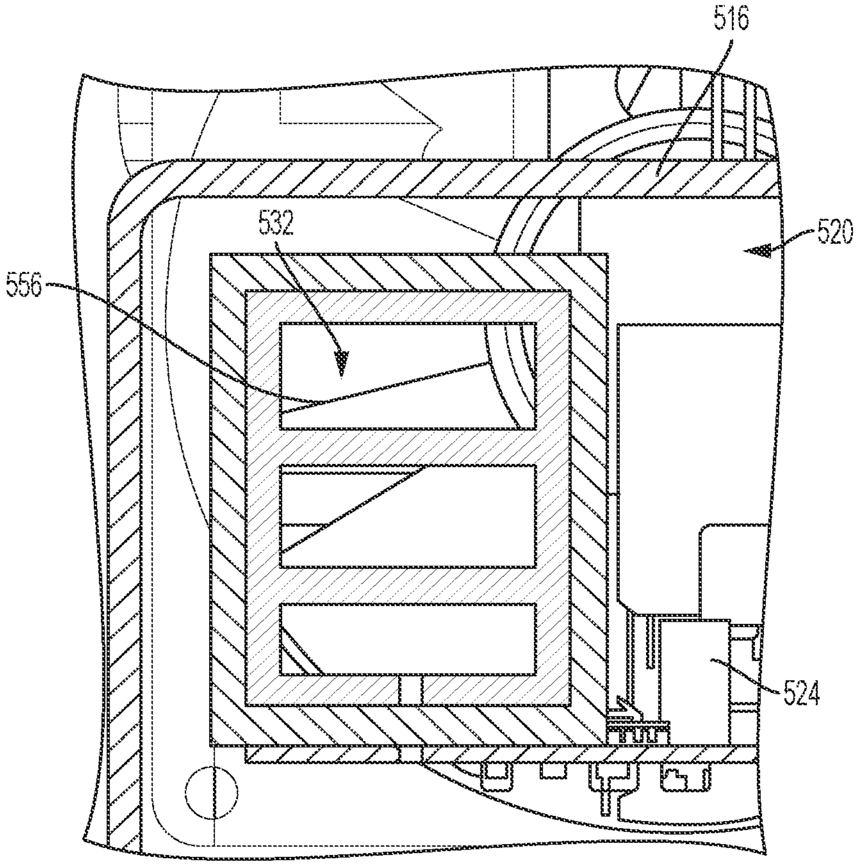
FIG. 38 is a section view taken along line 38-38 of FIG. 36.

Furthermore, each cooling channel 532 also includes one or more heat sinks 552 positioned therein. As shown in FIG. 36, the fins 556 of the heat sinks 552 provide maximum thermal communication with the air flowing though the channels 532 while maintaining fluid isolation therebetween. More specifically, the charger 512 includes one or more seals 556 positioned between the heat sink 552 and the housing 516 of the charger 512 to maintain the fluid integrity of the electrical volume 520 (see FIG. 37).

The collection chamber 536 also includes an outlet 560 open to the outside of the housing 58 (e.g., outside the housing volume 62).

Figure 39:
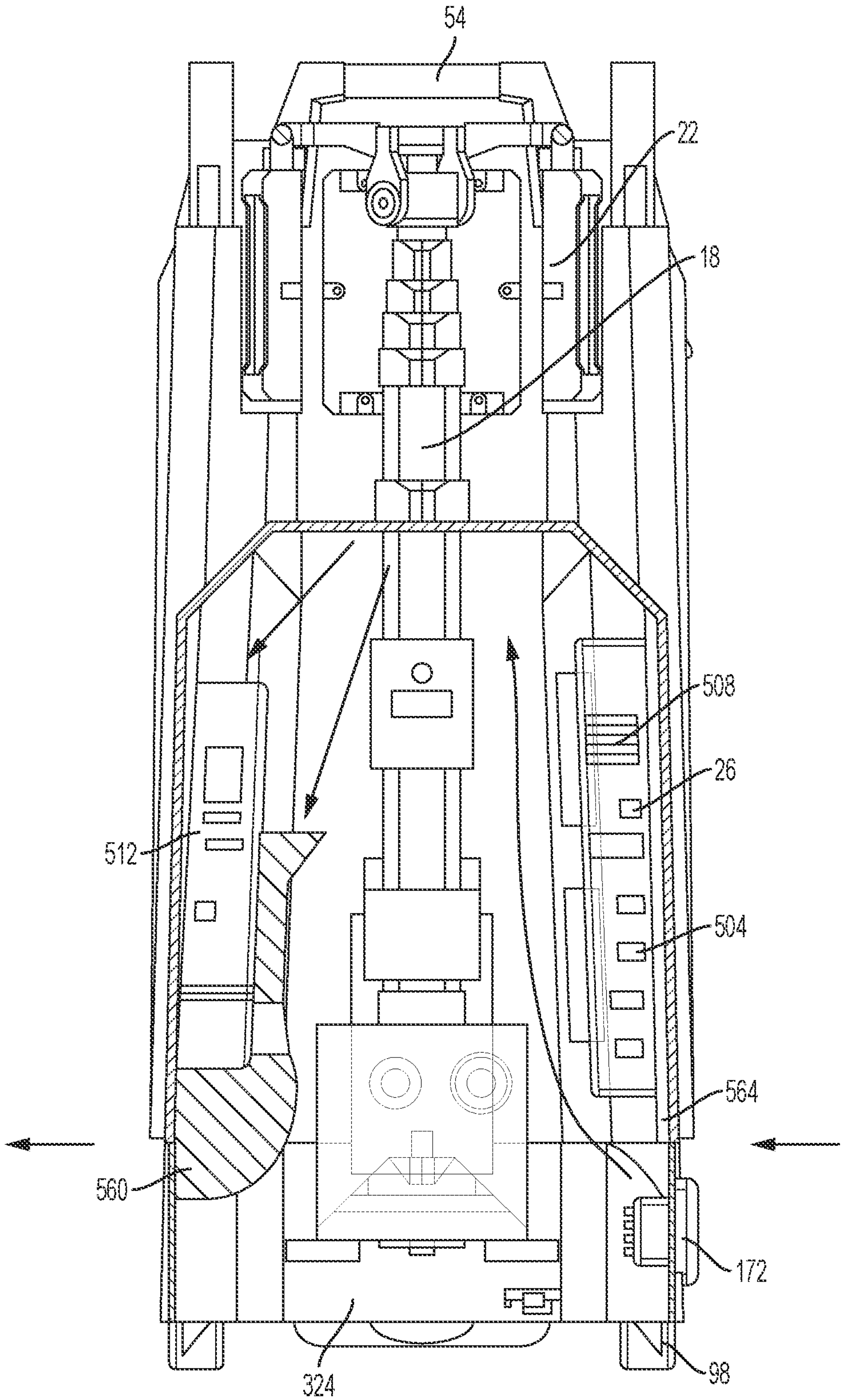
FIG. 39 is a section view of the site light showing a general cooling airflow therethrough.

During operation, the cooling fan 540 of the cooling system 528 of the charger 512 draws air through each of the parallel cooling channels 532 and into the collection chamber 536. Since the cooling channels 532 include inlets 544 open to the housing volume 62 of the body 14, the fan 540 creates a low pressure region therein. The low pressure region, in turn, draws in exterior air via the inlet 564 formed on the opposite side of the housing 58 from the charger 512. As such, cooling air is drawn into the housing volume 62 via the inlet 564, flows past the LED driver 504 and AC/DC power source 508, and into the inlets 544 of each of the cooling channels 532 of the charger 512. The air then passes into the collection chamber 536 where it is expelled out of the site light 10 through the outlet 560 (see FIG. 39).

During operation, the light assembly 22 and power system 26 are operable in at least two modes of operation, a first economy mode and a second performance mode. The first mode is a low or economy mode. The second mode is a high or performance mode. During the economy mode of operation, the light assembly 22 outputs a lower light output, but allows performance for a longer period of time. In contrast, the performance mode of operation provides greater light output, but less run-time. In the illustrated implementation, in an economy mode of operation, the light assembly 22 of the site light 10 is configured to output between about 13,000 and about 17,000 lumens of light for about 2 hours to about 6 hours of operation. In some embodiments, the light assembly 22 is configured to output between about 13,000 and about 17,000 lumens of light for about 1.25 hours when a 4-10 Ah battery is coupled to the site light 10 when operating in the economy mode of operation. In other embodiments, the light assembly 22 is configured to output between about 13,000 and about 17,000 lumens of light for about 2.5 hours when a 3 Ah battery is coupled to the site light 10 when operating in the economy mode of operation. In still other implementations, the light assembly 22 is configured to output between about 13,000 and about 17,000 lumens of light for about 3.5-4 hours when a 6-15 Ah battery is coupled to the site light 10 when operating in the economy mode of operation.

In contrast, in a performance mode of operation, the light assembly 22 outputs approximately 20,000 lumens of light for about 1 hour to about 4 hours of operation. In some embodiments, the light assembly 22 is configured to output between about 20,000 lumens of light for about 4 hours when a 4-10 Ah battery is coupled to the site light 10 when operating in the performance mode of operation. In other embodiments, the light assembly 22 is configured to output between about 20,000 lumens of light for about 2 hours when a 3 Ah battery is coupled to the site light 10 when operating in the performance mode of operation. In still other implementations, the light assembly 22 is configured to output between about 20,000 lumens of light for about 5-6 hours when a 6-15 Ah battery is coupled to the site light 10 when operating in the economy mode of operation.

Figure 40:
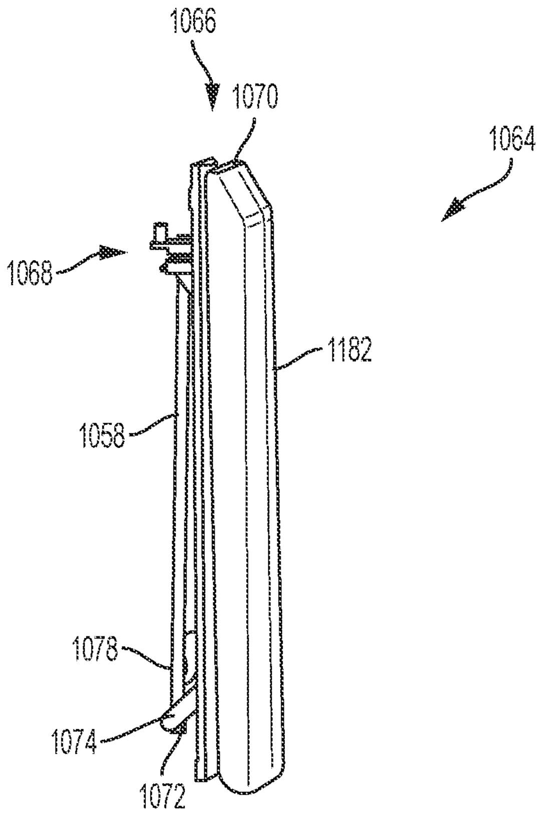
FIG. 40 is a perspective view of another embodiment of a leg assembly.
Figure 41:
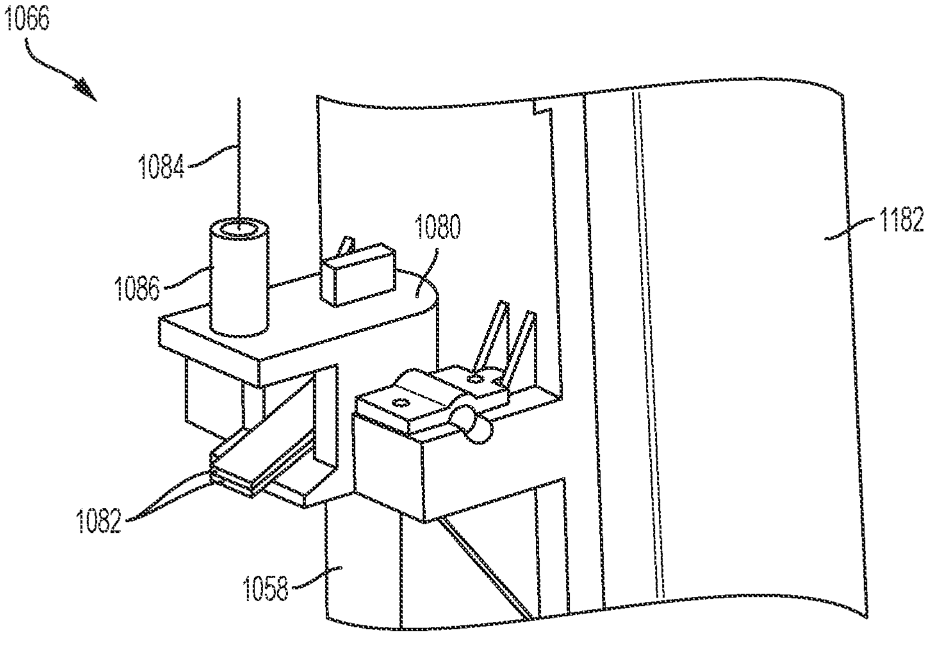
FIG. 41 is a detailed view of a bar clamp of the leg assembly of FIG. 40.

FIGS. 40 and 41 illustrate an alternative embodiment of a leg assembly 1064 for use with the site light 10 as described above. Legs 1182 of the leg assembly 1064 are movably coupled to the body 14, by way of a deployment mechanism 1066 and a lock mechanism 1068, between an extended position (not shown) and a retracted position (as shown). Each leg 1082 is independent from the other legs 1082 (not shown). As such, the corresponding site light 10 includes a lock mechanism 1066 and a deployment mechanism 1068 for each one of the legs 1182, and each deployment mechanism 1066 and lock mechanism 1068 operates independently from the other deployment mechanisms 1066 and lock mechanisms 1068, respectively. In other constructions, there may be a single lock mechanism 1066 and/or deployment mechanism 1068 operatively coupled to all of the legs 1182 to collectively operate the legs 1182. In some constructions, the deployment mechanisms 1066 are actuated to deploy the legs 1182 simultaneously by way of a single actuator (not shown). In other constructions, the deployment mechanisms 1066 may be actuated individually by way of an actuator at each leg 1182.

In this construction of the deployment mechanism 1066, each leg 1182 is slidably and pivotably attached to the body 14 of the site light 10 about a movable leg pivot 1070 at the rail 1058. The movable leg pivot 1070 is disposed proximate an upper distal end of the leg 1182, e.g., “upper” or “upwards” being generally opposite, or away from, the base 46 of the site light 10 with respect to the axis 66. A linkage 1072 is pivotably coupled to the rail 1058 at a fixed pivot 1074, which is fixed relative to the body 14 proximate a lower end of the rail 1058, e.g., generally proximate the base 46 of the site light 10. The linkage 1072 includes an opposite distal end 1076 that is pivotably coupled to the leg 1182 at a movable linkage pivot 1078, which is movable relative to the body 14. The movable linkage pivot 1078 is disposed proximate a lower end of the leg 1182. The rail 1058 is disposed between the linkage 1072 and the lock mechanism 1068 for locking and unlocking the deployment mechanism 1066 and, thereby, locking and unlocking the leg 1182.

With reference to FIGS. 40 and 41, the lock mechanism 1068 includes a bar clamp 1080 (or any suitable clamp mechanism) with movable plates 1082. The bar clamp 1080 is slidably mounted to the rail 1058. The plates 1082 include an aperture (not shown) therethrough, and the rail 1058 is received through the aperture. The plates 1082 are movable between an angled position, in which the plates 1082 are angled with respect to the rail 1058 (e.g., by 45 degrees or any other suitable angle that is not 90 degrees) and clamped to the rail 1058, and a perpendicular position (about 90 degrees to the rail 58), in which the plates 1082 are slidable over the rail 1058. The bar clamp 1080 is unlocked using a cable 1084 that is received by a boss 1086 and operatively coupled to move the plates 1082 from the angled position to the perpendicular position. A cable actuator (not shown) is operable by an operator to move the cable 1084. In some constructions, a single cable actuator is operatively coupled to all of the cables 1084 to control the deployment of all the legs 1182 together. In other constructions, there is a separate cable actuator for each of the legs 1182 to control each leg 1182 independently.

With continued reference to FIGS. 40 and 41, to deploy any of the legs 1182, the operator actuates one or more cable actuators (not shown) to deploy the legs 1182 either individually or together as described above. In cooperation with the one or more cable actuators, the cable 1084 moves the plates 1082 from a locked position (as shown in FIG. 40 at an angle of about 45 degrees relative to the rail 1058) to the unlocked position, in which the plates 1082 are substantially perpendicular to the rail 1058. When in the unlocked position, the lock mechanism 1068 allows the leg 1182 to move down relative to the rail 1058, which allows the linkage 1072 to pivot about the fixed pivot 1074. As a result, a distal end 1028 of the leg 1182 moves away from the body 14 thereby allowing the leg 1182 to extend towards the support surface. Each leg 1182 stops and locks upon coming into contact with the support surface. To stow the legs 1182, the operator unlocks the legs 1182, moves the legs 1182 back to the stowed position, and locks the legs 1182 in the stowed position.

Figure 42:
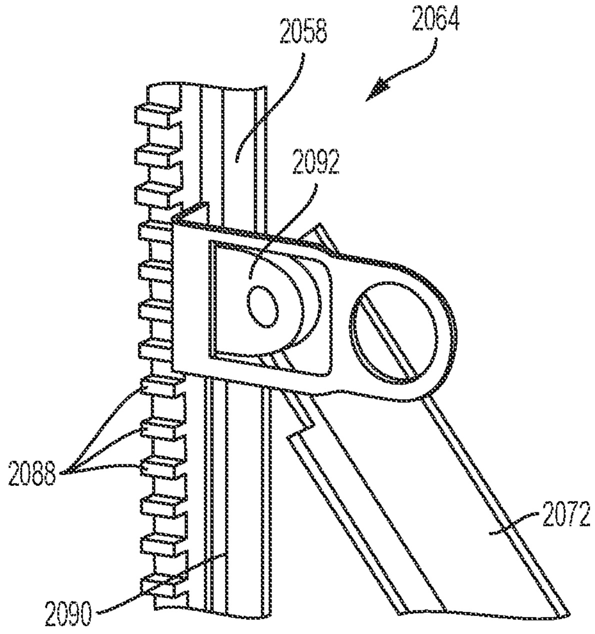
FIG. 42 is a perspective view of another embodiment of a leg assembly.
Figure 43:
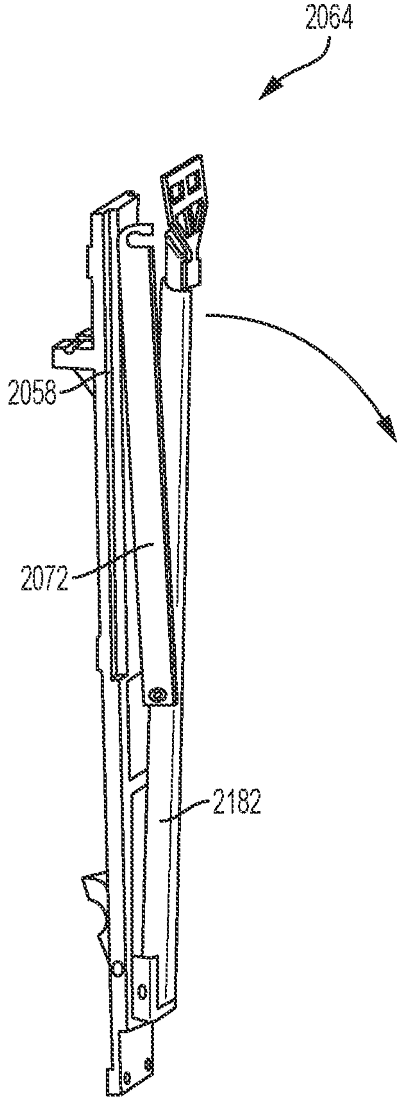
FIG. 43 is a detailed view of a sliding latch of the leg assembly of FIG. 42.

FIGS. 42 and 43 illustrate yet another embodiment of a leg assembly 2064 for use with the site light 10 as describe above. In this construction, a rail 2058 includes slots 2088. Leg 2182 is pivoted relative to the rail 2058 at a lower end, proximate a base 2052. A linkage 2072 is slidably and pivotably coupled to the rail 2058 in a track 2090 by way of a locking mechanism 2068 at one end and movably pivoted to an intermediate portion of the leg 2182 at another end. The locking mechanism 2068 includes a sliding latch 2092 that keys into the slots 2088 in the rail 2058. The sliding latch 2092 may be actuated individually or together such that the sliding latch 2092 on each leg 2182 is actuated at once.

With continued reference to FIGS. 42 and 43, to deploy any of the legs 2182, the operator releases the sliding latch 2092 on each leg 2182. Each leg 2182 stops and locks upon contact with the support surface. To stow the legs 2182, the operator unlocks the legs 2182, moves the legs 2182 back to the stowed position, and locks the legs 2182 in the stowed position. The legs 2182 may be deployed individually or together and may be locked individually or together.

Figure 44:
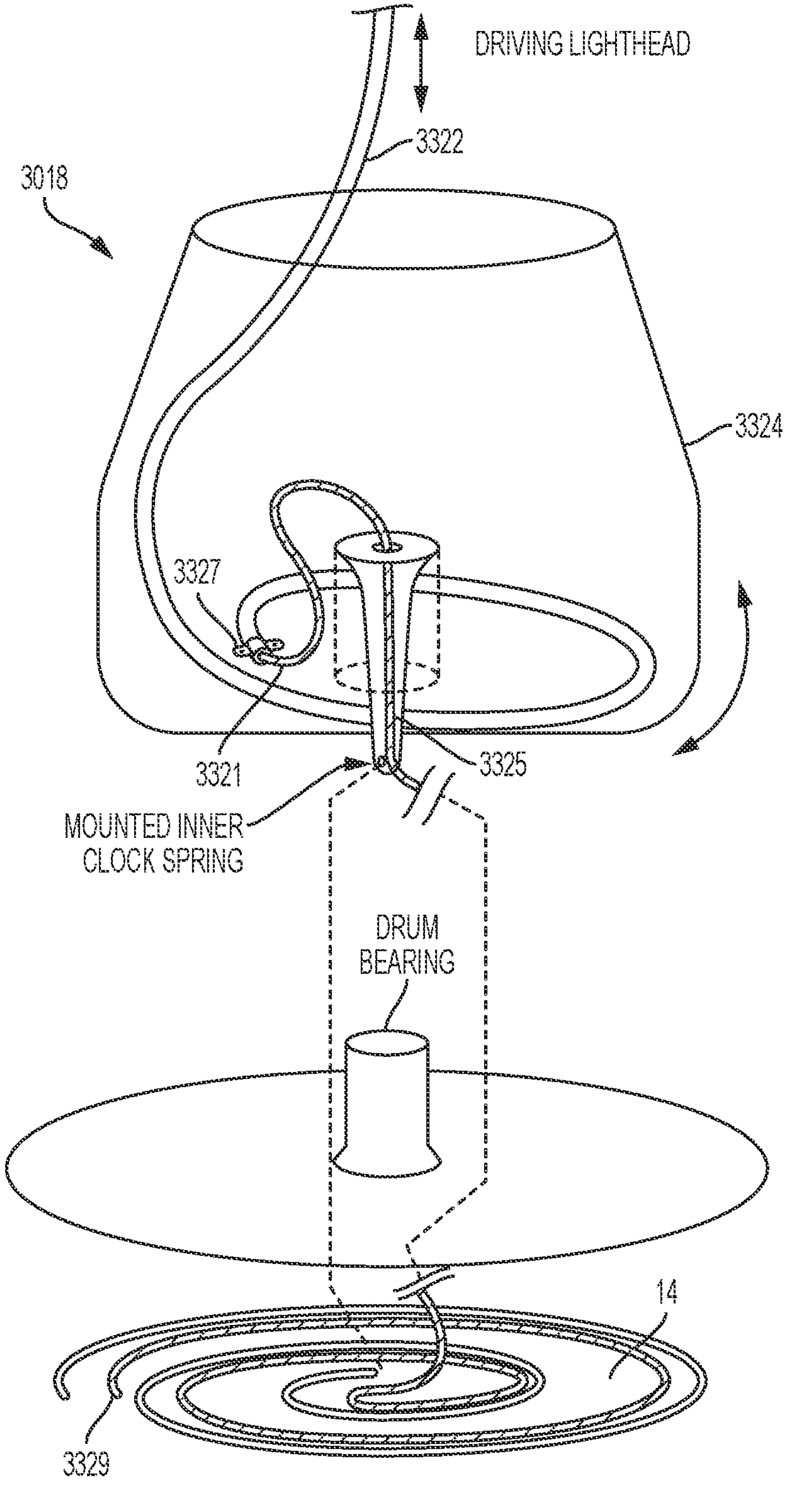
FIG. 44 is an exploded view of another embodiment of a drive assembly.

FIG. 44 illustrates another embodiment of the drive assembly 3318 for use with the arm assembly 18 as described above. The drive assembly 3318 includes a cable 3322 having one end coupled, e.g., electrically coupled, to the power system 26 through a connecting wire 3325 configured in a clock spring configuration. A first end 3321 of the connecting wire 3325 is coupled to and rotatable together with the rotating drum 3324 via the clamp 3327, while the second end 3329 of the connecting wire 3325 is rotationally fixed to the body 14 of the site light 10. As the drum 3324 rotates with respect to the body 14, the light sources and the wires, coils of the connecting wire 3325 move from locations proximate the outer diameter of the connecting wire housing to locations proximate the inner diameter of the connecting wire housing, allowing for rotation of the drum 3324. As the drum 3324 rotates retracting the light sources and the wires, coils of the connecting wire move from locations proximate the inner diameter of the connecting wire housing to locations proximate the outer diameter of the connecting wire housing, allowing for rotation of the drum 3324.

Figure 45A:
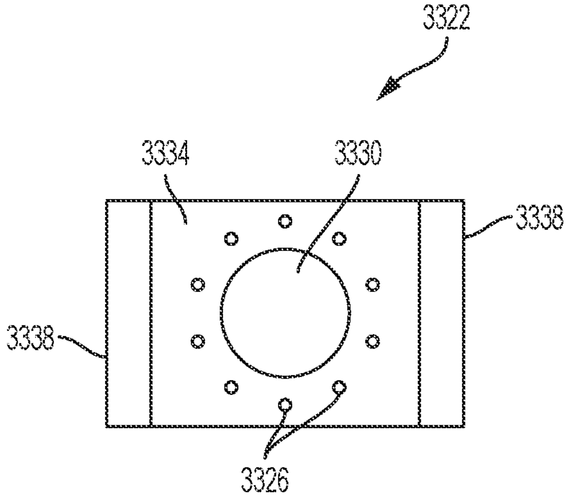
FIGS. 45A and 45B are section views of another embodiment of a cable.
Figure 45B:
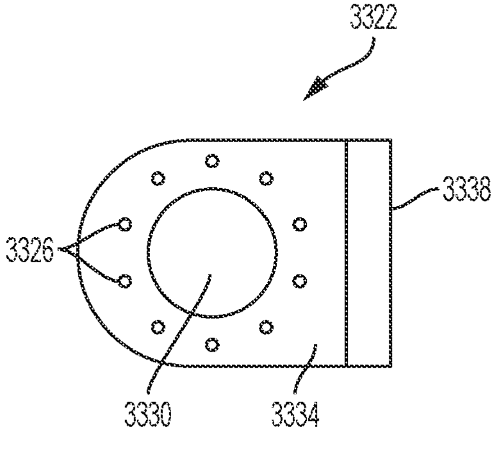

FIGS. 45A and 45B illustrate additional embodiments of the cable 3322. The cable 3322 includes a plurality of individual wires 3326 wrapped around a support rod 3330 made of fiberglass or other relatively rigid materials. The combined support rod 3330 and wires 3326 may then receive an extruded jacket 3334, providing teeth or gears 3338 for engagement with the wheels 358, 362 of the drive assembly 318. As shown in FIG. 45A, the extruded jacket 3334 may include teeth on both sides to engage both the drive wheel 358 and the idle wheel 362, or as shown in FIG. 45B, may only include teeth on one side to only engage the drive wheel 362.

FIGS. 46-56 illustrate another embodiment of a site light 4010. The site light 4010 includes a base 4014, a diffuser chamber 4018, and a light head 4022. The base 4014 includes a user interface 4026 that may include actual and virtual controls and that can be used to control the operation of the light 4010. In addition, a remote device (not shown) may also be used to control the device using a wireless communication protocol (e.g., Bluetooth, WIFI, proprietary protocols, and the like). In some embodiments, the light 4010 can also communication with other device such as power tools, other site lights, and the like (not shown) in a network to coordinate activities and monitor power usage and other functions of the various devices. At minimum, the user interface 4026 includes a power button that allows the light 4010 to be turned on and off. However, preferred embodiments also allow for multiple mode selections, dimming, and the like.

The site light 4010 also includes one or more handles 4026 attached to or formed as part of the base 4014 and arranged to facilitate easy carrying of the light 4010 or convenient movement of the light 4010 from location to location. In the illustrated construction, a single handle 4026 is placed on the back of the base 4014 to facilitate the desired movements.

In preferred embodiments, the light 4010 is powered by one or more battery packs (not shown) that are removably received in the base 4014. For example, the battery packs may include power tool battery packs. In some embodiments, the battery packs may be positioned inside the base 4014 for added protection.

In addition to the battery packs, the light 4010 also includes one or more AC power outlets 4030 and an AC power inlet 4034 to allow the light 4010 to be powered by an AC power source. The outlets 4030 provide a convenient source of AC power for any AC power tools or other devices that might be used in proximity to the light 4010. In some constructions, the light 4010 may include a charging circuit (not shown) that allows batteries to be charged via the AC power provided at the AC inlet 4034.

Figure 46:
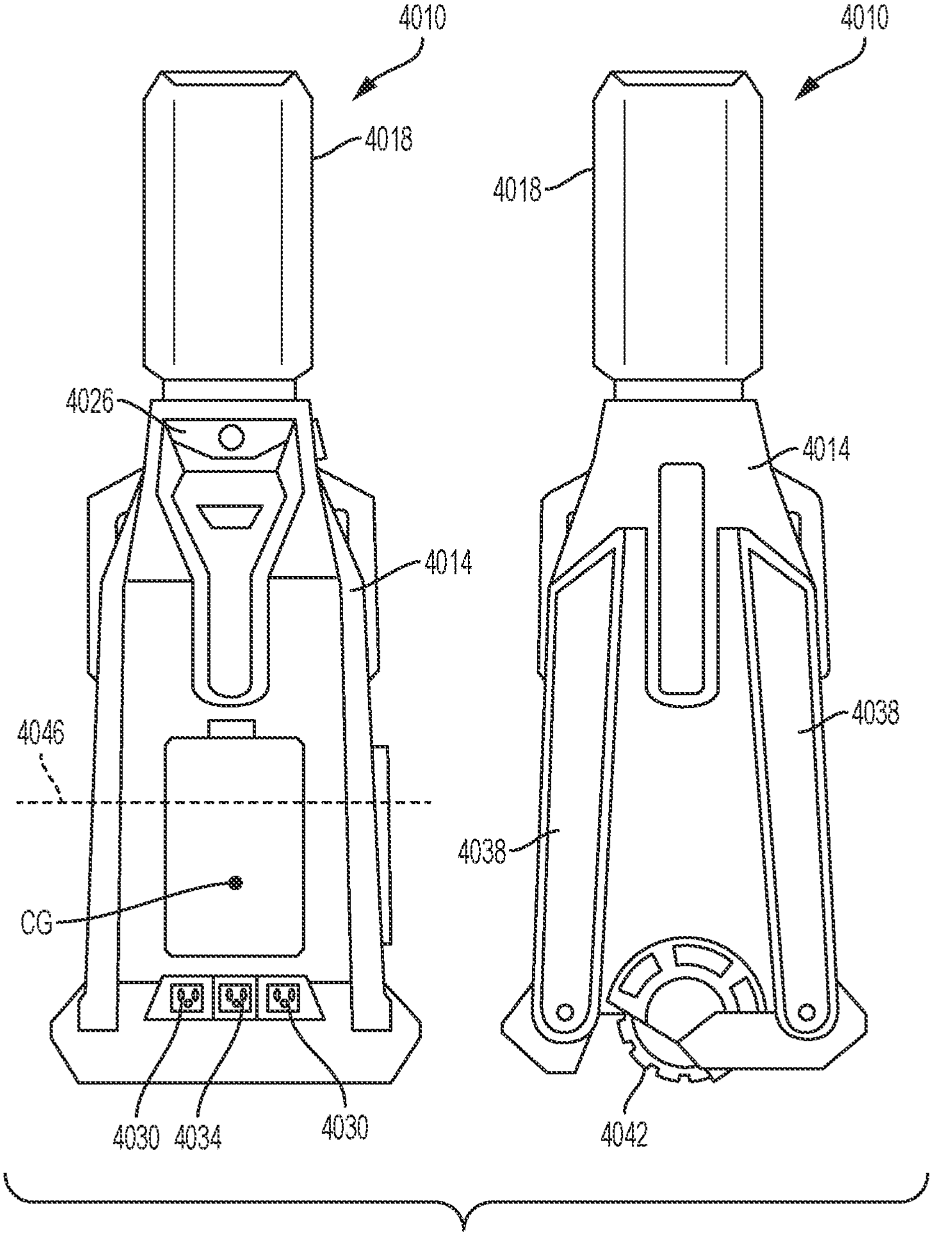
FIG. 46 includes a front view and a rear view of another embodiment of a site light with legs in a stowed position.
Figure 47:
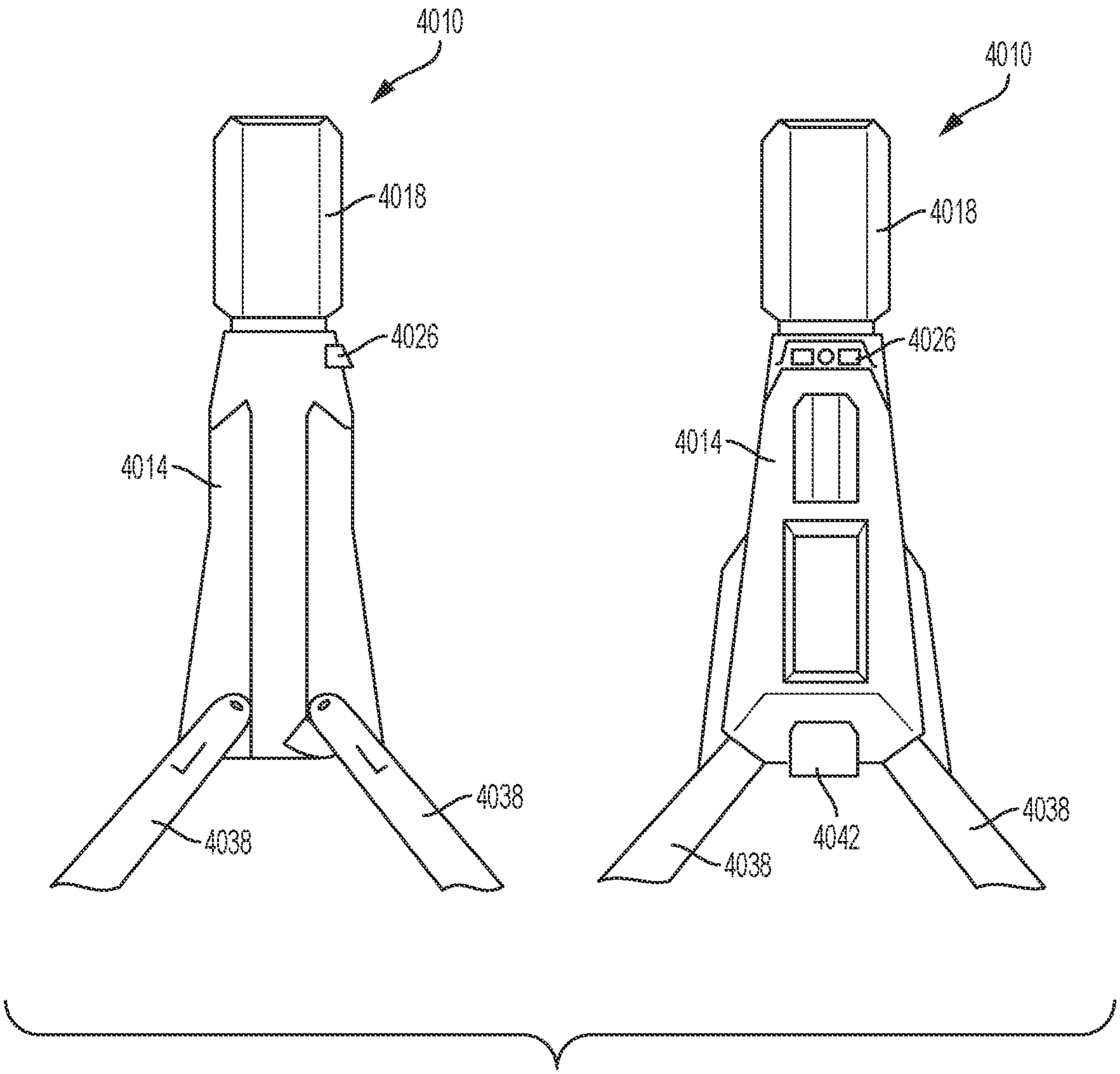
FIG. 47 includes a front view and a rear view of the site light of FIG. 46A with the legs in a deployed position.

With continued reference to FIGS. 46 and 47, the light 4010 also includes a plurality of legs 4038 that are movable between a folded or stowed position as shown in FIG. 46, and an extended position as shown in FIG. 47. The legs 4038 provide additional stability when the light 4010 is positioned in its desired operating position. The illustrated embodiment includes four legs with fewer or more being possible if necessary. The light 4010 also includes a pair of wheels 4042 in the bottom of the base 4014 that facilitates rolling movement of the light 4010 as will be discussed below.

The light 4010 is also configured so that the heaviest components are positioned near the bottom of the base 4014. As such, the center of gravity CG of the device is positioned nearer the bottom of the base 4014 for more stability (e.g., below the geometric center plane 4046 of the base 4014).

Figure 48:
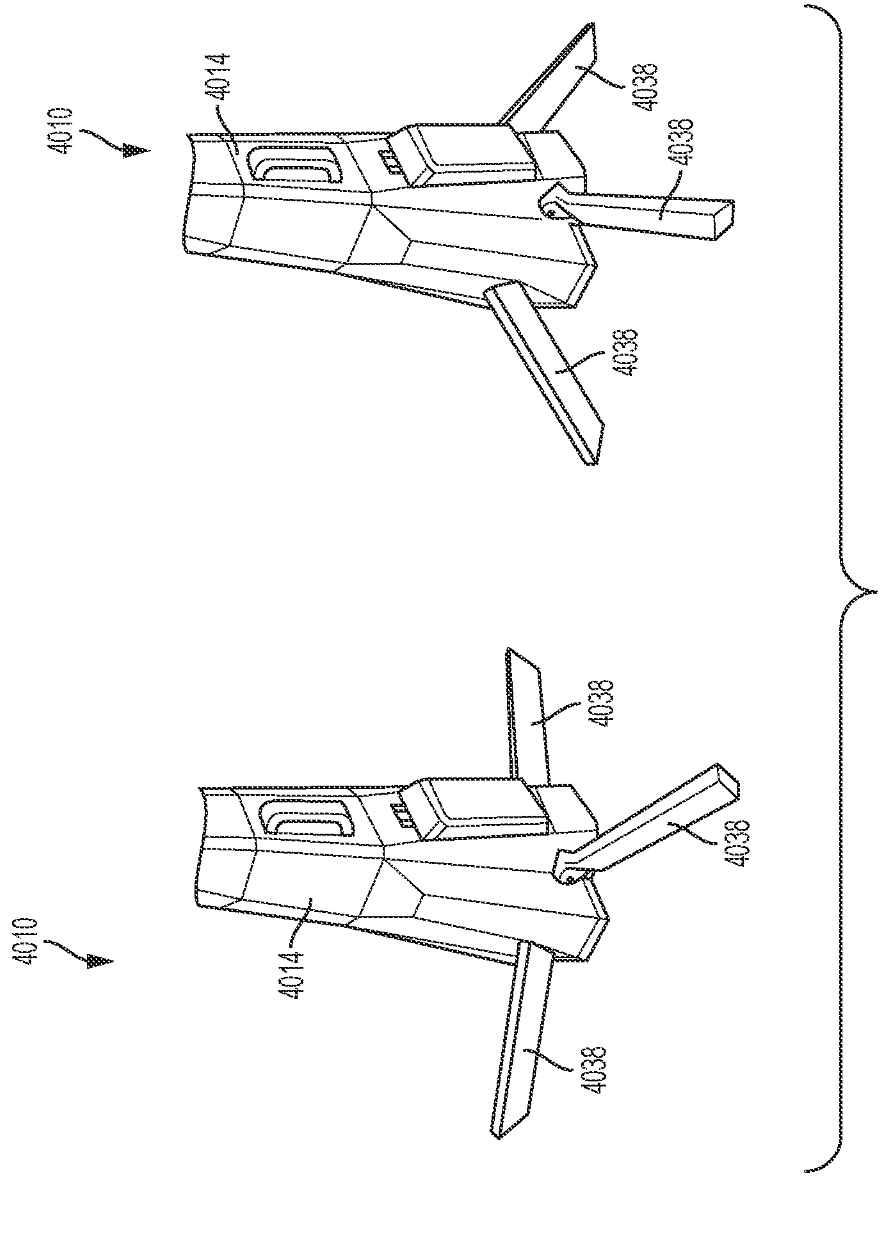
FIG. 48 is a perspective view of the site light of FIG. 46A with the legs in various deployed positions.

As illustrated in FIG. 48, the legs 4038 are each rotatably attached to the base 4014 to allow them to rotate between the folded position and the extended position. The legs 4038 may include locking mechanisms (not shown) that lock the legs in the folded or the deployed position to inhibit unwanted movement. In a more preferred arrangement, the legs 4038 include multiple locking positions to facilitate positioning the light 4010 on uneven ground. In addition, the legs 4038 can be rotated to a position in which they are substantially flat or coplanar with the bottom of the base 4014. In this position, the legs 4038 effectively widen the base and provide for a more stable arrangement.

Figure 49:
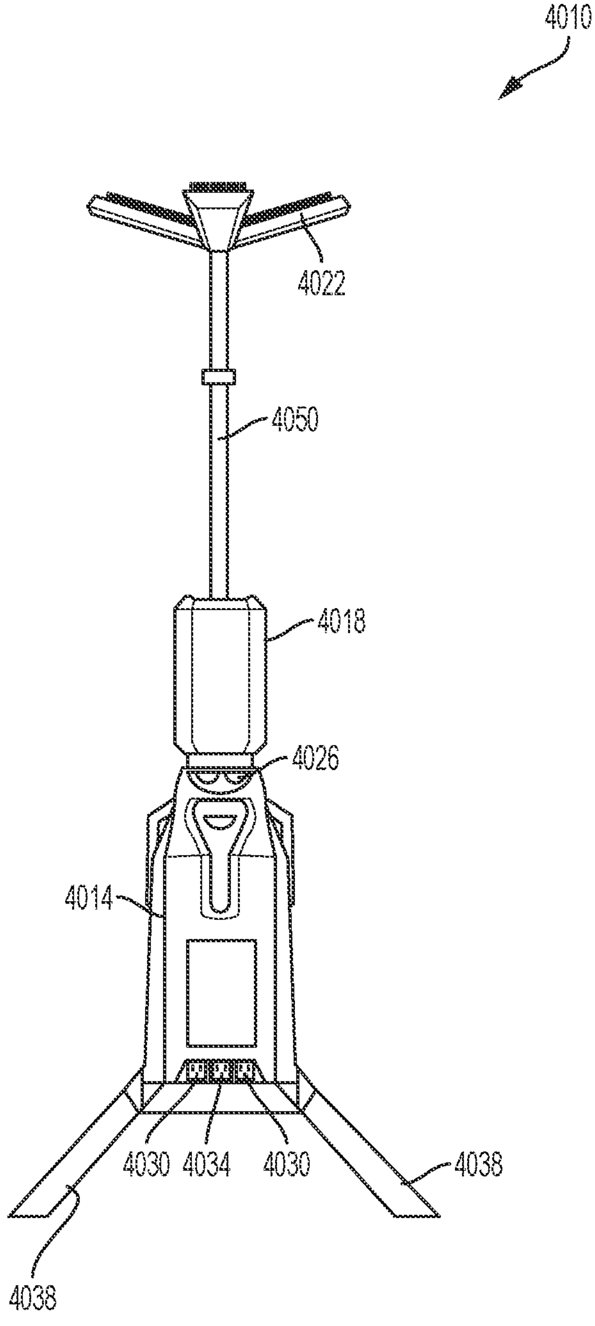
FIG. 49 is a front view of the site light of FIG. 46A with a light head in a deployed position.

As illustrated in FIG. 49, the diffuser chamber 4018 and the light head 4022 cooperate to define a light engine that provides the desired illumination. The diffuser chamber 4018 is essentially sized to receive the light head 4022 therein when the light head 4022 is in a folded or compact orientation. The diffuser chamber 4018 preferably includes a plurality of lens members that cooperate to define an outer wall and facilitate the transmission of light through the diffuser chamber 4018. The lenses are preferably opaque and diffuse the light produced by the light head 4022. In other embodiments, the lenses may be clear or the light head 4022 include lenses that diffuse light.

With respect to FIG. 49, the light 4010 is shown with the light head 4022 extended and deployed above the diffuser chamber 4018. To accomplish this, the light head 4022 is mounted on top of an extendable support 4050 in the form of a telescoping pole. In some constructions, the lower end of the pole 4050 is fixedly attached to the base 4014 and in others it is fixedly attached to the diffuser chamber as will be discussed in detail below.

Figures 50A, 50B, 50C, 50D, 50E, 50F:
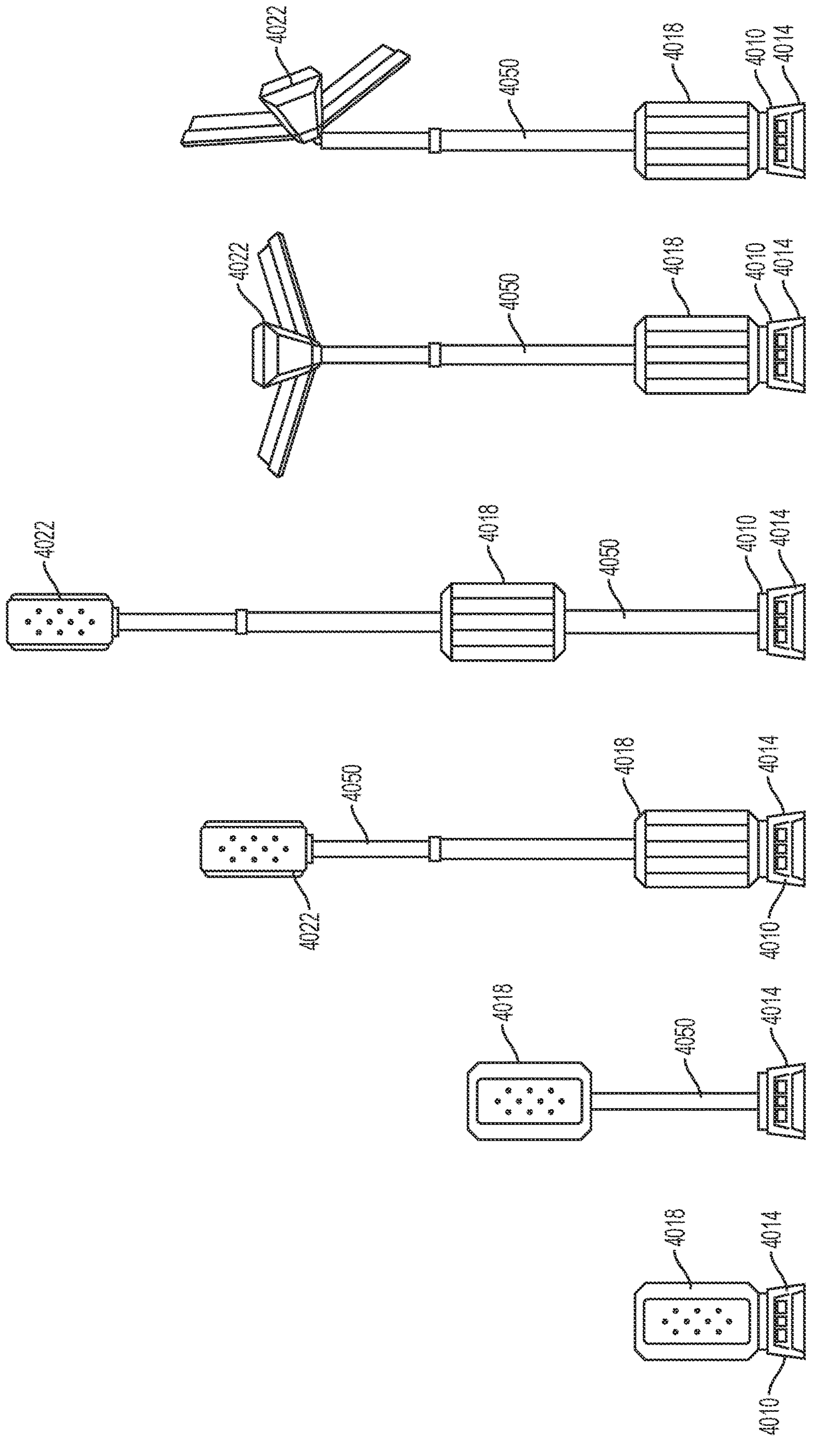
FIG. 50*a*-50*f* illustrate different deployment configurations for the light head of the site light of FIG. 46A.
Figure 51:
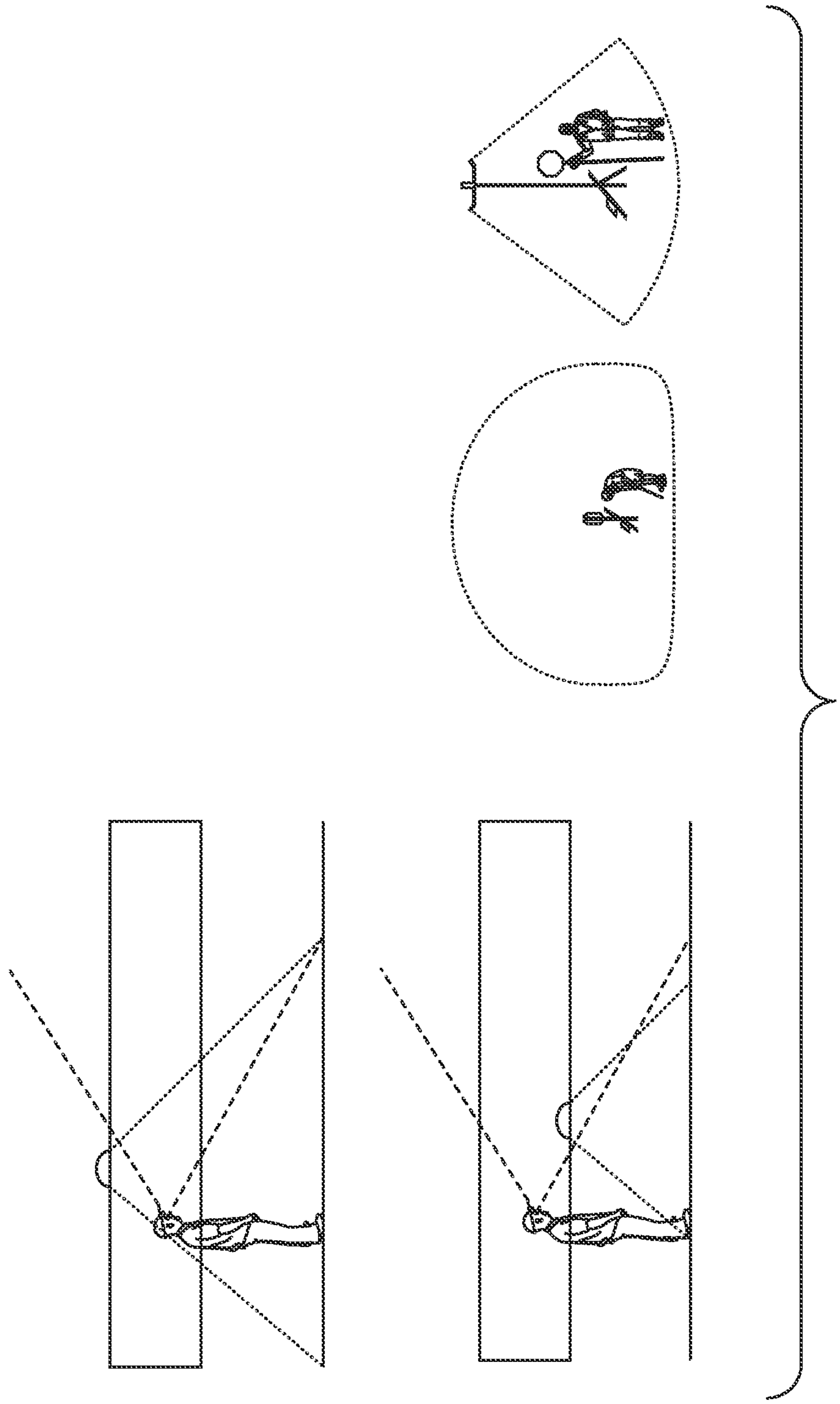
FIG. 51 illustrates how light interacts with a user in different deployment configurations.

FIG. 51 includes two illustrations that better explain some of the advantages of having the light head 4022 positioned above the user's eyes. When the light is emitted at eye level, the user is often subjected to glare or flashes when she looks in the direction of the light source. This can cause undo eye fatigue. By positioning the light head 4022 well above or below this view plane, the glare can be reduced. The second image of FIG. 51 illustrates the differing patterns of light produced by the two arrangements of the light illustrated in FIGS. 50*a* and 50*e*. The arrangement of FIG. 50*a* produces a large dome of light that is well suited for workers working within the dome to see what they are working on. The arrangement of FIG. 50*e* produces the downward facing cone of light and particularly suited to illuminating people or objects in the lit area for people outside of the area to see.

Turning to FIGS. 50*a*-50*f*, several arrangements of the light 4010 are illustrated. In the first position, FIG. 50*a*, the light head 4022 is fully retracted and disposed in the diffuser chamber 4018. In this position, diffuse light is emitted from the lowest possible plane to produce the dome of light illustrated in FIG. 51.

FIG. 50*b* illustrates another position in which the light head 4022 and the diffuser chamber 4018 are extended above the base 4014 on a telescoping pole 4050. In this arrangement, the same dome of light is produced as is produced by the arrangement of FIG. 50*a*, but the lowermost plane is raised. As discussed above, the light could include a single telescoping pole 4050 that is fixed to the base 4014 and which can move the light head 4022 and the diffuser to an extended position either together or separately. In this arrangement, the diffuser chamber 4018 would move upward as the first sections of the telescoping pole 4050 are extended while the last sections would extend the light head 4022 above the diffuser chamber.

In another arrangement, a first telescoping pole 4050 is connected at one end to the base 4014 and at another end to the diffuser chamber 4018. This pole 4050 can be extended to raise the diffuser chamber 4018 and the light head 4022 together. A second telescoping pole 4050 is attached to the diffuser chamber 4018 and the light head 4022 to facilitate the raising of the light head 4022 with respect to the diffuser chamber 4018.

FIG. 50*c* illustrates another arrangement in which the diffuser chamber 4018 remains positioned near the base 4014 of the light 4010, but the light head 4022 is extended upward and not unfolded. This arrangement will produce a dome of light similar to those of FIGS. 50*a* and 50*b*. However, the dome will emanate from a higher plane and because the light head 4022 is removed from the diffuser chamber 4018, the light 4010 will not be as diffused as it would be in the arrangements of FIGS. 50*a* and 50*b*.

FIG. 50*d* is similar to that of FIG. 50*c* but the diffuser chamber 4018 and therefore the light head 4022 is extended further above the base 4014.

FIGS. 50*e* and 50*f* are similar to FIG. 50*c* in that the light head 4022 is extended above the base 4014, but the diffuser chamber 4018 is positioned near the base 4014. However, FIGS. 50*e* and 50*f* illustrate alternative arrangements of the light head 4022. In FIG. 50*e*, the light head 4022 is opened in a manner similar to the petals of a flower. In this arrangement, the light is directed downwardly more than outwardly. The result is a smaller but more intensely illuminated area. In FIG. 50*f*, the light head 4022 is arranged to direct the light in a particular direction rather than downwardly.

It should be noted that the different arrangements illustrated in FIGS. 50*a*-50*f* can be combined or mixed to achieve any number of desired results.

Figure 52:
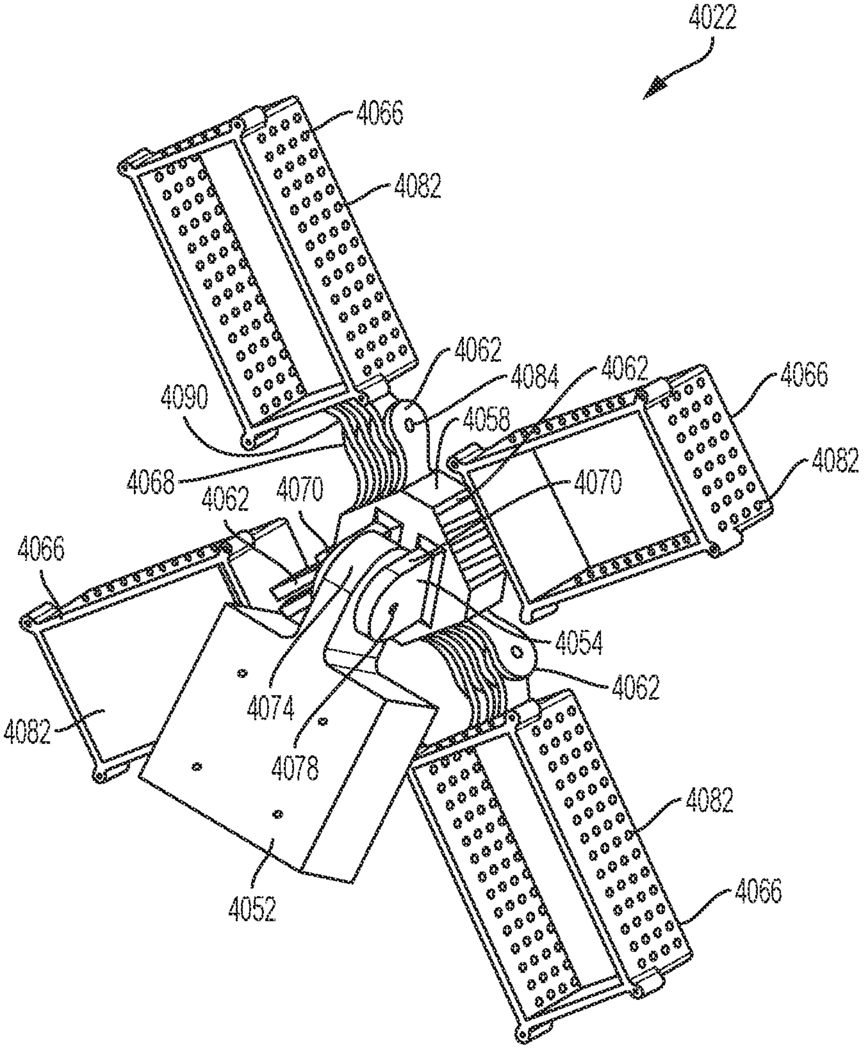
FIG. 52 is a perspective view of a light head.
Figure 53:
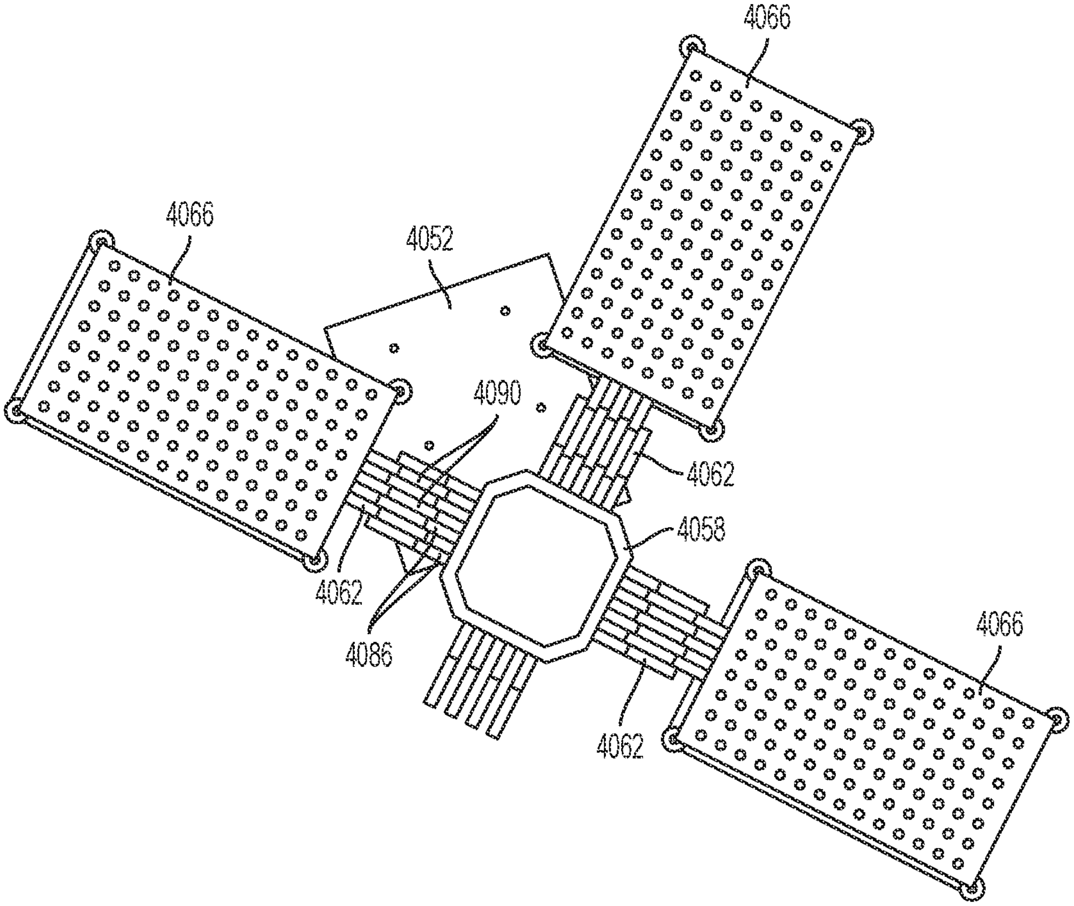
FIG. 53 is a top view of the light head of FIG. 52.

FIGS. 52 and 53 illustrate one arrangement for the light head 4022. As illustrated, the light head 4022 includes an attachment portion 4052 arranged to attach the light head 4022 to the extendible pole 4050, a first hinge 4054 connecting the connecting portion to a hub 4058, and a plurality of second hinges 4062 each connecting a light assembly 4066 to the hub 4058.

The first hinge 4054 includes a pair of ears 4070 formed on the hub 4058 and a single projection 4074 formed on the attachment portion 4052 and sized to fit between the ears 4070. A pin 4078 interconnects the ears 4070 and the projection 4074 for pivotal movement therebetween. In addition, the extendable pole 4050 can be rotated through 360 degrees thereby allowing for the aiming of the light head 4022 in virtually any direction.

Each light assembly 4066 includes a housing 4082 sized to contain the various components thereof. More specifically, a circuit board, a heat sink, and a plurality of LEDs are required to be contained within each of the light assemblies 4066. A lens (not shown) is positioned over the LEDs. In one construction, a clear lens is used with diffuse lenses also being possible.

The extensions 4086 and the ears 4090 mesh with one another and receive a pin 4094 to allow each of the light assemblies 4066 to pivot with respect to hub 4058. In other constructions, other styles of joints or hinges may be used to provide the desired degrees of freedom. For example, alternative embodiment may employ a ball and socket arrangement that allows for pivoting motion as well as rotational movement with respect to the hub 4058.

Figure 54:
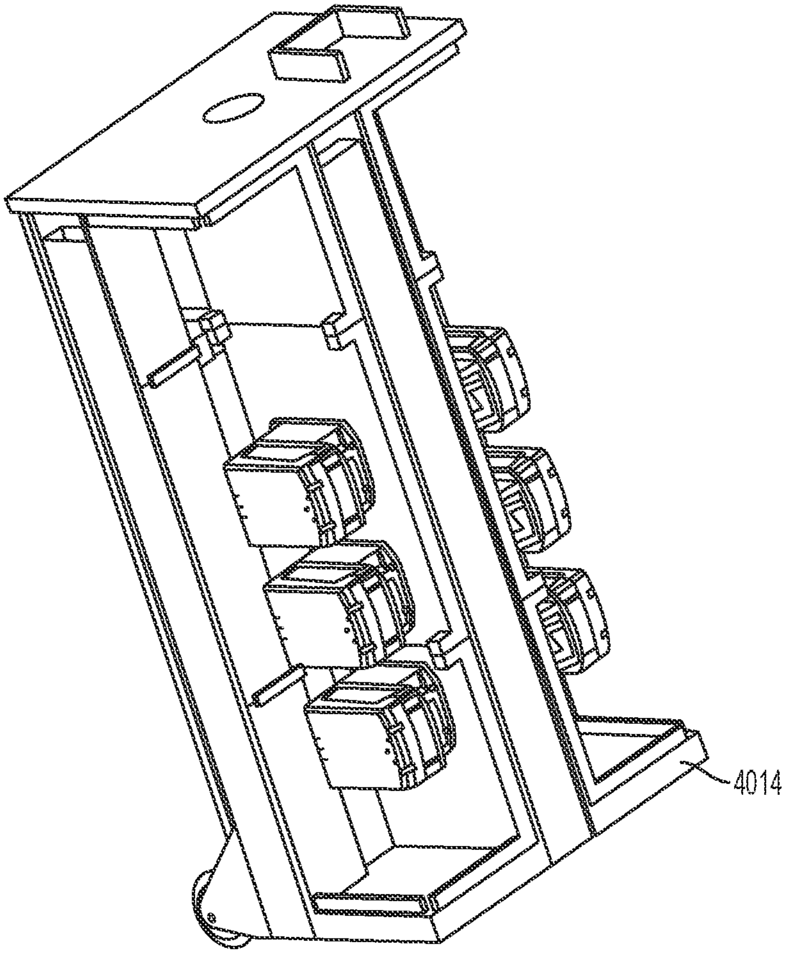
FIG. 54 is a perspective view of a base of a site light with the sides removed for clarity.

FIG. 54 illustrates the base 4014 of the light 4010 with a portion removed to illustrate an arrangement of batteries disposed therein. In this arrangement, the housing serves to protect the batteries from the exterior during use. In this construction six power tool battery packs are employed with more or fewer being possible.

Figure 55:
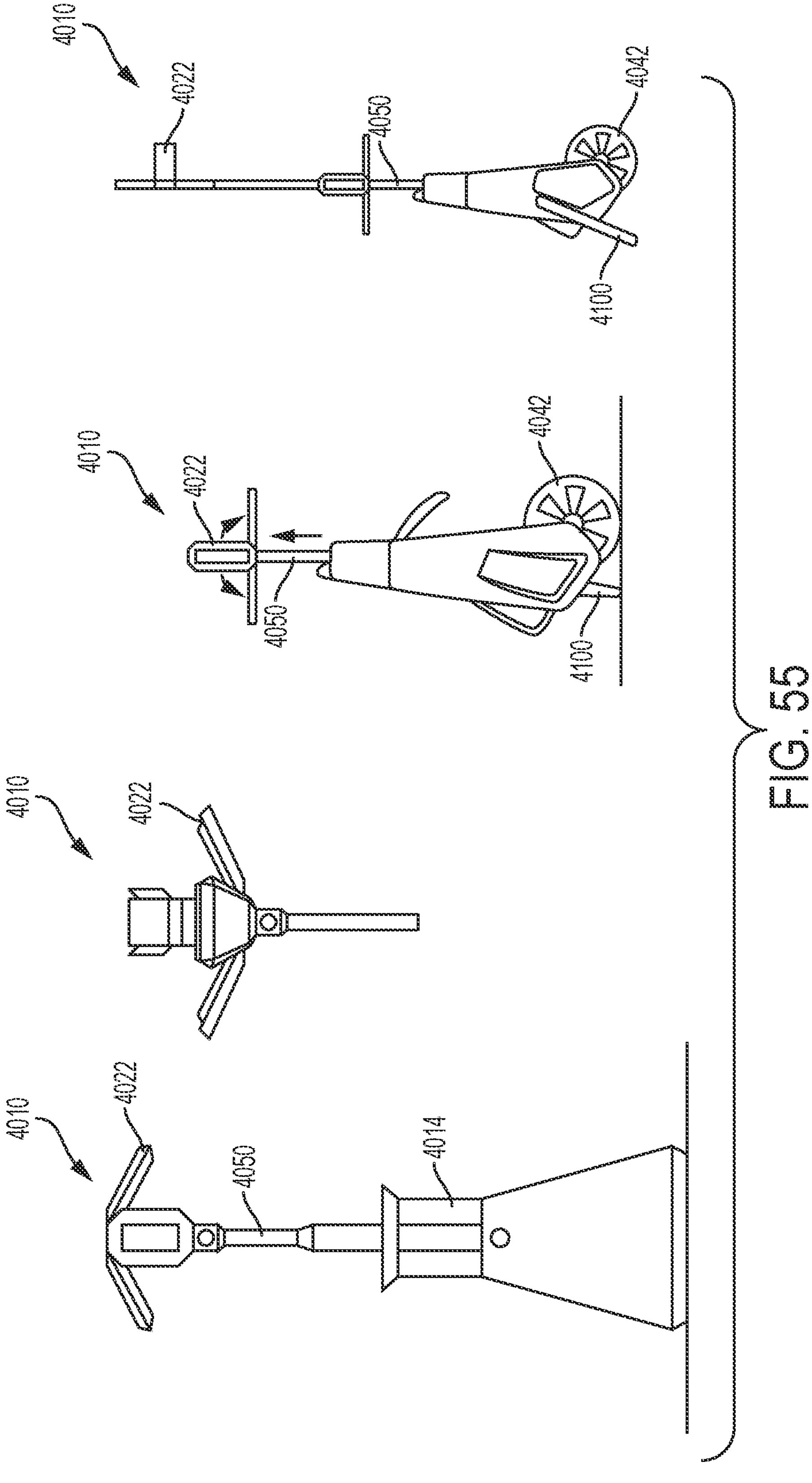
FIG. 55 illustrates another embodiment of a site light in various deployed configurations.

FIG. 55 illustrates various alternative arrangements for the light 4010. In one of the constructions the light 4010 includes a pair of wheels 4042 and a kick stand 4100 that supports the light 4010 in an upright orientation.

Figure 56:
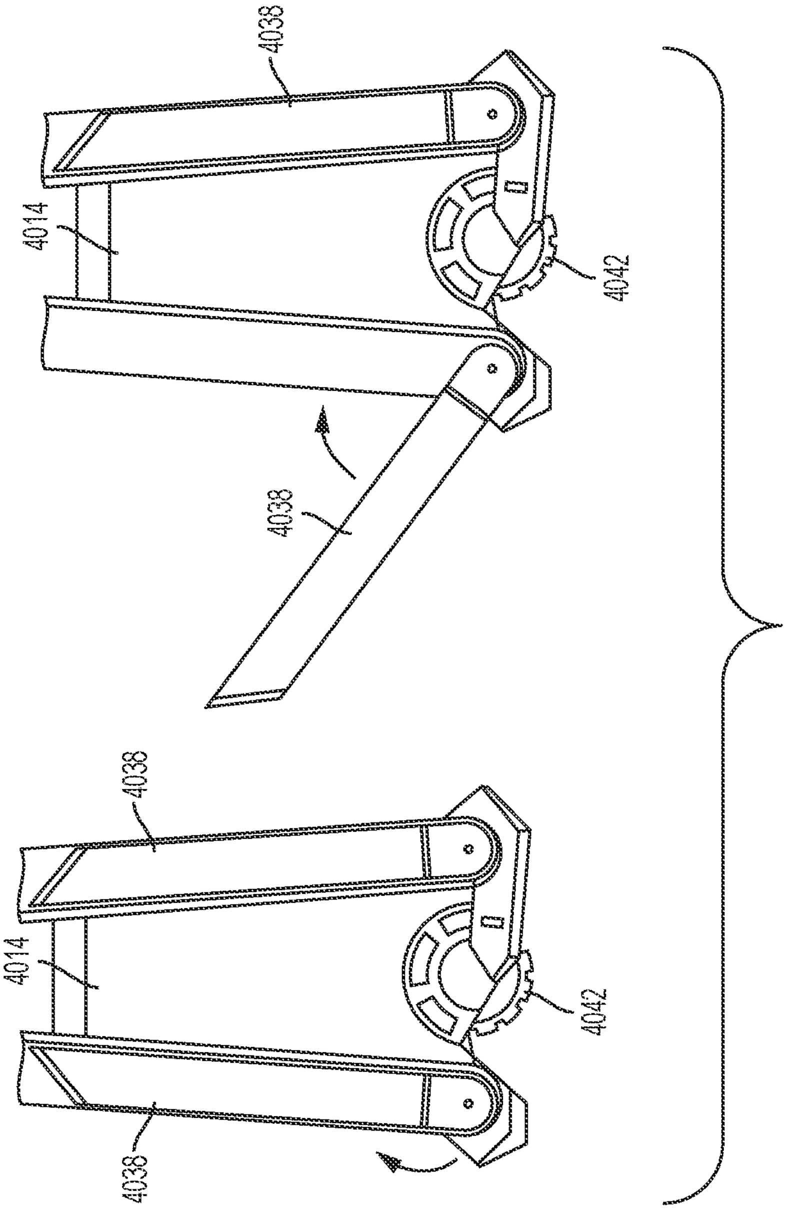
FIG. 56 is a side view of the site light of FIG. 46A with the legs in deployed and stowed configurations.
Figure 57:
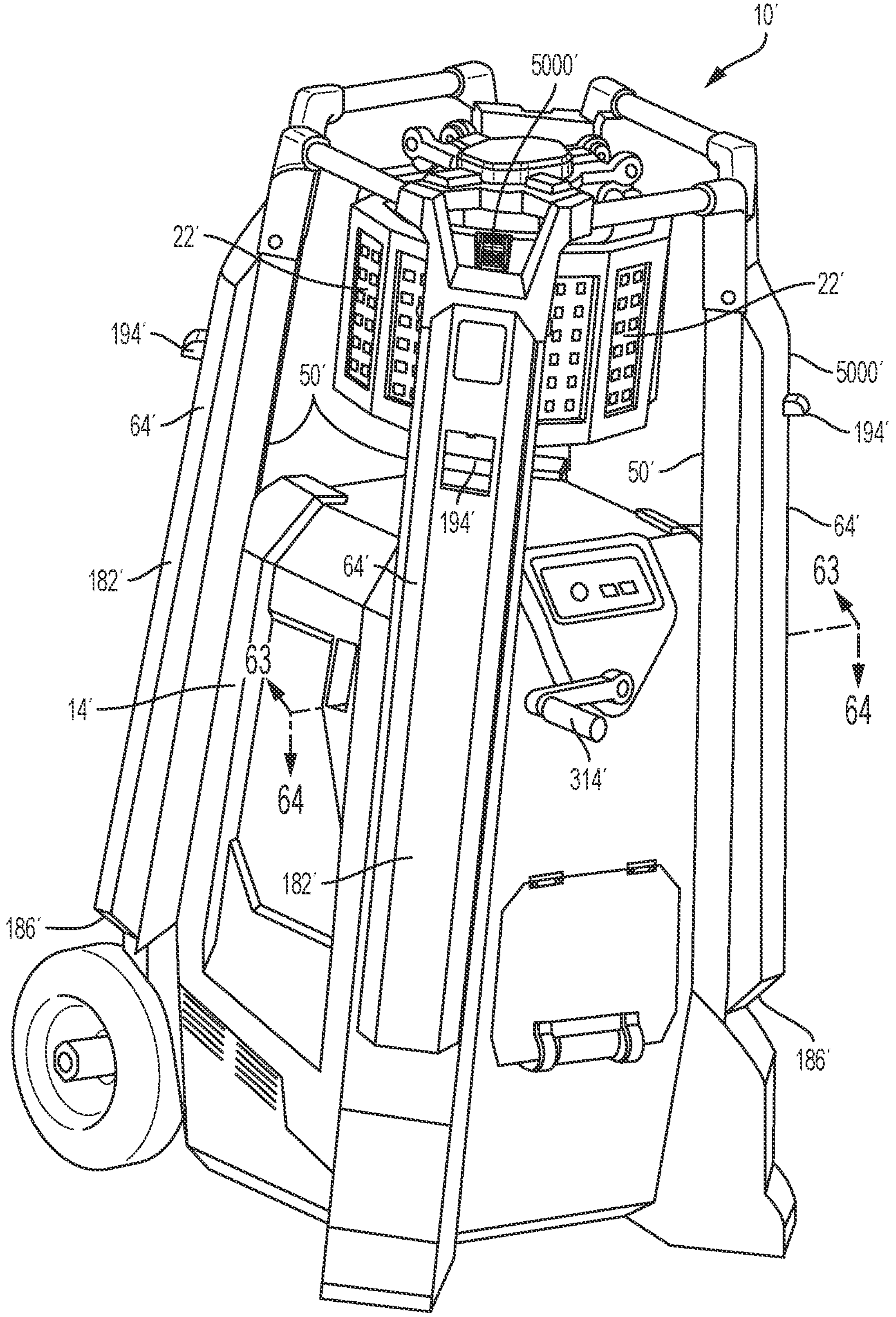
FIG. 57 is a perspective view of another embodiment of a site light.

FIG. 56 illustrates the function of the wheels 4042 discussed above with regard to FIG. 46. In the illustrated construction, two wheels 4042 are provided on a common axle (not shown) with other designs including independent axles or additional wheels. A user can lift the legs 4038 into the stowed position to allow the unit to be rolled as required. In addition, a kickstand 4100 is provided to help support the base 4014. In preferred constructions, the kickstand 4100 is retractable. In addition, a kick plate 4104 can be provided in addition to or in place of the wheels 4042 to allow a user to simply drag the light 4010 between locations. In preferred constructions, the kick plate 4104 includes a layer of more durable material (e.g., steel) that will not be damaged or destroyed during the moving process.

FIGS. 57-65 illustrate another implementation of the site light 10' that is substantially similar to the site light 10 illustrated in FIGS. 1-6 and described above. As such, only the differences between the two embodiments will be described in detail herein. Similar elements have been given the same reference number with the addition of a prime symbol (').

The site light 10' includes one or more leg assemblies 64' each coupled to a respective channel 50' of the body 14'. Each leg assembly 64', in turn, includes a leg 182' with a contact surface 186', an intermediate member 190' (FIG. 62) extending between and coupled to the leg 182' and the channel 50', a first lock mechanism 194', and a second lock mechanism 5000'. As described above, each leg assembly 64' is independently adjustable between a retracted or stowed position (see leg assembly 64 of FIG. 58), and a one or more deployed positions (see leg assembly **64*b* of FIG. 2**).

Figure 58:
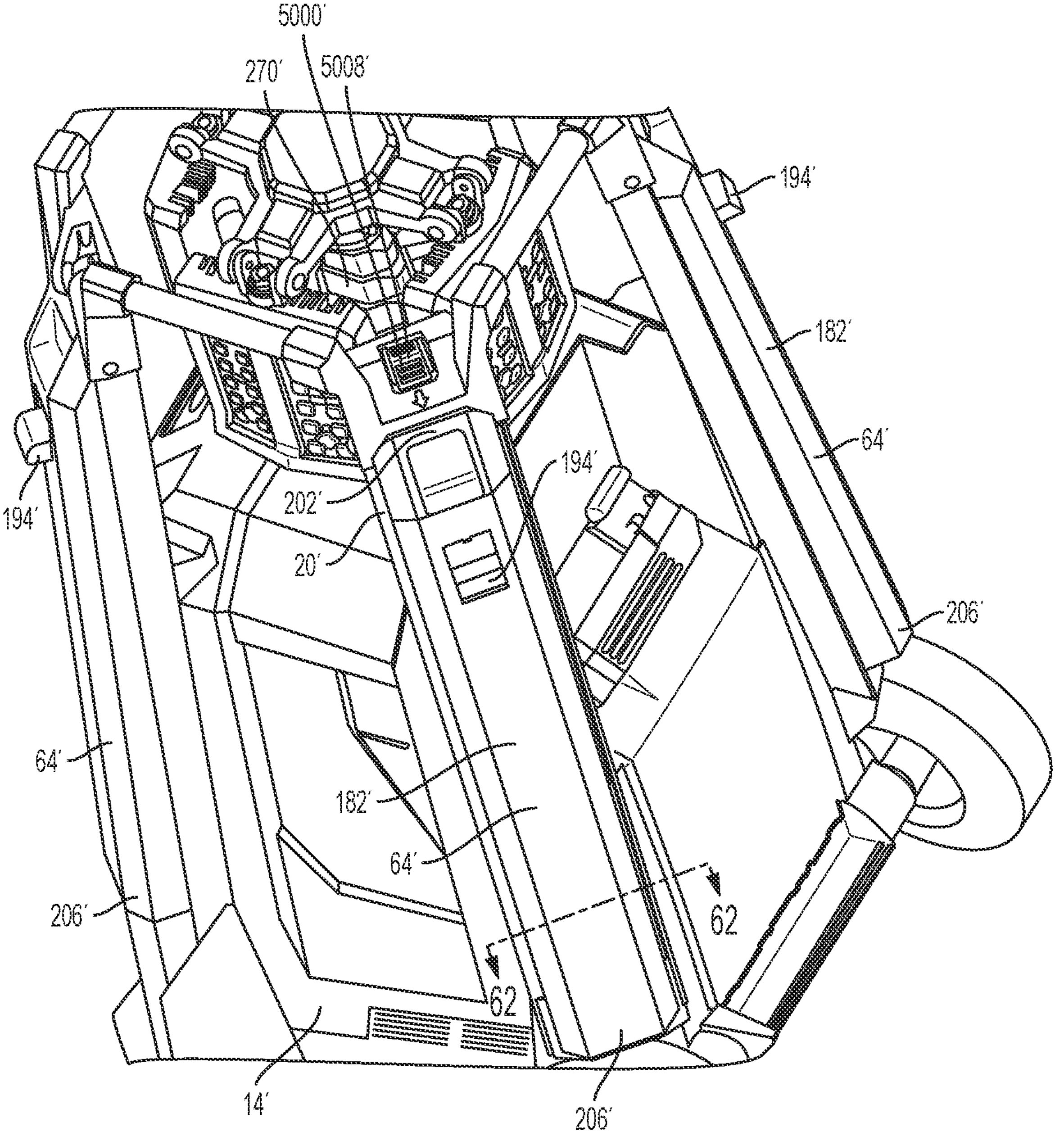
FIG. 58 is a rear perspective view of the site light of FIG. 57.
Figure 59:
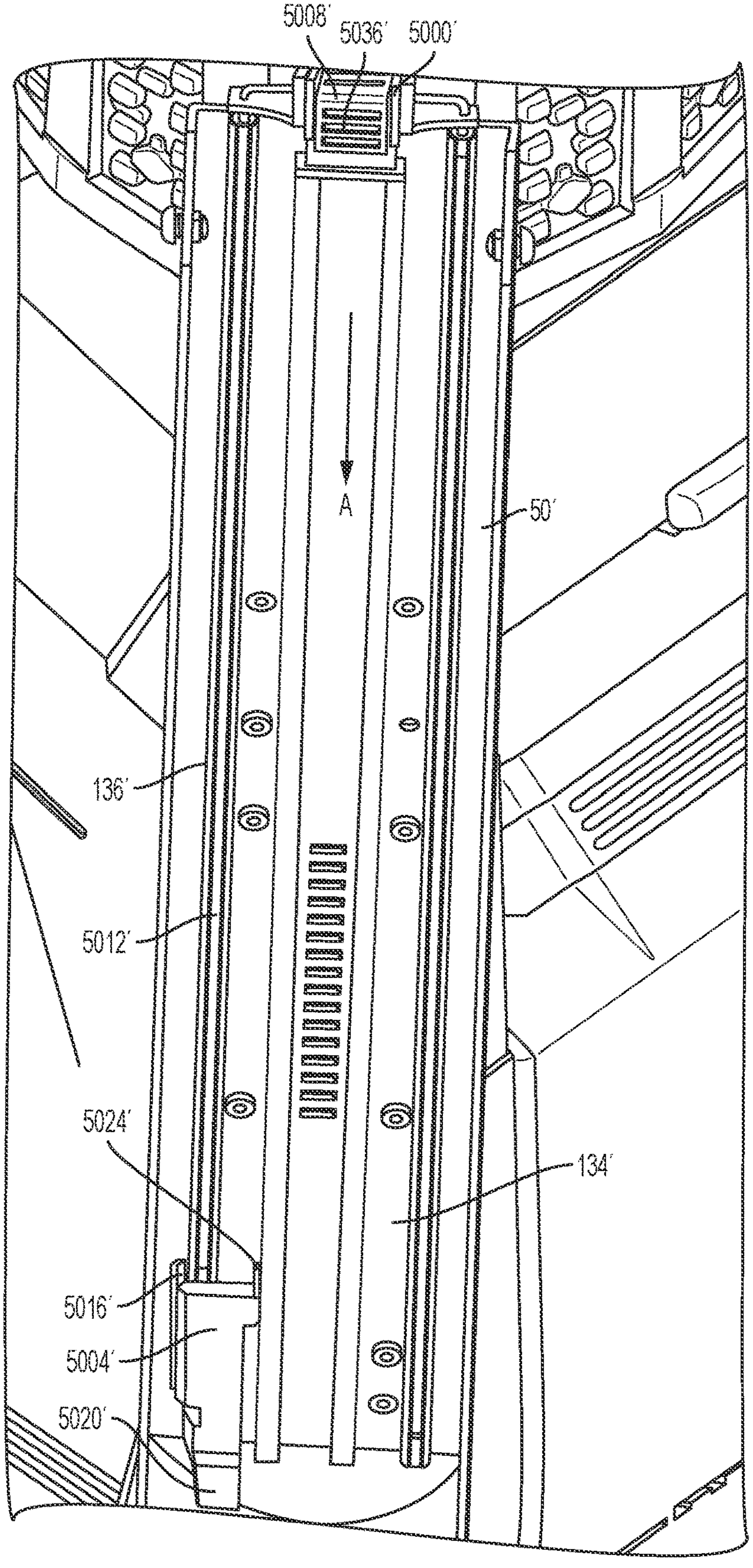
FIG. 59 is a rear perspective view of the site light of FIG. 57 with a portion of the leg assembly removed for clarity.

The first lock mechanism 194' of each leg assembly 64' is substantially similar to the lock mechanism 194 shown in FIGS. 11-13 and described above. More specifically, as shown in FIG. 58, the first lock mechanism 194' of each leg assembly 64' is mounted to a corresponding leg 182' proximate the first end 202' thereof and configured to selectively control the movement of the first end 202' along the length of the track 134'. During use, the first lock mechanism 194' is adjustable between a locked configuration, where the first end 202' of the leg 182' is fixed relative to the track 134' of the channel 50', and an unlocked configuration, where the first end 202' of the leg 182' is movable along the track 134' of the channel 50'.

The second lock mechanism 5000' of each leg assembly 64' is mounted to the channel 50' and configured to selectively engage the second end 206' of the leg 182'. More specifically, the second lock mechanism 5000' is configured to selectively secure the leg 182' in the stowed position by fixing the second end 206' of the leg 182' relative to the channel 50'. During use, the second lock mechanism 5000' is adjustable between a locked configuration, where the second end 206' of the leg 182' is fixed relative to the channel 50', and an unlocked configuration, where the second end 206' of the leg 182' is movable relative to the channel 50'.

Illustrated in FIGS. 58-62, the second lock mechanism 5000' includes a latch member 5004', a button 5008', and a control rod 5012' extending between and coupled to both the latch member 5004' and the button 5008'. During use, the button 5008', the latch member 5004', and the control rod 5012' all move along the length of the channel 50' together as a unit.

The latch member 5004' of the second lock mechanism 5000' includes a body 5016' coupled to the control rod 5012' and having a pawl 5020' extending therefrom. The body 5016', in turn, includes a series of feet 5024' configured to slidingly interact with at least one of the track 134' and the grooves 136' of the channel 50'. More specifically, the feet 5024' are configured to allow the latch member 5004' to move linearly along the length of the channel 50' between an engaged position and a disengaged position.

The pawl 5020' of the latch member 5004' is sized and shaped to releasably engage an aperture 5028' defined by the leg 182' proximate the second end 206' thereof. More specifically, when the latch member 5004' is in the engaged position, the pawl 5020' is positioned within the aperture 5028' fixing the second end 206' of the leg 182' relative to the channel 50' (e.g., the pawl 5020' does not allow the second end 206' to be moved away from the channel 50'). In contrast, when the latch member 5004' is in the disengaged position, the pawl 5020' is not positioned within the aperture 5028' allowing the second end 206' of the leg 182' to freely move relative to the channel 50'.

Figure 60:
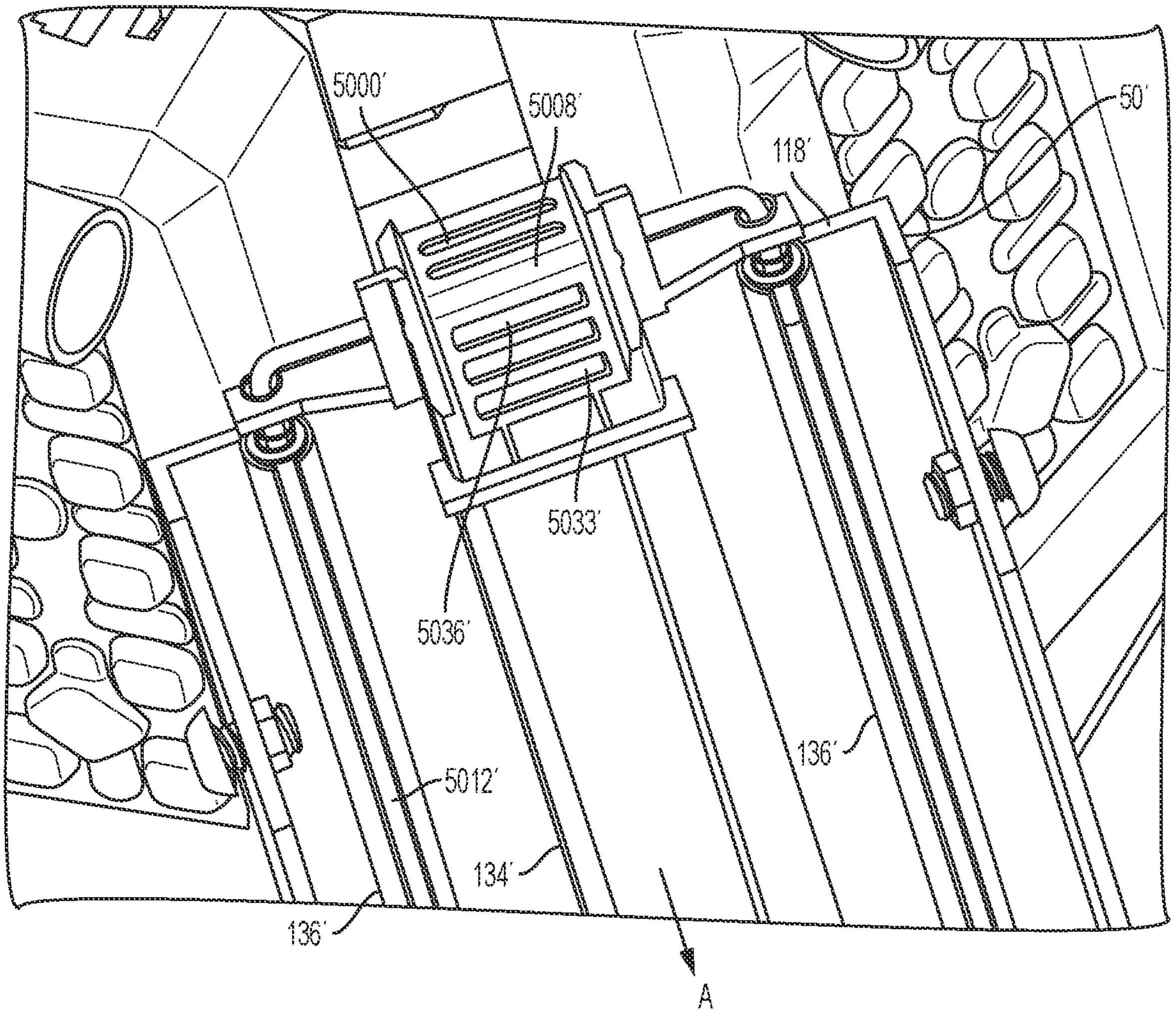
FIG. 60 is a detailed view of the button of the leg assembly of the site light of FIG. 57.
Figure 61:
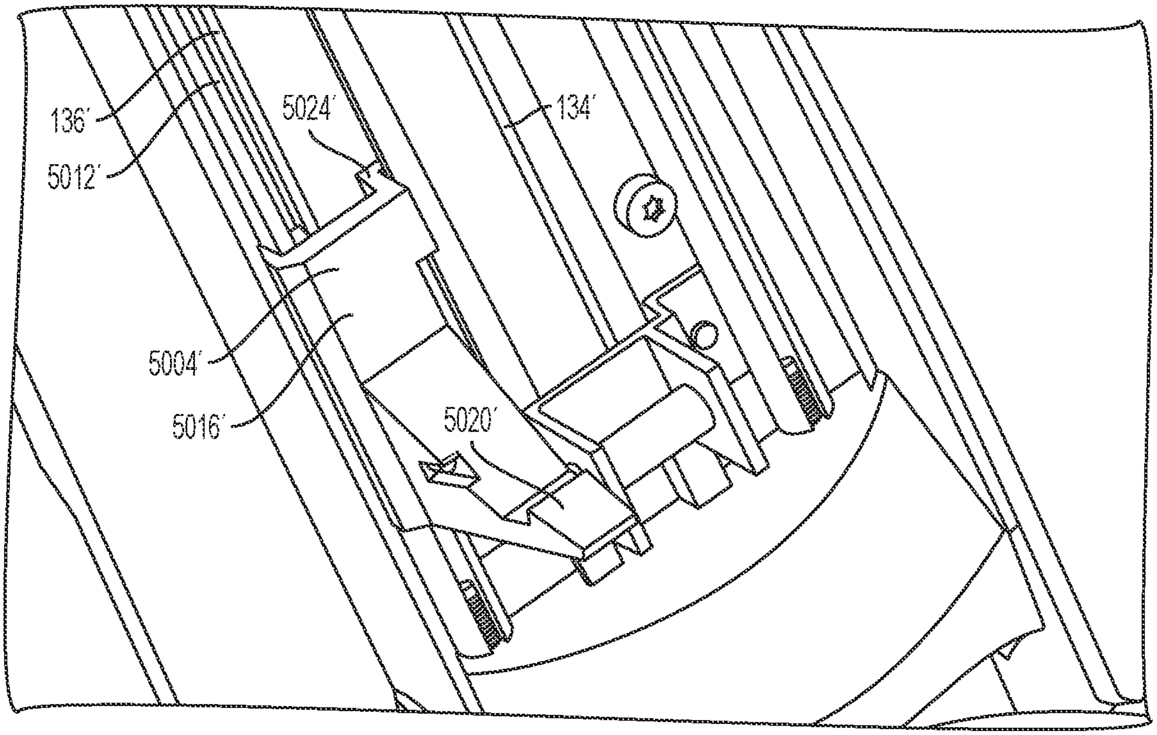
FIG. 61 is a detailed view of the latch member of the leg assembly of the site light of FIG. 57.
Figure 62:
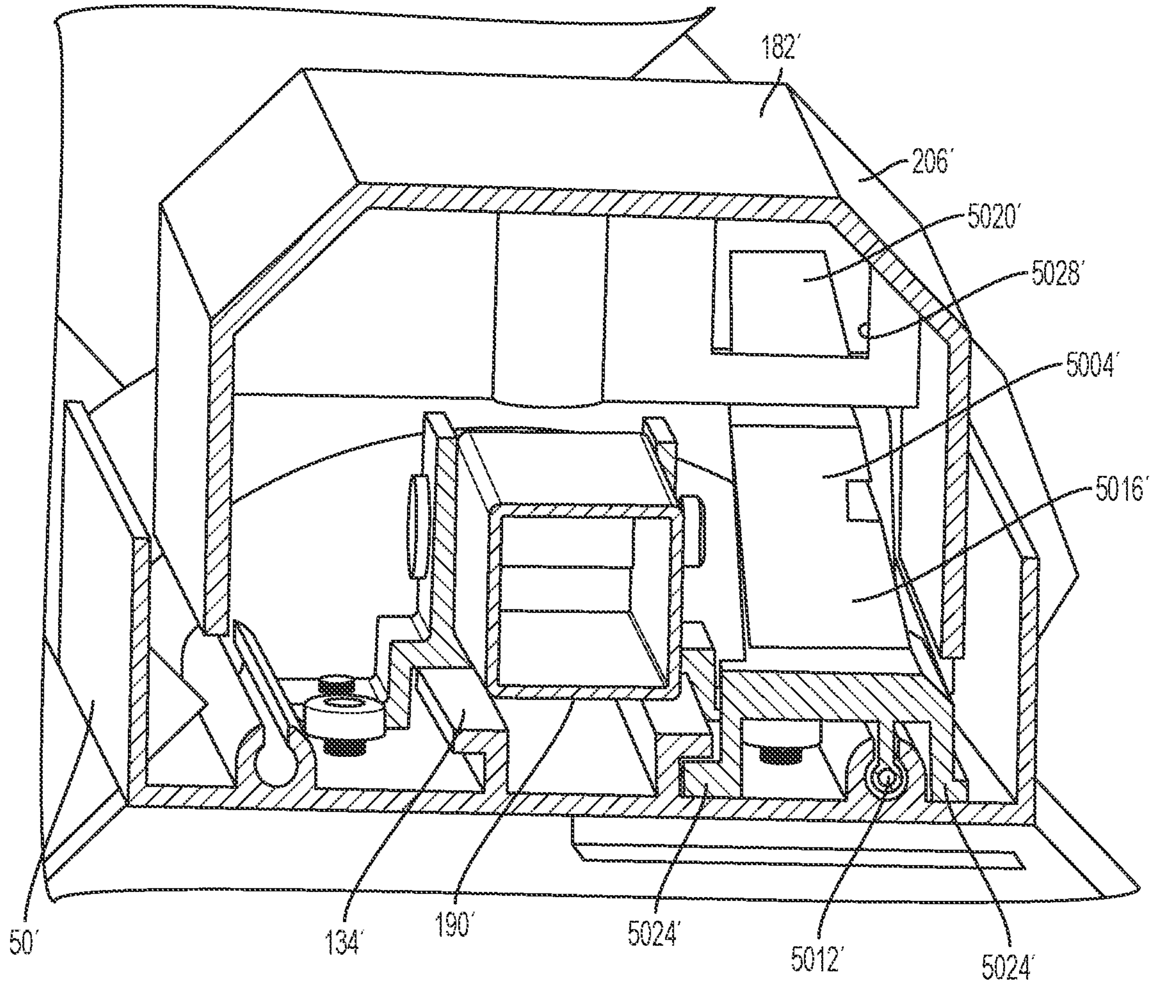
FIG. 62 is a section view take along line 62-62 of FIG. 58.

The button 5008' of the second lock mechanism 5000' includes a body 5032' coupled to the control rod 5012' and including a contact surface 5036' accessible by the user. More specifically, the button 5008' is slidingly coupled to the channel 50' proximate the first end 118' thereof. During use, the button 5008' is movable relative to the channel 50' between a rest position, and a depressed or actuated position. In the illustrated implementation, the button 5008' is biased toward the rest position by one or more biasing members 5040' (FIG. 60).

During operation, the leg 182' begins in the stowed position with the latch member 5004' in an engaged position. As such, the second end 206' of the leg 182' is fixed relative to the channel 50' such that the leg 182' cannot be moved out of the stowed position.

To deploy the leg 182', the user first actuates the button 5008' applying pressure to the contact surface 5036' in a first direction A (e.g., toward the first end 114' of the channel 50'). The applied force, in turn, causes the button 5008', the control rod 5012', and the latch member 5004' to all move in the first direction A toward the first end 114' of the channel 50' causing the latch member 5004' to move from the engaged position toward the disengaged position.

As the latch member 5004' moves from the engaged position toward the disengaged position, the pawl 5020' is removed from and disengages the aperture 5028' of the leg 182' allowing the second end 206' of the leg 182' to move relative to the channel 50'. With the second lock mechanism 5000' unlocked, the first end 202' of the leg 182' may slide toward the first end 114' of the channel 50'. By doing so, the second end 206' of the leg 182' is biased radially outwardly and axially downwardly by the pivoting action of the intermediate member 190'. The first end 202' of the leg 182' continues to slide toward the first end 114' of the channel 50' until the contact surface 186' of the leg 182' rests on the support surface.

After the contact surface 186' rests on the support surface, the user then moves the first lock mechanism 194' to the first position placing the lock mechanism 194' in the locked configuration (described above). Once deployed, the user can independently deploy each of the remaining leg assemblies 64', operating each first and second lock mechanism 194', 5000' independently.

To stow the leg assembly 64' the user move the latch 230' of the first lock mechanism 194' into the second position (e.g., unlocking the mechanism 194'). Once the first lock mechanism 194' is unlocked, the user is able to move the first end 202' of the leg 182' along the track 134' and toward the second end 206' of the channel 50'. This, in turn, causes the second end 206' of the leg 182' to get drawn radially inwardly and toward the channel 50'. Once the leg 182' returns to the initial stowed position, the pawl 5020' of the second lock mechanism 5000' is biased back into the aperture 5028' of the leg 182' by the biasing members 5040' automatically placing the second lock mechanism 5000' in the locked configuration. The leg 182' is then secured in the stowed position as described above.

Figure 63:
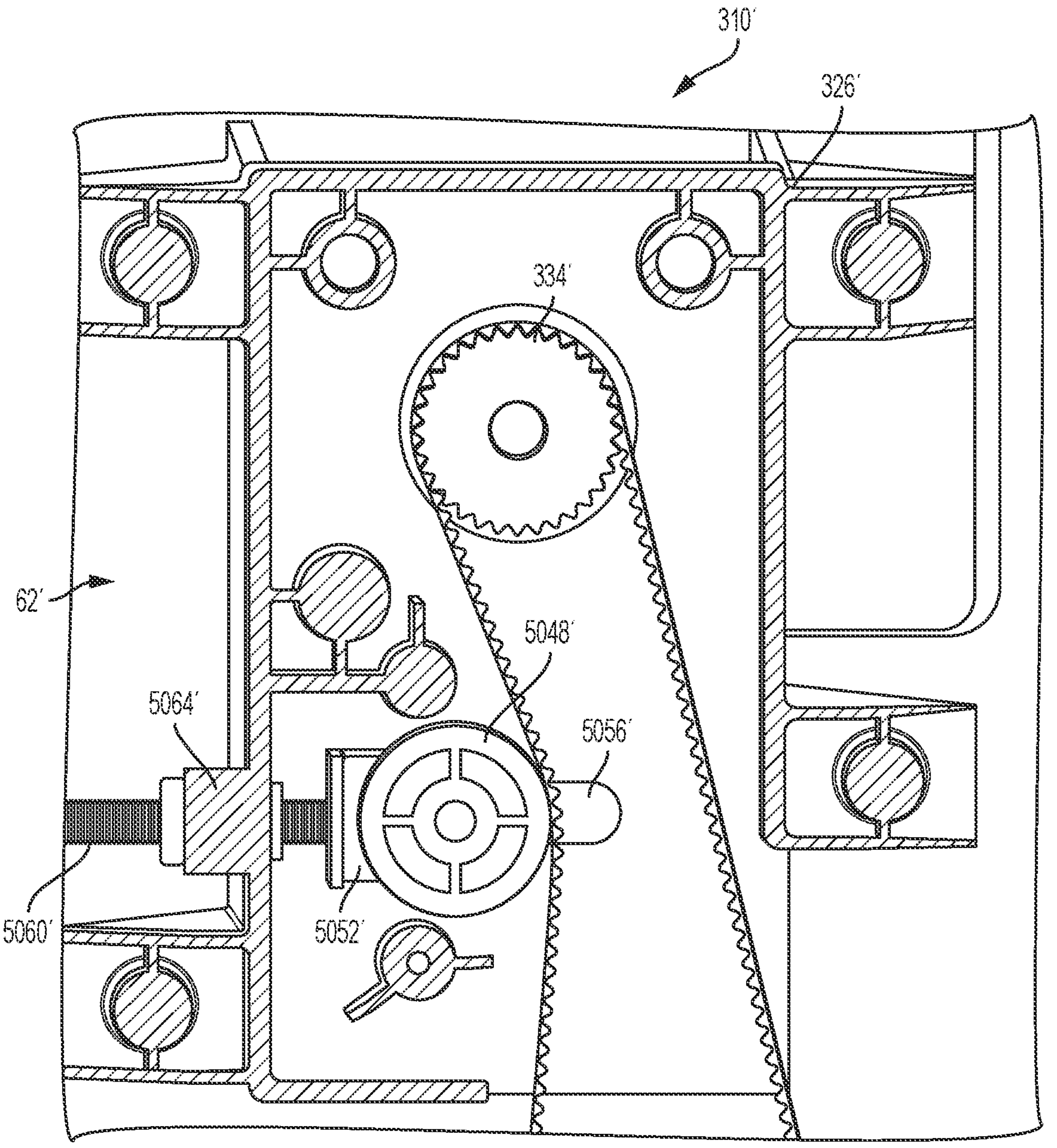
FIG. 63 is a section view take along line 63-63 of FIG. 57.
Figure 64:
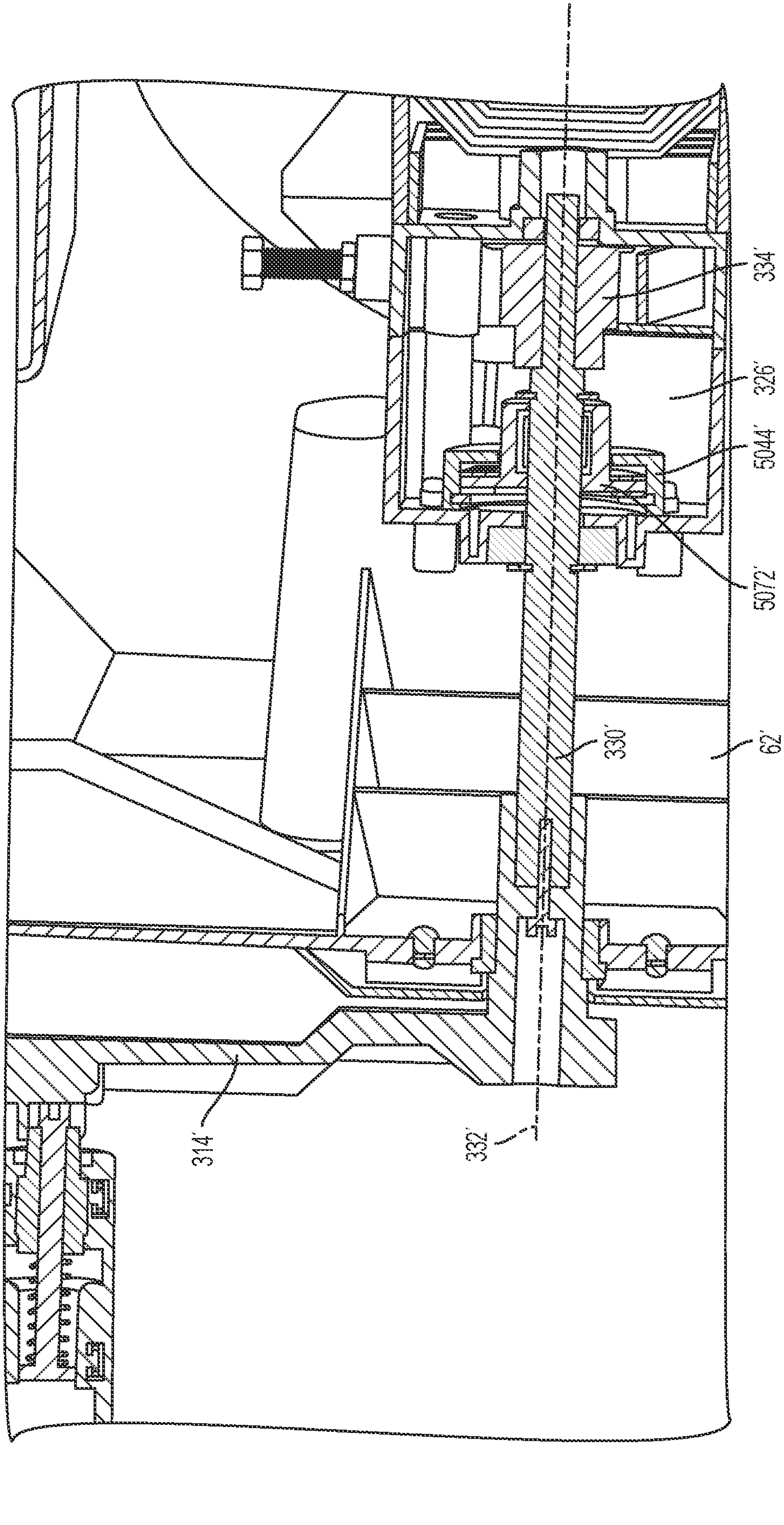
FIG. 64 is a section view taken along line 64-64- of FIG. 57.
Figure 65:
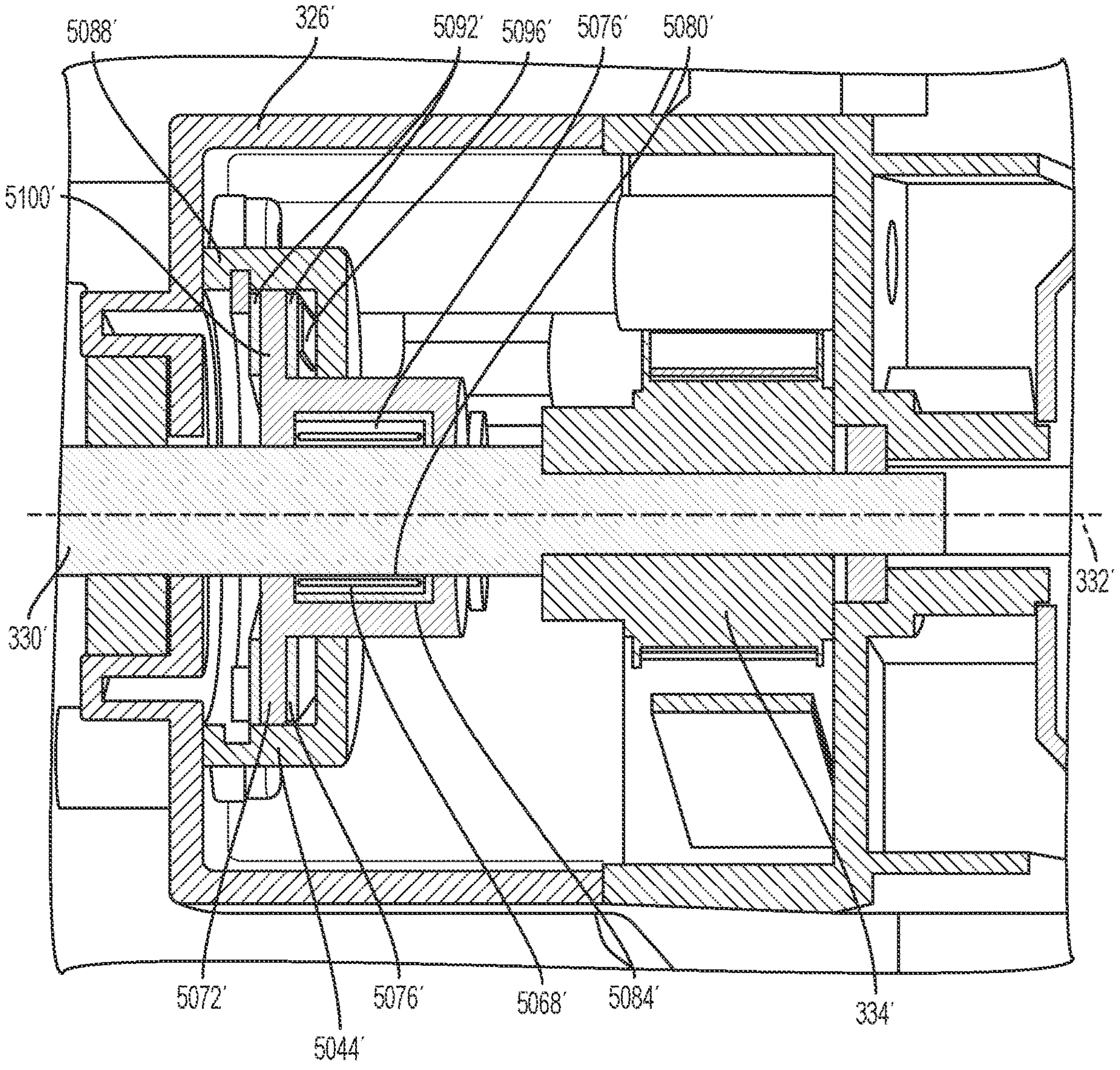
FIG. 65 is a detailed section view of the crank assembly of FIG. 64.
Figure 66:
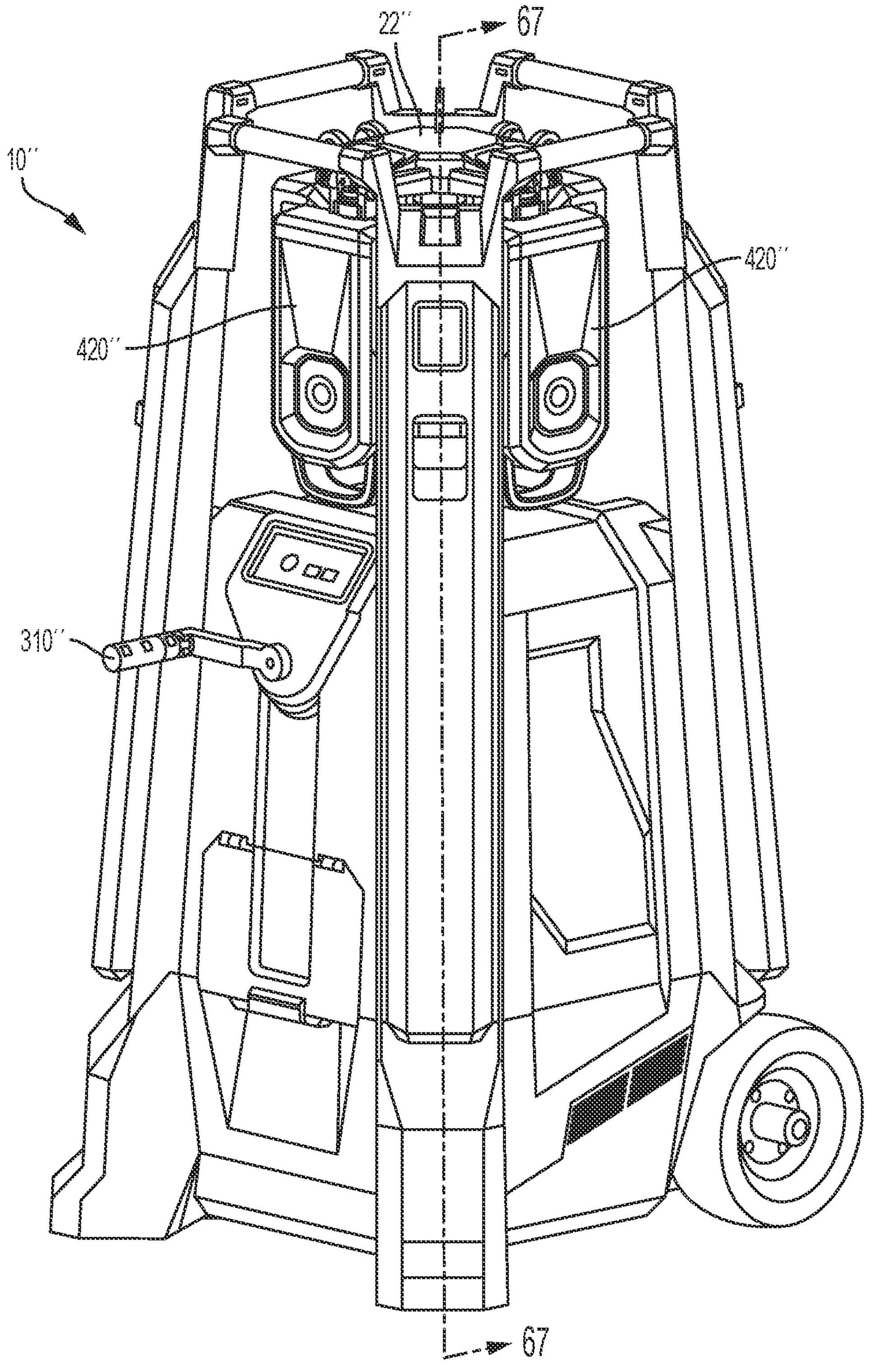
FIG. 66 is a perspective view of another embodiment of a site light.
Figure 67:
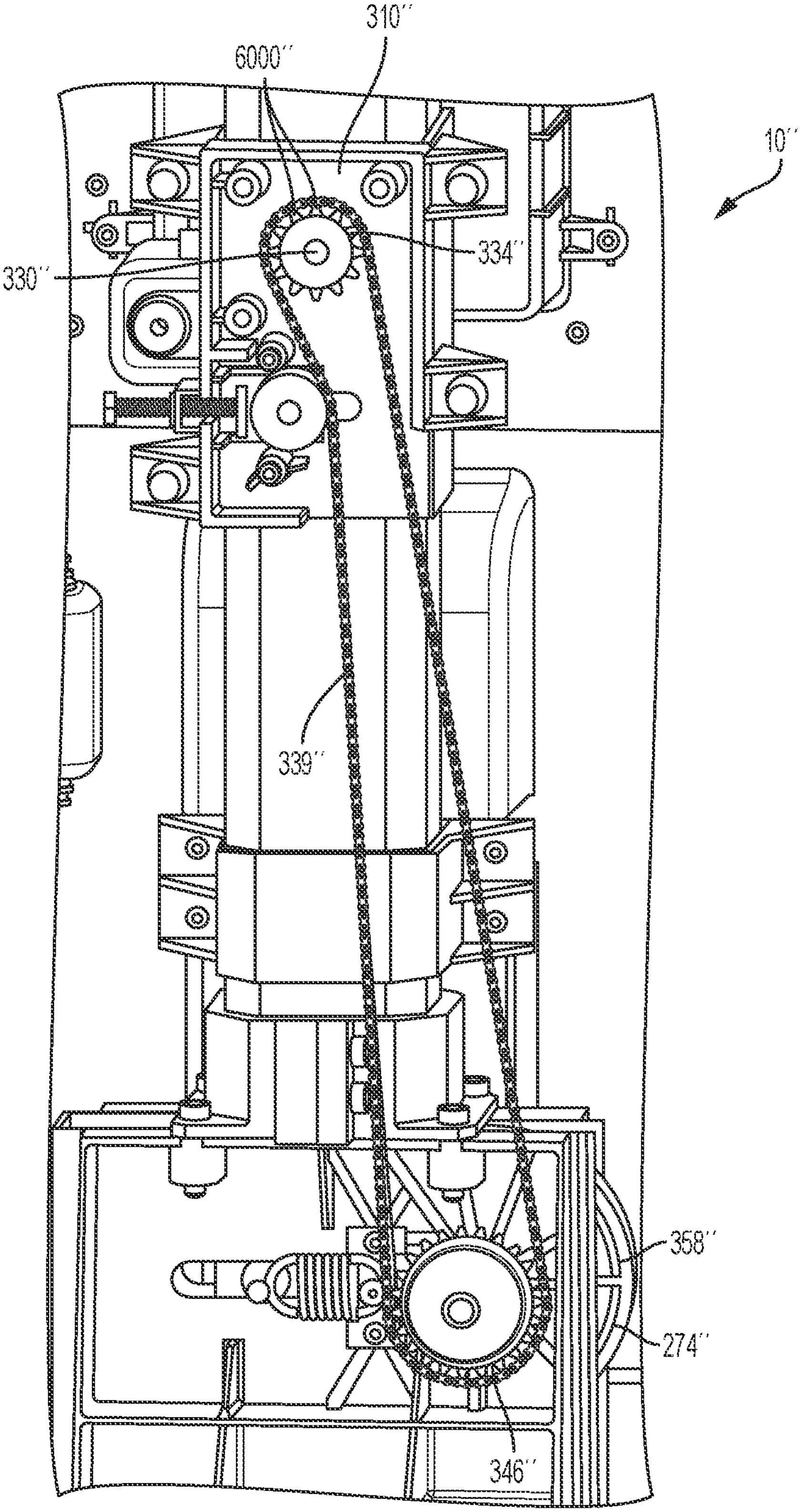
FIG. 67 is a section view taken along line 67-67 of FIG. 66.
Figure 68:
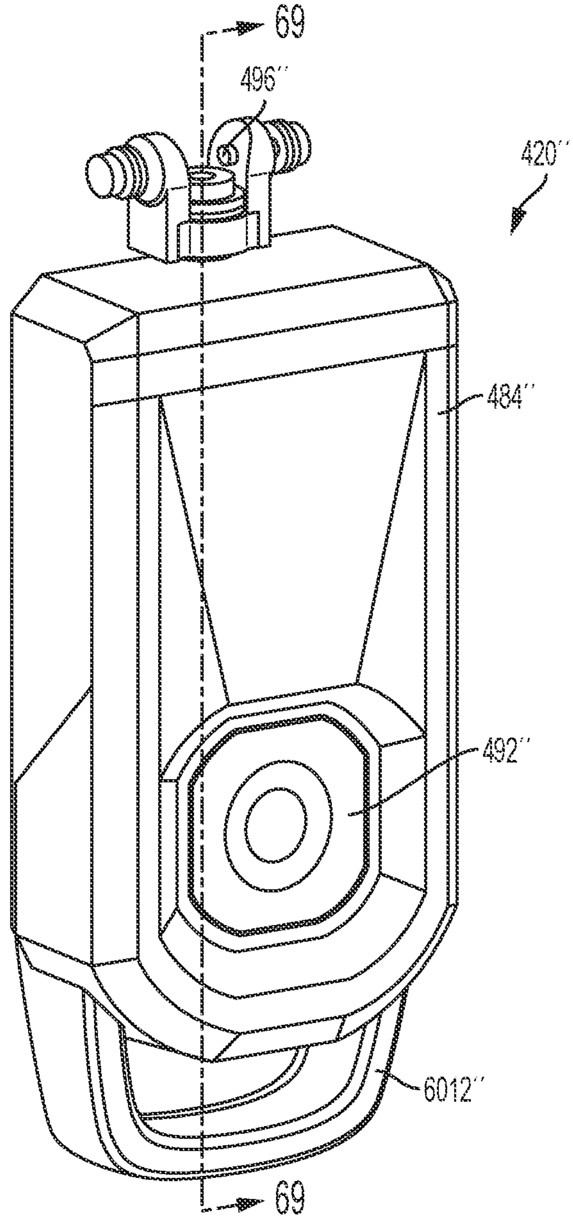
FIG. 68 is a perspective view of another embodiment of a light pod.
Figure 69:
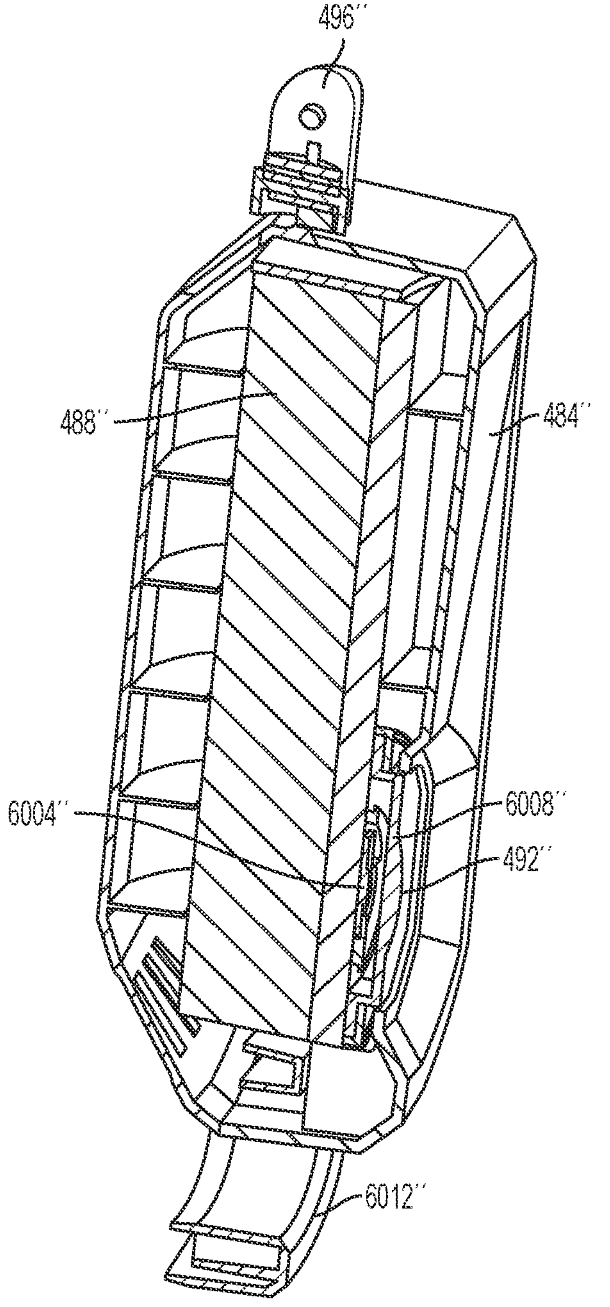
FIG. 69 is a section view taken along line 69-69 of FIG. 68.
Figure 70:
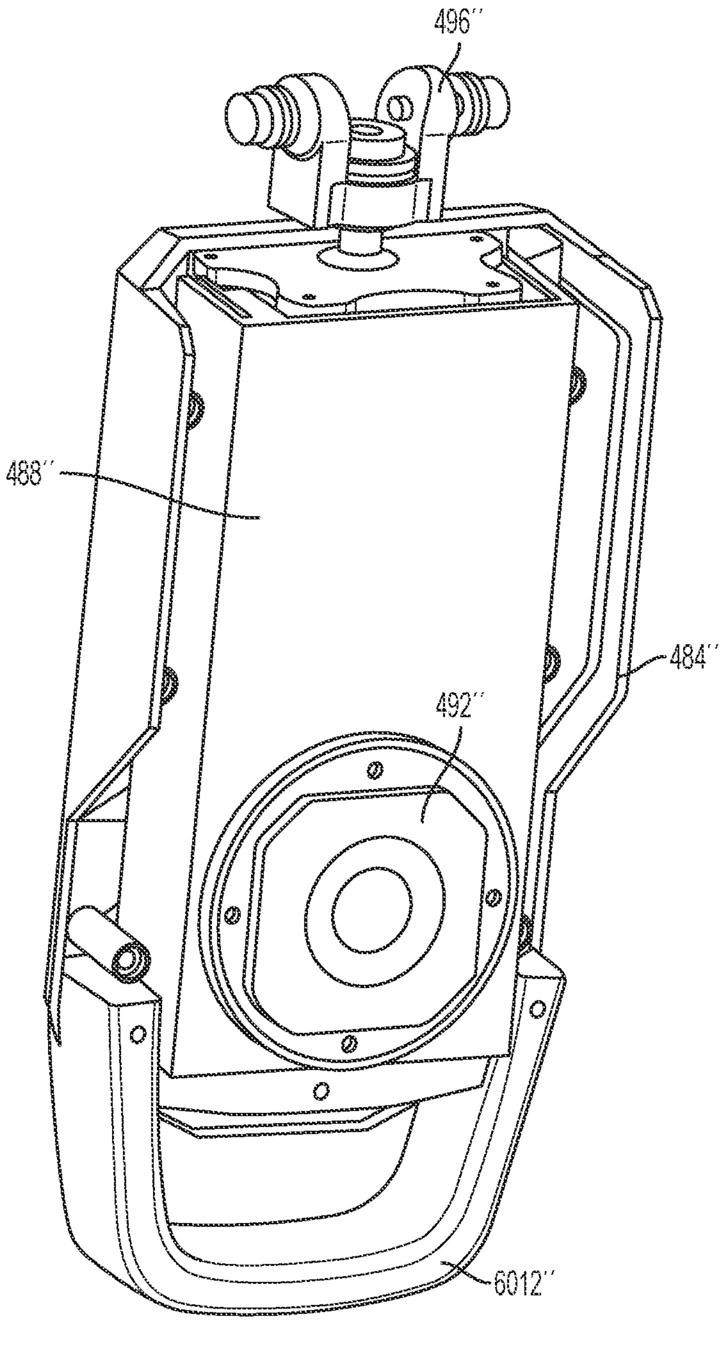
FIG. 70 is a perspective view of the light pod of FIG. 68 with a portion of the housing removed for clarity.

Illustrated in FIGS. 63-65, the site light 10' also includes a crank assembly 310' that is substantially similar to the crank assembly 310 described above. The crank assembly 310' includes a frame 326' at least partially positioned within the housing volume 62', a shaft 330' rotatably supported by the frame 326' for rotation about a second axis 332', a crank arm 314' coupled to and rotatable together with the shaft 330', a drive pulley 334' coupled to and rotatable together with the shaft 330', and a damper assembly 5044' to selectively resist the rotation of the shaft 330' about the axis 332'. During operation, the damper assembly 5044' is configured such that it does not resist the rotation of the shaft 330' when the shaft 330' rotates about the axis 332' in a first direction (e.g., when the arm 270' length increases), however, the damper assembly 5044' is configured to resist the rotation of the shaft 330' when the shaft 330' rotates about the axis 332' in a second direction different than the first rotation (e.g., when the arm length 270' decreases).

The drive pulley 334' of the crank assembly 310' is coupled to the shaft 330' and configured to at least partially support a drive belt 339' thereon (described above). In the illustrated embodiment, the drive pulley 334' is mounted on the shaft 330' so that the pulley 334' and shaft 330' rotate together as a unit.

The crank assembly 310' also includes an idler pulley 5048' rotatably mounted to a subframe 5052', that in turn is movable relative to the frame 326'. More specifically, the subframe 5052' includes a protrusion (not shown) that is received within and moves along a groove 5056' formed in the frame 326'. The subframe 5052' also includes a threaded rod 5060' that threadably engages a boss 5064' formed by and fixed relative to the frame 326'. As such, during use the user may rotate the threaded rod 5060' to cause it to move axially relative to the boss 5064'. This movement, in turn, causes the subframe 5052' and idler pulley 5048' to move along the groove 5056' formed in the frame 326'. Such motion can be used to adjust the tension within the drive belt 339' during use.

The damper assembly 5044' of the crank assembly 310' includes a one-way bearing 5068' mounted on the shaft 330', a rotor 5072' operatively coupled to the outer race of the one-way bearing 5068', and a friction clutch assembly 5076' fixedly coupled to the frame 326'. During use, the one-way bearing 5068' selectively transmits force between the shaft 330' and the rotor 5072' varying the level of resistance the friction clutch assembly 5076' applies to the shaft 330'.

The one-way bearing 5068' of the damper assembly 5044' includes an inner race 5080' coupled to and rotatable together with the shaft 330', an outer race 5084' coupled to and rotatable together with the rotor 5072', and a series of spragues 5078' positioned between and configured to selectively engage the inner race 5080' and the outer race 5084'. More specifically, when the shaft 330' rotates in the first direction (e.g., when the arm length 270' is increase), the spragues 5078' disengage causing the one-way bearing 5068' to not transmit force between the shaft 330' and the rotor 5072'. In contrast, when the shaft 330' rotates in the second direction (e.g., when the arm length 270' is decreasing), the spragues 5078' do engage both races 5080', 5084' causing the one way bearing 5068' to transmit force between the shaft 330' and the rotor 5072' and causing the rotor 5072' and shaft 330' to rotate together as a unit.

The clutch assembly 5076' of the damper assembly 5044' includes a housing 5088' fixedly coupled to the frame 326', one or more friction disks 5092' rotatably fixed relative to the housing 5088', and a biasing member 5096' positioned between the housing 5088' and a corresponding friction disk 5092' (see FIG. 65). When assembled, a flange 5100' of the rotor 5072' is positioned between the friction disks 5092' such that the compressive force applied by the biasing member 5096' creates friction therebetween. As such, the clutch assembly 5076' resists any rotation of the rotor 5072' relative to the housing 5088'.

In the illustrated implementation, the clutch assembly 5076' is configured to produce a static frictional force via its interaction with the rotor 5072' having sufficient magnitude to maintain the light assembly 22' in an elevated position. That is, the clutch assembly 5076' produces sufficient static frictional force to overcome the force of gravity acting on the elevated light assembly 22' and arm 207'. As such, if the user is not interacting with the crank assembly 310', the clutch assembly 5076', one-way bearing 5068', and rotor 5072' act as a stop by not allowing the shaft 330' to rotate in the second direction thereby maintaining the light assembly 22' in the elevated position.

To elevate the light assembly 22', the user rotates the crank arm 314' in a first direction causing the shaft 330' and drive pulley 334' to rotate in the first direction together therewith. As described above, the rotation of the drive pulley 334' in the first direction causes the arm length 270' to increase—thereby elevating the light assembly 22'.

As the user rotates the crank arm 314', the inner race 5080' of the one-way bearing 5068' rotates together therewith. As indicated previously, rotation of the shaft 330' and inner race 5080' in the first direction causes the spragues 5078' to disengage from the races 5080', 5084' such that no force is transmitted to the rotor 5072'. As such, no resistive forces are applied to the shaft 330' via the damper assembly 5044' and the user must only overcome the weight of the light assembly 22'.

Once the light assembly 22' has reached the desired elevation (e.g., the arm length 270' is the desired magnitude), the user can release the crank arm 314'. By doing so, the force of gravity acting upon the light assembly 22' and arm 270' creates a force that travels back into the crank assembly 310' via the drive pulley 334'. When this occurs, the shaft 330' is driven in the second direction causing the spragues 5078' to engage both races 5080', 5084' of the one-way bearing 5068' thereby transmitting force to the rotor 5072'. By doing so, the rotor 5072' attempts to rotate together with the shaft 330' in the second direction and relative to the clutch assembly 5076'. However, as described previously, the static frictional force applied to the rotor 5072' via the friction disks 5092' is sufficiently large that no relative rotation may take place. As such, the rotor 5072' and shaft 330' do not rotate about the axis 332' and the light assembly 22' remains at the desired height.

To lower the light assembly 22', the user rotates the crank arm 314' in the second direction causing the shaft 330' and the drive pulley 334' to rotate in the second direction together therewith. As described above, rotation of the shaft 330' in the second direction causes the spragues 5078' of the one-way bearing 5068' to engage both races 5080', 5084' and the rotor 5072' to rotate together with the shaft 330'. The rotation of the rotor 5072' in the second direction creates a resistive force with the friction disks 5092' that must be overcome by the user. As such, the clutch assembly 5076' provides a resistive force that allows the user to lower the light assembly 22', but avoid a run-away situation where the light 22' may come crashing down. If the user releases the crank arm 314' during the lowering process, the frictional force provided by the clutch assembly 5076' is sufficient to stop the lower process and maintain the light 22' in a static state as described above.

FIGS. 66-70 illustrate another implementation of the site light 10" that is substantially similar to the site light 10' illustrated in FIGS. 57-65 and described above. As such, only the differences between the two embodiments will be described in detail herein. Similar elements have been given the same reference number with the addition of a double-prime symbol (").

Illustrated in FIGS. 66-70, the site light 10" also includes a crank assembly 310" that is substantially similar to the crank assembly 310' described above. A drive sprocket 334" of the crank assembly 310" is coupled to a shaft 330" and configured to at least partially support a roller chain 339" thereon. More specifically, the drive sprocket 334" includes a plurality of exterior teeth 6000" (see FIG. 67) configured to engage the roller chain 339" and transmit forces therebetween. In the illustrated embodiment, the drive sprocket 334" is mounted on the shaft 330" so that the sprocket 334" and shaft 330" rotate together as a unit.

In the illustrated embodiment, a drive wheel 358" of the drive assembly 274" is coupled to a wheel sprocket 346" (FIG. 67) for rotation together therewith. The wheel sprocket 346", in turn, engages and is driven by a roller chain 339" of the crank assembly 310". Therefore, the shaft 330" of the crank assembly 310" and the drive wheel 358" of the drive assembly 274" rotate together as a unit (i.e., the shaft 330" rotates the drive sprocket 334", which rotates the wheel sprocket 346" via the roller chain 339", which rotates the drive wheel 358").

As shown in FIGS. 66, and 68-70, each light pod 420" of the light assembly 22" is substantially similar to the light pods 420 described above. Each light pod 420" is substantially rectangular in shape and includes a housing 484", a heat sink 488" positioned within the housing 484", and an LED module 492" mounted to the heat sink 488". In the illustrated embodiment, the housing 484" of the light pod 420" includes a pivot bracket 496" coupled to one end thereof and forms a handle 6012" opposite the pivot bracket 496". During use, the user is able to manipulate the orientation of the light pod 420" relative to a carriage 432" (e.g., via the pivot bracket 496") by grasping the handle 6012".

In the illustrated embodiment, each light pod 420" includes a single LED module 492" comprising a circuit-on-board (COB) LED 6004" and a single optic or lens 6008". During use, the single optic 6008" is configured to influence the distribution of light emitted from each of the individual diodes included on the COB LED 6004". This is in contrast to the light pod 420 described above, where an individual optic or lens is used for each individual diode of the array.

Although the invention has described with reference to certain preferred embodiments, variations exist within the scope and spirit of one or more independent aspects of the invention. Various features and advantages of the invention are set forth in the following claims.

What is claimed is:

1. A site light comprising:

a body;

a telescopic arm assembly supported by the body, wherein the telescopic arm includes a first end fixed relative to the body and a second end opposite and movable with respect to the first end;

a light assembly coupled to and movable together with the second end of the telescopic arm;

a track coupled to the body, wherein the track defines a track axis;

a latch coupled to and movable relative to the track in a direction parallel to the track axis; and a leg assembly, wherein the leg assembly includes a first end having a contact surface and a second end opposite the first end, and wherein the leg assembly is movable relative to the track between a stowed and deployed position, and wherein the latch is configured to releasably engage the leg assembly to retain the leg assembly in the stowed position.

2. The site light of claim 1, further comprising a button in operable communication with the latch, and wherein the button is movable relative to the track in a direction parallel to the track axis.

3. The site light of claim 2, wherein the button is in operable communication with the latch via a control rod.

4. The site light of claim 3, wherein the track defines a groove, and wherein the control rod is at least positioned within and slides along the groove.

5. The site light of claim 1, wherein the latch engages the leg assembly proximate the first end.

6. The site light of claim 1, wherein the second end of the leg assembly is coupled to and movable along the track in a direction parallel to the track axis.

7. The site light of claim 6, wherein the latch is a first latch, and wherein the second end of the leg assembly includes a second latch adjustable between a locked configuration, in which the second end of the leg assembly is fixed relative to the track, and an unlocked configuration, in which the second end of the leg assembly is movable relative to the track.

8. The site light of claim 7, wherein the second latch includes a lock element that is pivotable with respect to the leg assembly.

9. The site light of claim 8, wherein the track defines a plurality of apertures positioned along the axial length thereof, and wherein the lock element is at least partially received within a corresponding one of the plurality of apertures.

10. A site light comprising:

a body;

a light assembly;

a track coupled to the body, wherein the track defines a track axis;

a latch coupled to and movable relative to the track;

a button coupled to and movable relative to the track;

a control rod extending between and coupled to both the latch and the button so that the latch, the button, and the control rod move together as a unit relative to the track; and a leg assembly, wherein the leg assembly includes a first end having a contact surface and a second end opposite the first end, and wherein the leg assembly is movable relative to the track between a stowed and deployed position, and wherein the latch is configured to releasably engage the leg assembly.

11. The site light of claim 10, wherein the latch, the button, and the control rod all move in a direction parallel to the track axis.

12. The site light of claim 10, wherein the second end of the leg assembly moves along the track in a direction parallel to the track axis as the leg assembly moves between the stowed and deployed positions.

13. The site light of claim 12, wherein the latch is a first latch, and further comprising a second latch coupled to the leg assembly proximate the second end.

14. The site light of claim 13, wherein the second latch maintains the leg assembly in the deployed position.

15. The site light of claim 10, wherein the latch maintains the leg assembly in the stowed position.

16. The site light of claim 10, wherein the latch engages the leg assembly proximate the first end.

17. The site light of claim 10, wherein the button is positioned so that it is accessible when the leg assembly is in the stowed position.

* * * * *